US006867772B2

(12) United States Patent
Kotcheff et al.

(10) Patent No.: US 6,867,772 B2
(45) Date of Patent: Mar. 15, 2005

(54) 3D COMPUTER MODELLING APPARATUS

(75) Inventors: Aaron William Christopher Kotcheff, London (GB); Adam Michael Baumberg, Berkshire (GB); Alexander Ralph Lyons, Berkshire (GB); Simon Michael Rowe, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 10/164,435

(22) Filed: Jun. 10, 2002

(65) Prior Publication Data

US 2002/0190982 A1 Dec. 19, 2002

(30) Foreign Application Priority Data

Jun. 11, 2001 (GB) ............................................. 0114157

(51) Int. Cl.[7] .............................................. G06T 15/00
(52) U.S. Cl. ..................................................... 345/420
(58) Field of Search ............................... 345/418, 419, 345/420, 421, 427, 619, 518

(56) References Cited

U.S. PATENT DOCUMENTS

| 6,356,272 | B1 | | 3/2002 | Matsumoto et al. | ........ | 345/582 |
| 6,597,369 | B2 | * | 7/2003 | Mochimaru et al. | ........ | 345/647 |
| 6,744,441 | B2 | * | 6/2004 | Wu et al. | .................... | 345/582 |
| 6,762,769 | B2 | * | 7/2004 | Guo et al. | .................. | 345/582 |
| 6,765,572 | B2 | * | 7/2004 | Roelofs | ...................... | 345/420 |
| 2001/0056308 | A1 | | 12/2001 | Petrov et al. | ................. | 700/98 |
| 2002/0050988 | A1 | | 5/2002 | Petrov et al. | ............... | 345/418 |

FOREIGN PATENT DOCUMENTS

| EP | 0 898 245 A1 | 2/1999 |
| JP | 09-170914 | 6/1997 |
| WO | WO 98/009253 | 3/1998 |
| WO | WO 00/04506 | 1/2000 |
| WO | WO 01/39124 | 5/2001 |

OTHER PUBLICATIONS

Okutomi et al.; "A Multiple–Baseline Stereo," IEEE Transactions on Pattern Analysis and Machine Intelligence 15 4; 353–363 (1993).
Niem et al.; "Automatic Reconstruction of 3D Objects Using a Mobile Monoscopic Camera," Image and Vision Computing 17; 173–180 (1999).
Löhlein; "A Volumetric Intersection Algorithm for 3d–Reconstruction Using a Boundary–Representation," http://i3lwww.ira.uka.de/diplomarbeiten/da_martin_loehlein/Reconstruction.html (1998).
Smith et al.; "Blue Screen Matting," ACM Siggraph Computer Graphics, Annual Conference Series; 259–268 (1996).
Wheeler et al.; "Consensus Surfaces for Modeling 3D Objects from Multiple Range Images," Proceedings of International Conference on Computer Vision; 917–924 (1998).
Hartley; "Euclidean Reconstruction from Uncalibrated Views," Applications of Invariance in Computer Vision; 237–256 (1993).

(List continued on next page.)

Primary Examiner—Phu K. Nguyen
(74) Attorney, Agent, or Firm—Fitzpatrick, Cella, Harper & Scinto

(57) ABSTRACT

A 3D computer model of an object is generated by calculating the intersections of polyhedra. Each polyhedron defines a volume of 3D space containing at least part of the object. The 3D points of intersection of the planar faces of the polyhedra are calculated and each point is labeled with the planar faces which meet thereat. The points are connected to form a polygon mesh using the labels to determine which points should be connected together. In calculating the points, a volume containing the object is subdivided into parts, each part is tested against the polyhedra and then discarded, subdivided further, or the point of intersection of planar faces within the volume part is calculated. A volume part is discarded if it is outside at least one polyhedron. The volume part is subdivided into further parts if it is intersected by more than a predetermined number of polyhedra faces.

45 Claims, 63 Drawing Sheets

OTHER PUBLICATIONS

Kobbelt et al.; "Feature Sensitive Surface Extraction from Volume Data," ACM Siggraph Computer Graphics, Annual Conference Series; 57–66 (2001).

Potmesil; "Generating Octree Models of 3D Objects from Their Silhouettes in a Sequence of Images," Computer Vision, Graphics, and Image Processing 40; 1–29 (1987).

Matusik et al.; "Image–Based Visual Hulls," ACM Siggraph, Computer Graphics, Annual Conference Series; 369–374 (2000).

Lorensen et al.; " Marching Cubes: A High Resolution 3D Surface Construction Algorithm," ACM Siggraph Computer Graphics, Annual Conference Series 21 4; 163–169 (1987).

Hoppe et al.; "Mesh Optimization." ACM Siggraph; 19–25 (1993).

"Tessellators and Quadrics," Open GL Programming Guide $2^{nd}$ Edition; 467–495.

Seitz et al.; "Photorealistic Scene Reconstruction by Voxel Coloring," CVPR; 1067–1073 (1997).

Seitz et al.; "Photorealistic Scene Reconstruction by Voxel Coloring," Journal of Computer Vision 35 2; 1–32 (1999).

Matusik et al.; "Polyhedral Visual Hulls for Real–Time Rendering," Proceedings of $12^{th}$ Eurographics Workshop on Rendering, London, England; 115–125 (2001).

Szeliski; "Rapid Octree Construction from Image Sequences," CVGIP: Image Understanding 58 1; 23–32 (1993).

Laurentini; "The Visual Hull Concept for Silhouette–Based Image Understanding," IEEE Transactions on Pattern Analysis and Machine Intelligence 16 2; 150–162 (1994).

Vaillant et al.; " Using Extremal Boundaries for 3–D Object Modeling," IEEE Transactions on Pattern Analysis and Machine Intelligence 14 2; 157–173 (1992).

Turk et al.; "Zippered Polygon Meshes from Range Images," ACM Siggraph ISBN 0–201–60795–6 (1994).

Steven J. Gortler et al., "The Lumigraph," *Computer Graphics Proceedings, Annual Conference Series* ACM–0–89791–746–4/96/008, 43–52, (1996).

Daniel Green et al., "Fast Polygon–Cube Intersection Testing," *Graphics Gems V* 375–379 (1995).

Richard I. Hartley, "Euclidean Reconstruction from Uncalibrated Views," *Second Joint European–U.S. Workshop on Applications of Invariance in Computer Vision* Oct. 1993 *Proceedings* 237–256 (1994).

J. Illingworth et al., "Looking to Build a Model World: Automatic Construction of Static Object Models Using Computer Vision," *Electronics & Communication Engineering Journal* 103–165, (Jun. 1998).

Maylor K. Leung et al., "Dynamic Strip Algorithm in Curve Fitting," 51 *Computer Vision, Graphics, and Image Processing* 146–165 (1990).

Wolfgang Niem, "Automatic Reconstruction of 3D Objects Using a Mobile Camera," 17 *Image and Vision Computing* 125–134, (1999).

Mukesh Prasad, "Intersection of Line Segments," *Graphics Gems II* 7–9 (1991).

M. Szilvasi–Nagy, "An Algorithm for Determing the Intersection of Two Simple Polyhedra," 3 *Computer Graphics Forum* 219–255 (1984).

Kevin Weiler, "An Incremental Angle Point in Polygon Test," *Graphics Gems IV* 16–46 (1994).

Mason Woo et al., "Tessellators and Quadrics," *The Open GL Programming Guide $2^{nd}$ Edition* 409–436 (1997).

* cited by examiner

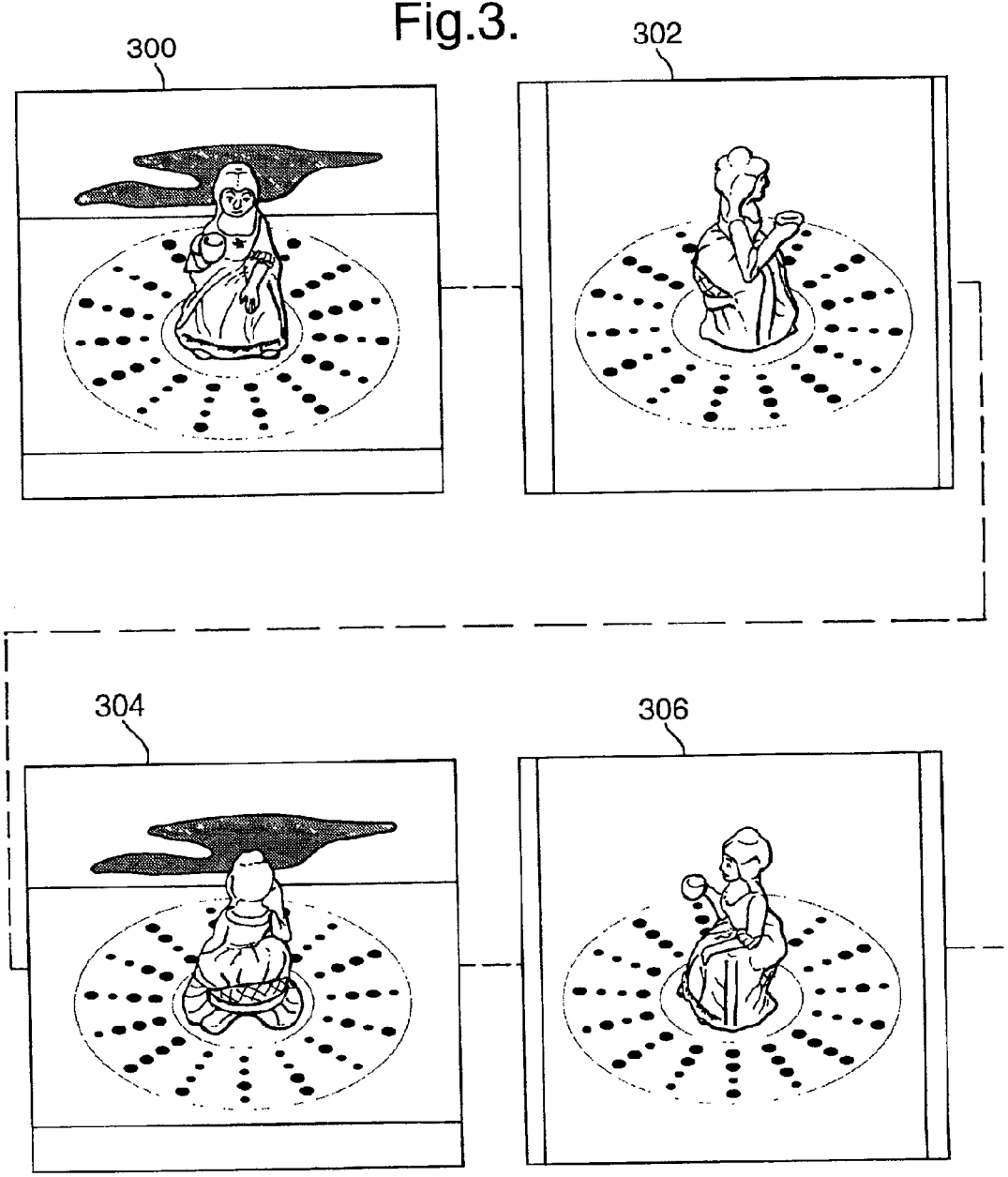

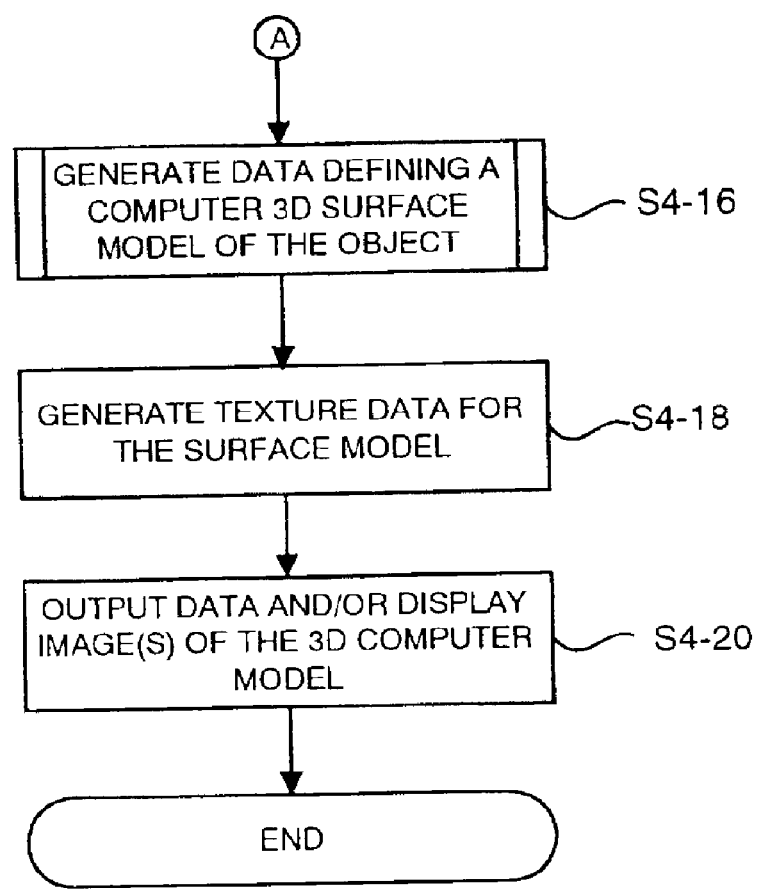

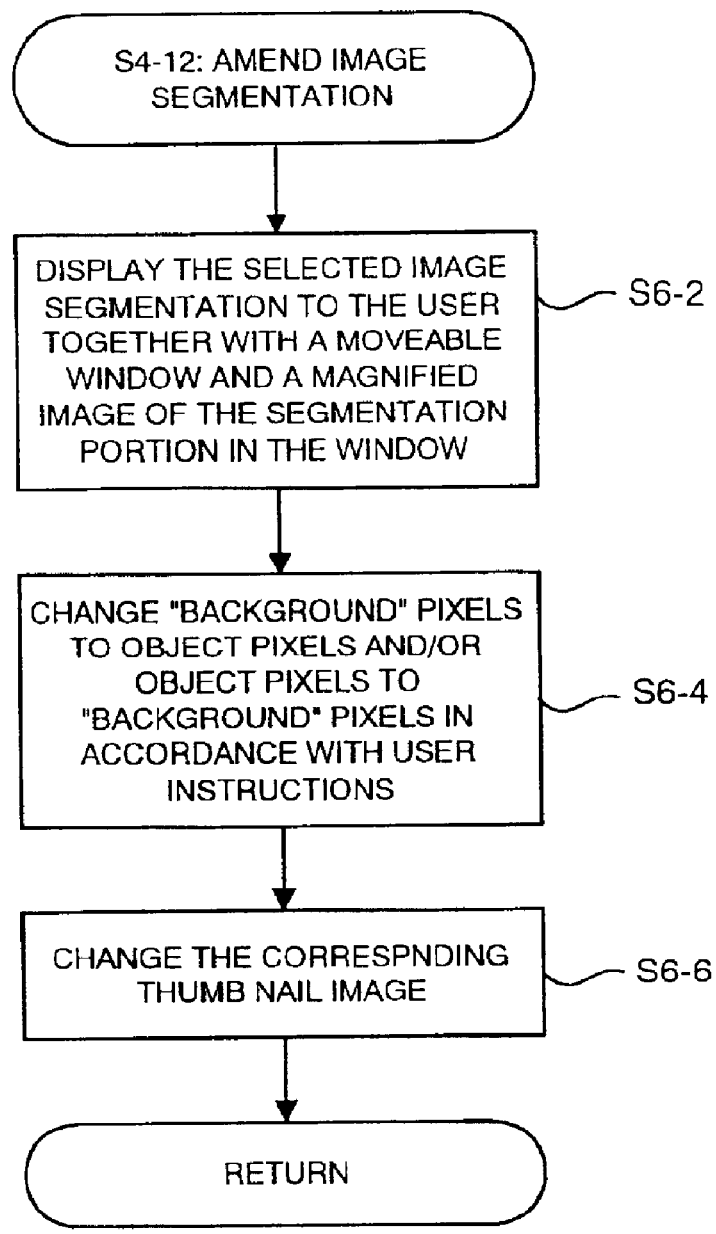

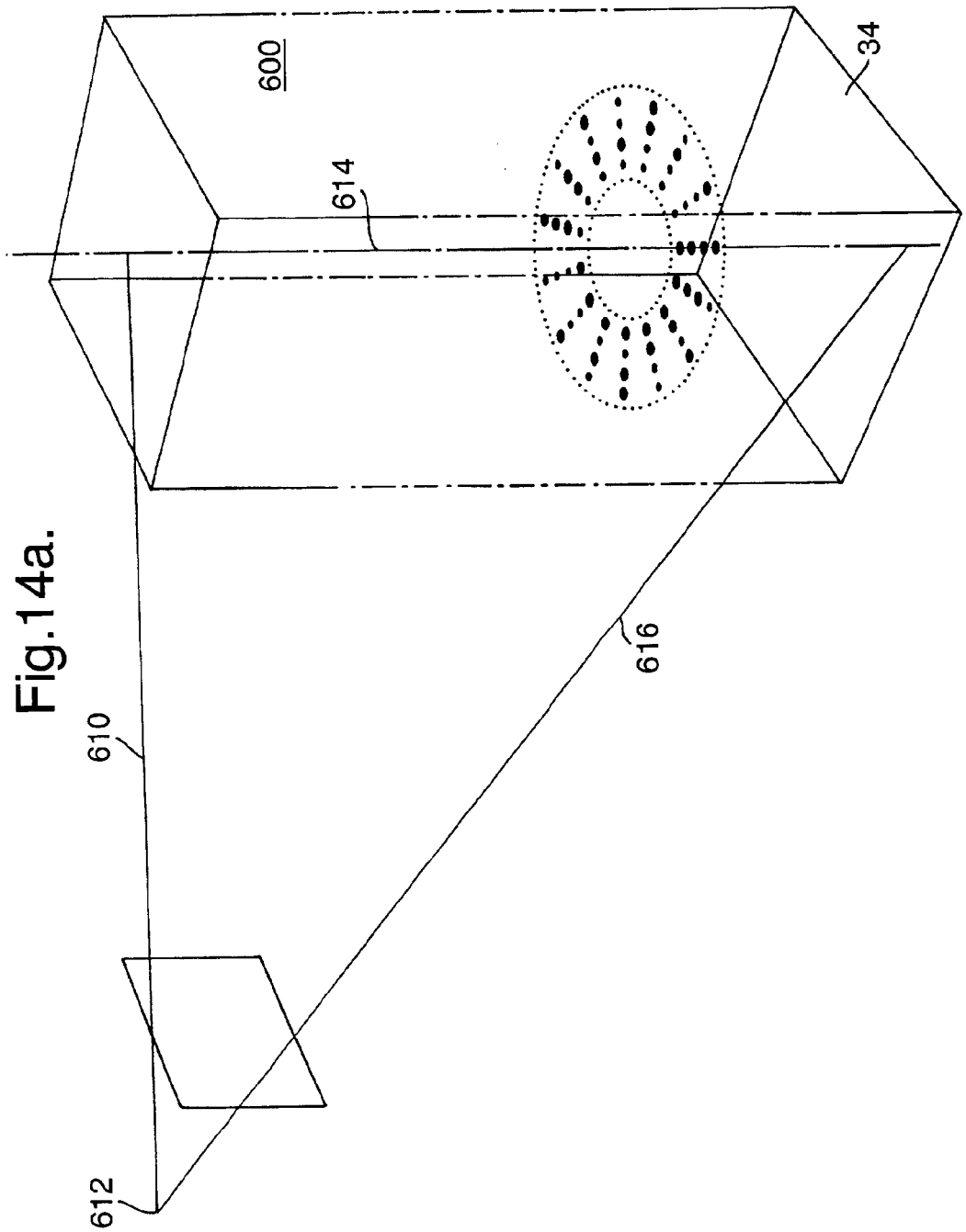

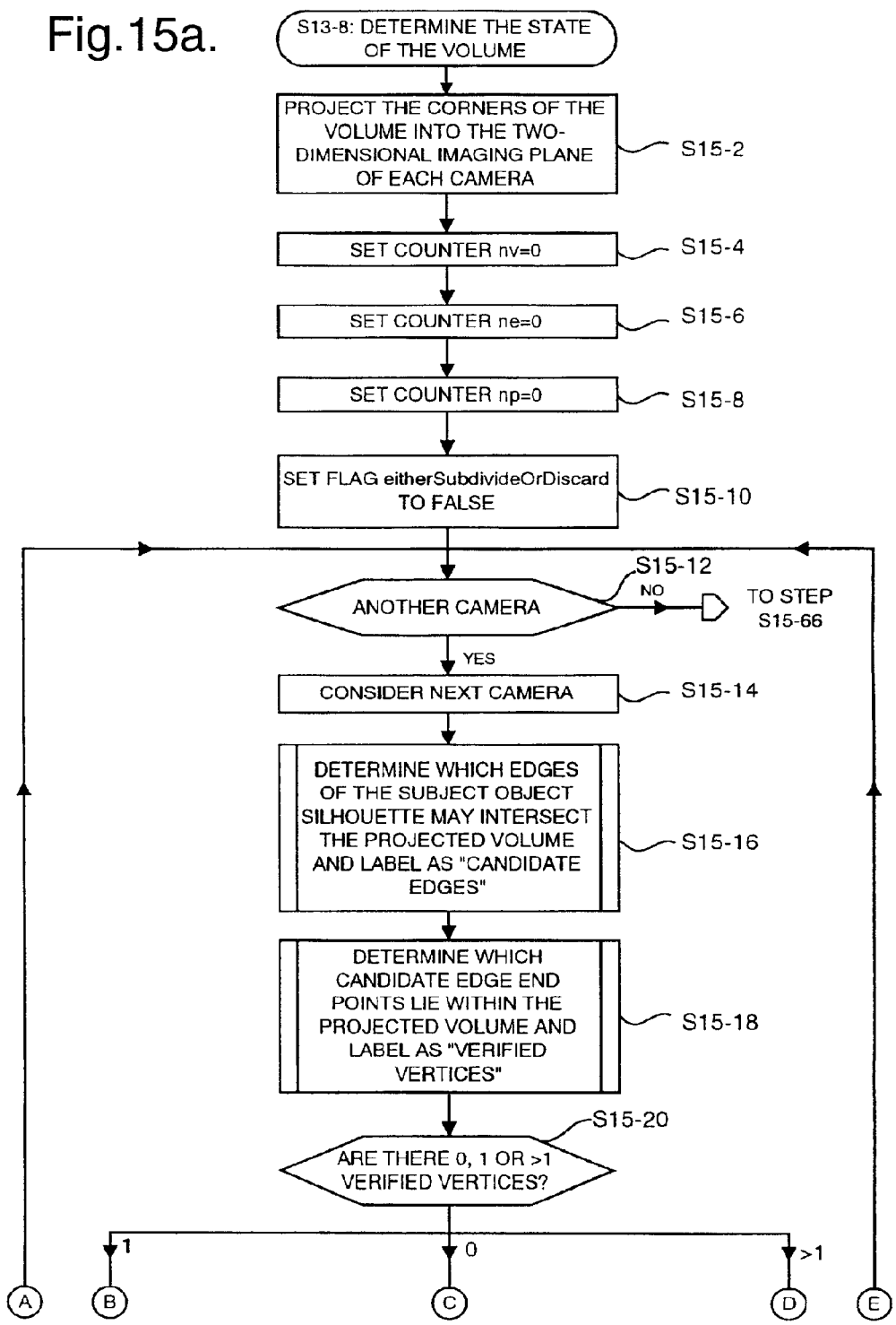

Relationship 1

Relationship 2

Relationship 3

Relationship 4

Relationship 5

Relationship 6

Relationship 7

Relationship 8

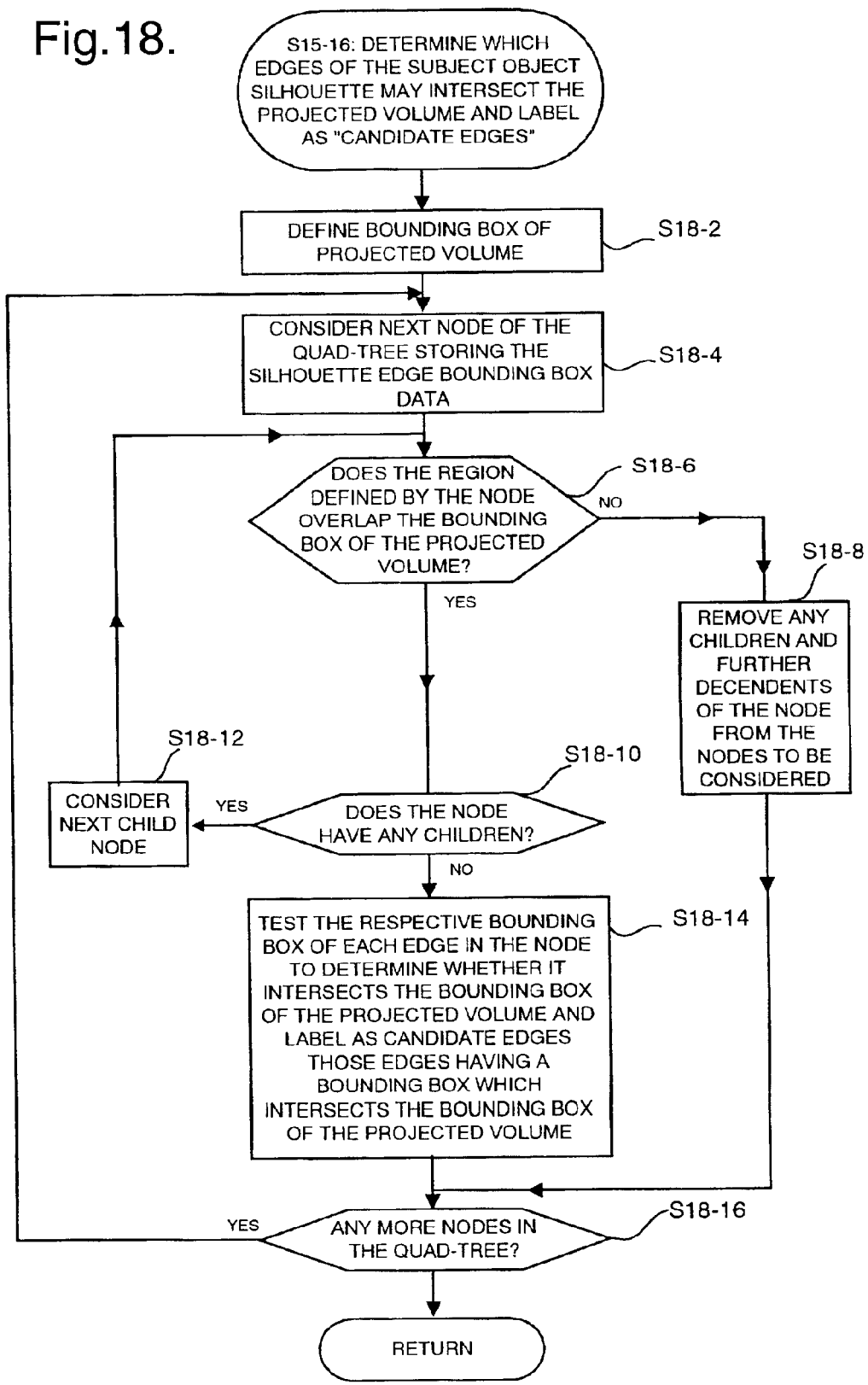

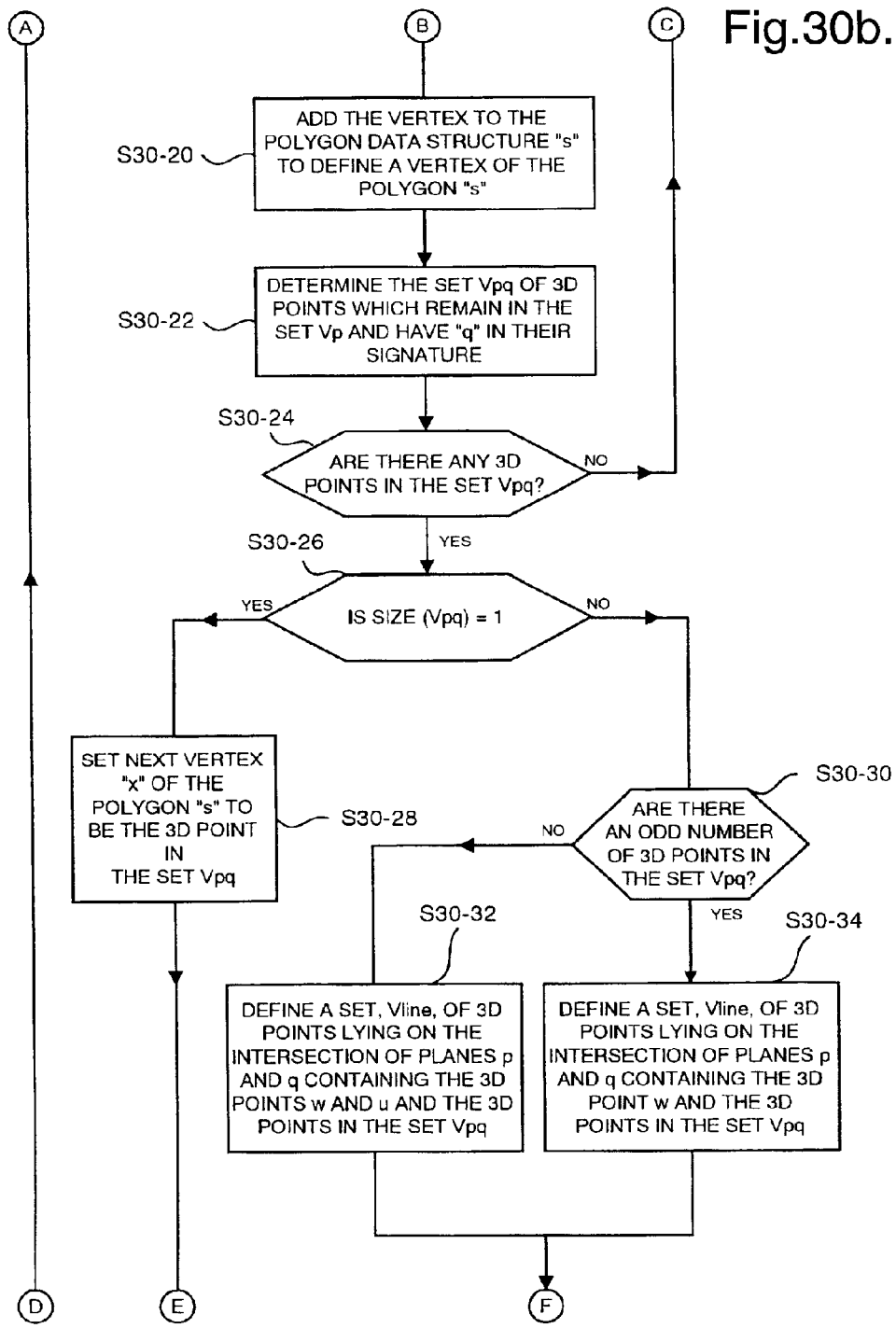

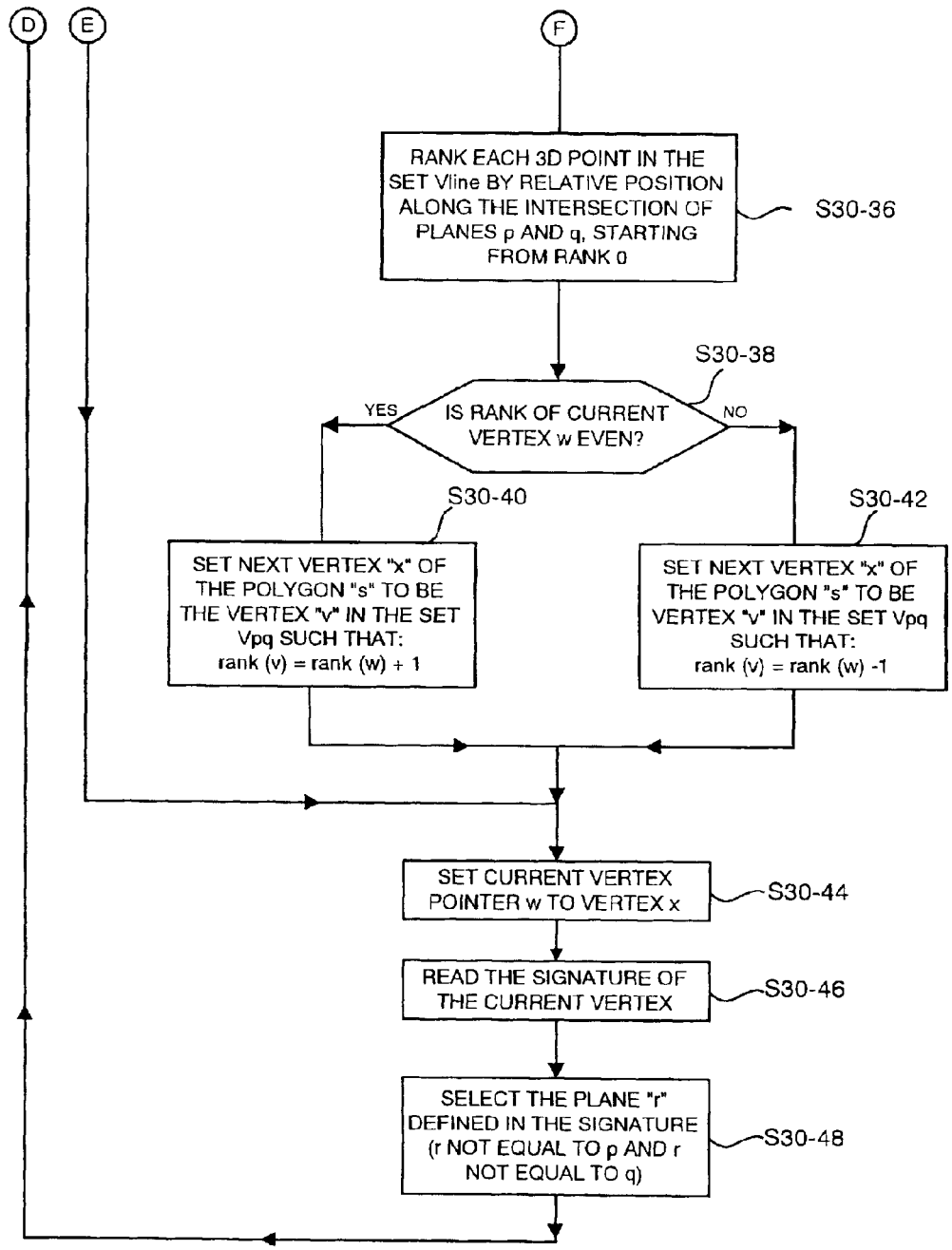

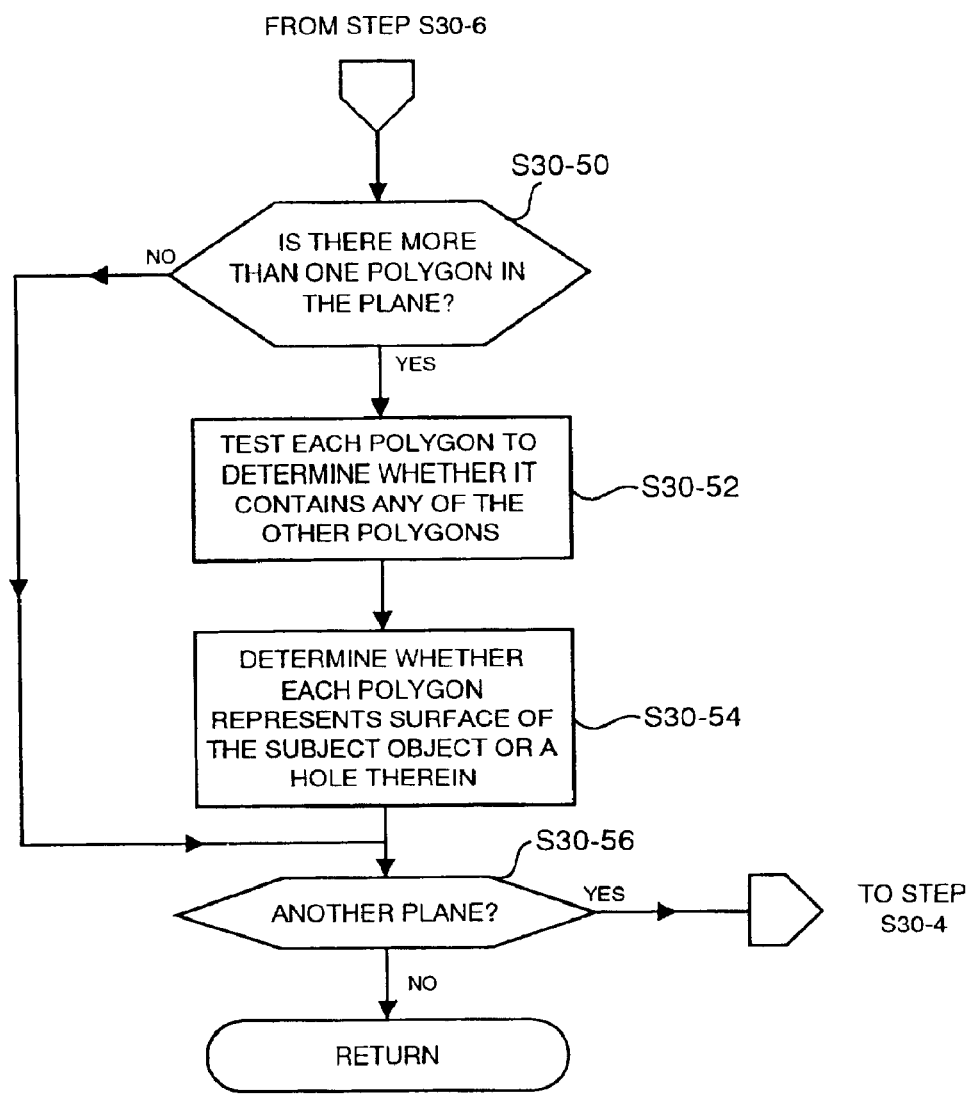

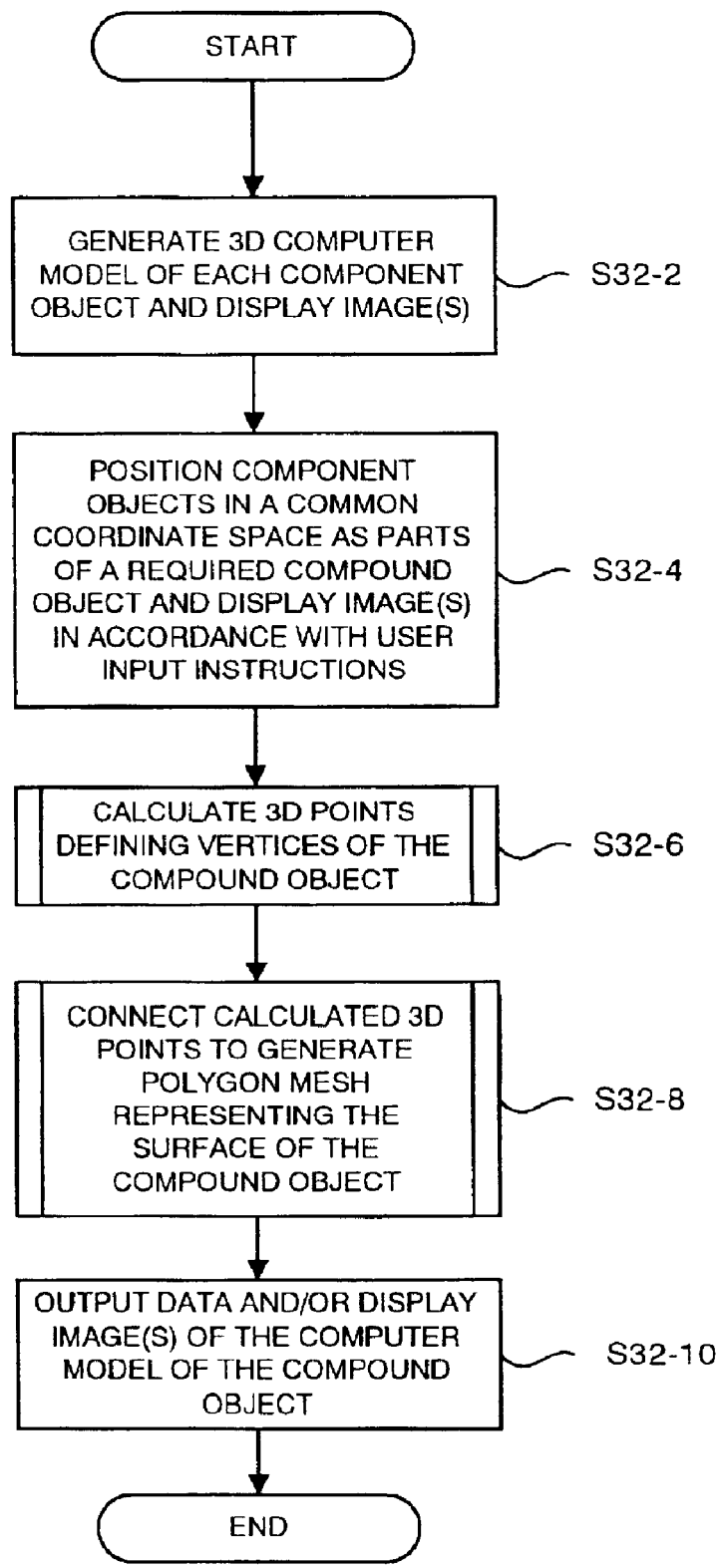

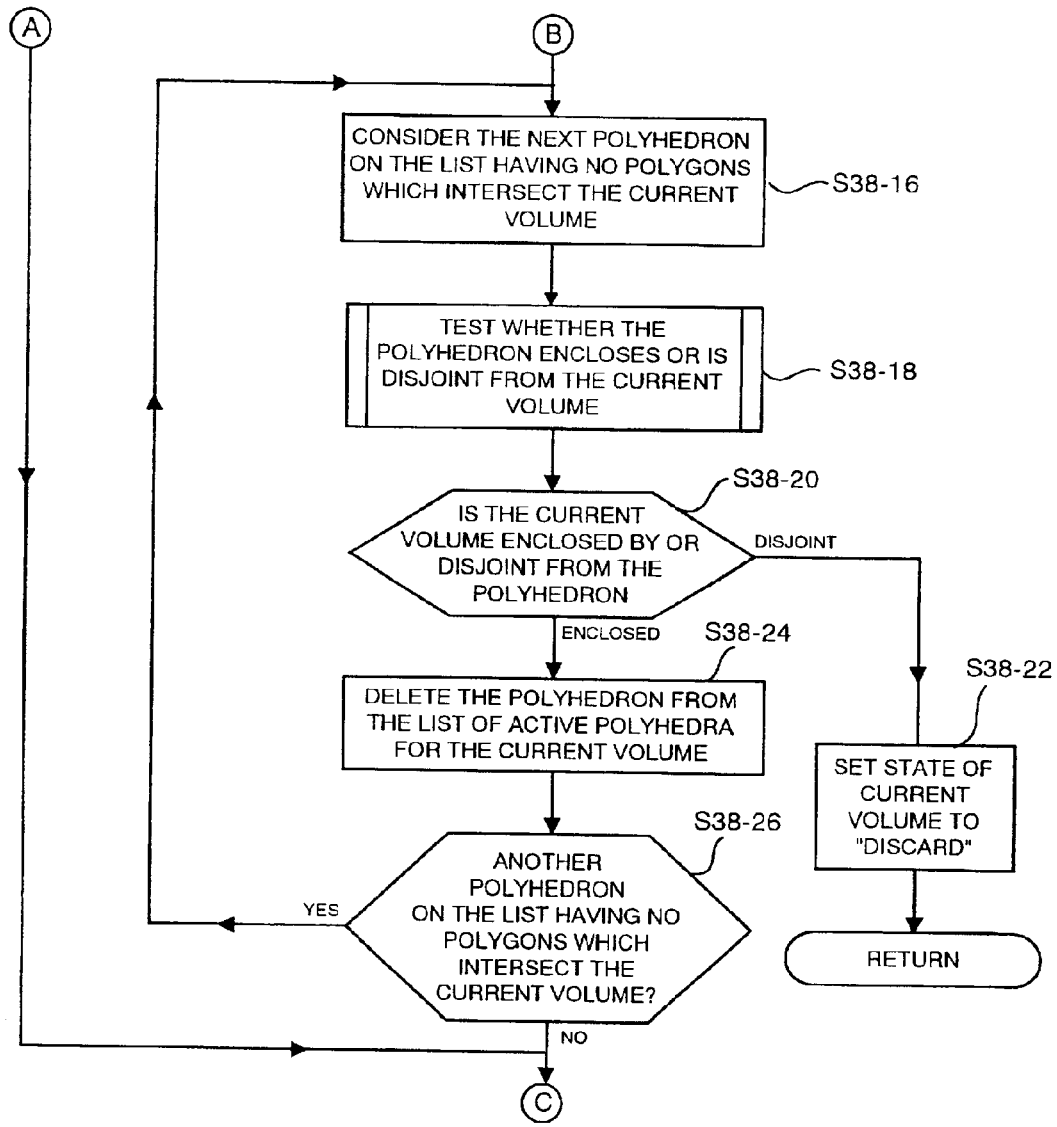

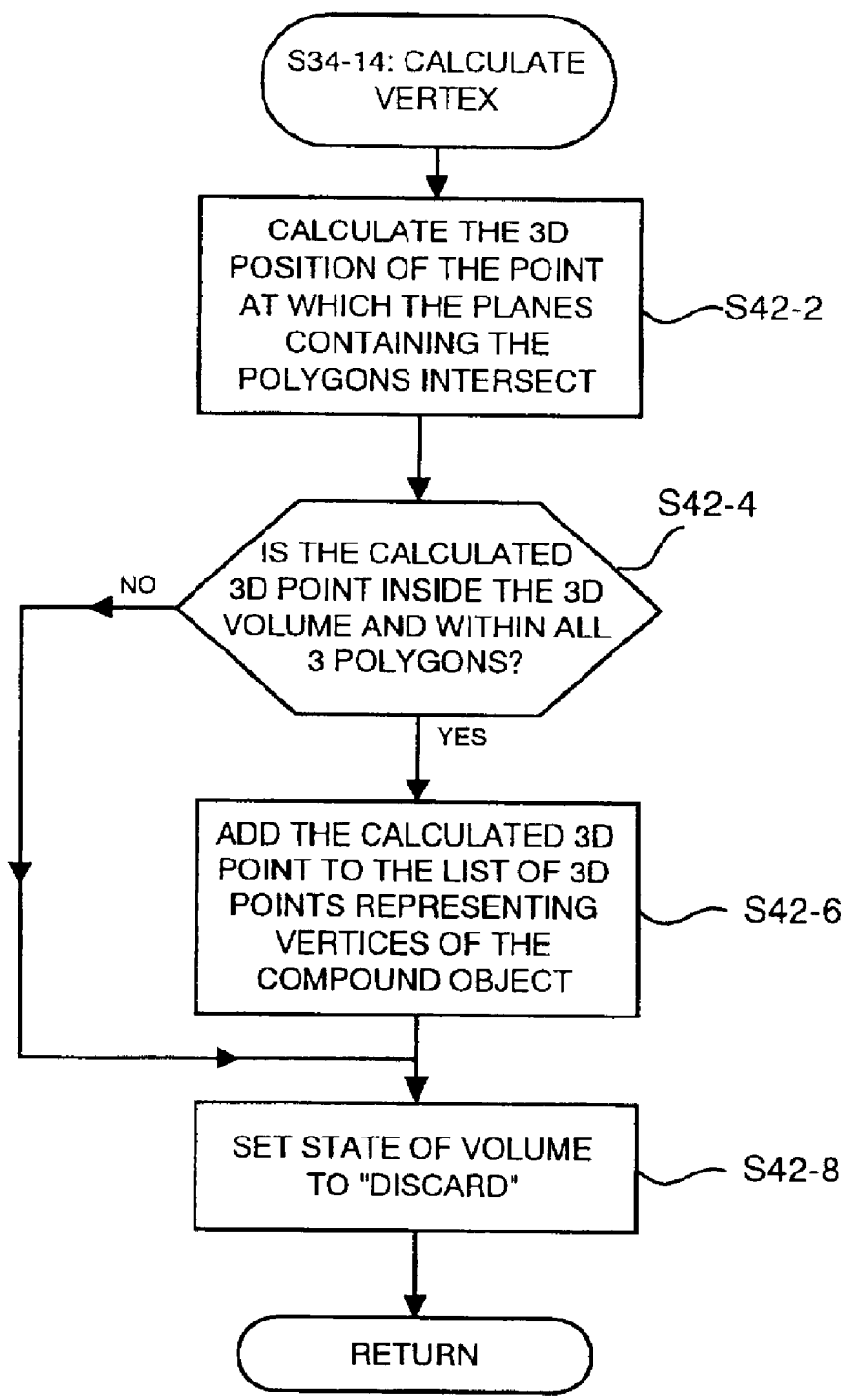

3D COMPUTER MODELLING APPARATUS

The present invention relates to computer processing to generate a three-dimensional (3D) computer model of an object, and more particularly to computer processing to generate a 3D computer model by calculating the intersections of polyhedra, each of which defines a volume of 3D space containing at least part of the object.

Many methods are known for generating a 3D computer model of an object.

The known methods include "shape-from-silhouette" methods, which generate a 3D computer model by processing images of an object recorded at known positions and orientations to back project the silhouette of the object in each image to give a respective endless cone containing the object and having its appex at the position of the focal point of the camera when the image was recorded. Each cone therefore constrains the volume of 3D space occupied by the object, and the intersection of the cones, which approximates the object, is calculated.

Examples of shape-from-silhouette methods are described, for example, in "Looking to build a model world: automatic construction of static object models using computer vision" by Illingworth and Hilton in Electronics and Communication Engineering Journal, June 1998, pages 103–113, and "Automatic reconstruction of 3D objects using a mobile camera" by Niem in Image and Vision Computing 17 (1999) pages 125–134. The methods described in both of these papers, however, calculate the intersections of the silhouette cones to generate a "volume representation" of the object made up of a plurality of voxels (cuboids). More particularly, 3D space is divided into voxels, and the voxels are tested to determine which ones lie inside the volume defined by the intersection of the silhouette cones. Voxels inside the intersection volume are retained to define a volume of voxels representing the object.

Such voxel techniques suffer from a number of problems, however. In particular, the accuracy and resolution of the resulting volume representation of the object is determined by the size of the voxels into which the 3D space is divided, and therefore reducing the size of the voxels to increase the model resolution significantly increases the number of voxels needing to be tested, resulting in long processing times. In addition, the voxel representation needs to be converted into a surface model comprising a plurality of polygons because most computer graphics rendering algorithms cannot render a voxel model to generate an image for display to a user. Such conversion requires further processing resources and time, and can also reduce the resolution and accuracy of the resulting computer model.

"A Volumetric Intersection Algorithm for 3d-Reconstruction Using a Boundary-Representation" by Martin Löhlein at http://i31www.ira.uka.de/diplomarbeiten/da_martin_loehlein/Reconstruction.html discloses a shape-from-silhouette method of generating a 3D computer model which does not result in a voxel representation. Instead, the intersections of the silhouette cones from a plurality of images are calculated directly. More particularly, the method starts with a cube containing the object, and intersects it with the first silhouette cone to give a first approximation of the object. This approximation is then intersected with the next cone and so on. To intersect a silhouette cone with an approximation, the cone and the approximation are projected into the image from which the cone was taken. This reduces the cone to the 2d-polygon (silhouette) from which it was made and the approximation from 3d-polygons to 2d-polygons. The cone polygon is then intersected with all the approximation's polygons using a conventional algorithm for 2d-polygon intersection.

The method described in "A Volumetric Intersection Algorithm for 3d-Reconstruction Using a Boundary-Representation" is, however, inefficient in terms of processing resources and processing time. The inventors in the present application have realised that one particular reason for this problem is the incremental approach of intersecting a silhouette cone with a representation to generate a refined representation comprising connected 3D points defining planar faces, then intersecting the refined representation with another silhouette cone, and so on.

"An Algorithm for Determining the Intersection of Two Simple Polyhedra" by M. Szilvasi-Nagy in Computer Graphics Forum 3 (1984) pages 219–225 discloses a method for calculating the intersection of two simple polyhedra, such as a tetrahedron and a prism, by using a "plane-sweep algorithm" to find all intersections of the edges of each polyhedron with the faces of the other. While this method is useful for two polyhedra, each having a small number of faces, it would be extremely inefficient in terms of computing resources and time for three or more polyhedra and/or polyhedra with large numbers of faces.

The present invention has been made with the above problems in mind, and aims to address one or more of the problems.

According to the present invention, there is provided a computer processing method and apparatus for generating a non-voxel representation of an object by intersecting at least three polyhedra. The points of intersection of the planar faces making up the polyhedra are calculated and tested to determine which points correspond to object points. Each object point is labelled with the planar faces which meet thereat. Thereafter, when all object points have been identified, connections between the object points are specified in dependence upon the labels.

In this way, by calculating all of the object points before determining the connections therebetween, the processing to determine the connections needs to be performed only once, with consequential savings in processing resources and/or time. This is made possible by labelling each object point based on the planar faces which intersect to generate the point, and calculating which object points should be connected together using their labels.

According to the present invention, there is also provided a computer processing method and apparatus for generating a non-voxel representation of an object by intersecting a plurality of polyhedra. An initial 3D volume in which the object lies is divided into parts, and each part is tested against the polyhedra. If a volume part is outside at least one polyhedron, it is discarded because it cannot contain points representing points on the object surface, otherwise the polyhedra surfaces intersecting the volume are processed to calculate the points of intersection thereof. A 3D computer model comprising the calculated points of intersection is therefore generated.

In this way, all intersections of the polyhedra surfaces do not need to be calculated, because the processing prevents intersections which cannot represent points on the object from being calculated, resulting in savings of processing resources and processing time.

Preferably, the processing is carried out in an even more efficient way by repeatedly subdividing the initial volume, and calculating the intersections of polyhedra surfaces for a volume part only if the volume part is intersected by a small number of polyhedra surfaces. By way of explanation, in an embodiment, each intersection comprises the intersection of three polyhedra surfaces. Therefore, each respective combination of three surfaces which intersect a volume part must be tested to determine if they intersect, resulting in a considerable number of calculations if a volume part is intersected by a large number of polyhedra surfaces, with many of the calculations being wasted because the point of intersection does not represent a point on the object. However, by repeatedly sub-dividing the initial volume, large amounts of the volume can be discarded without having to calculate any intersections, and by calculating intersections only when a sufficiently small volume part has been obtained that it is intersected by a small number of polyhedra surfaces, the number of intersections calculations which actually need to be performed are minimised.

The present invention also provides a computer program product, embodied for example as a storage device or signal, including instructions for causing a programmable processing apparatus to become operable to perform a method as set out above or to become configured as an apparatus as set out above.

Embodiments of the invention will now be described, by way of example only, with reference to the accompanying drawings in which:

FIG. 1 schematically shows the components of a first embodiment of the invention, together with the notional functional processing units into which the processing apparatus component may be thought of as being configured when programmed by programming instructions;

FIG. 3 illustrates images of the object which are input to the processing apparatus in FIG. 1;

Figure 1:
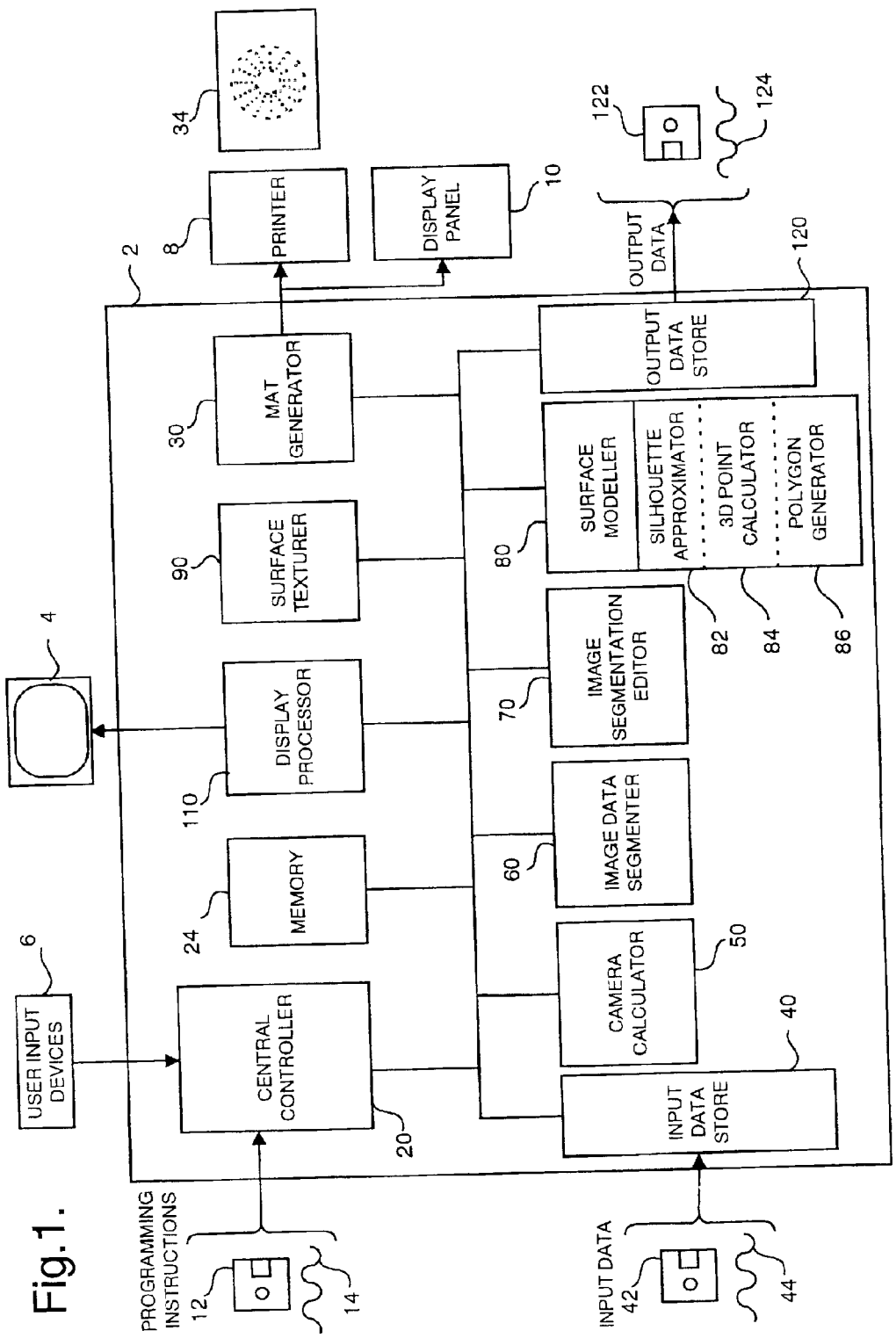
Figure 4A:
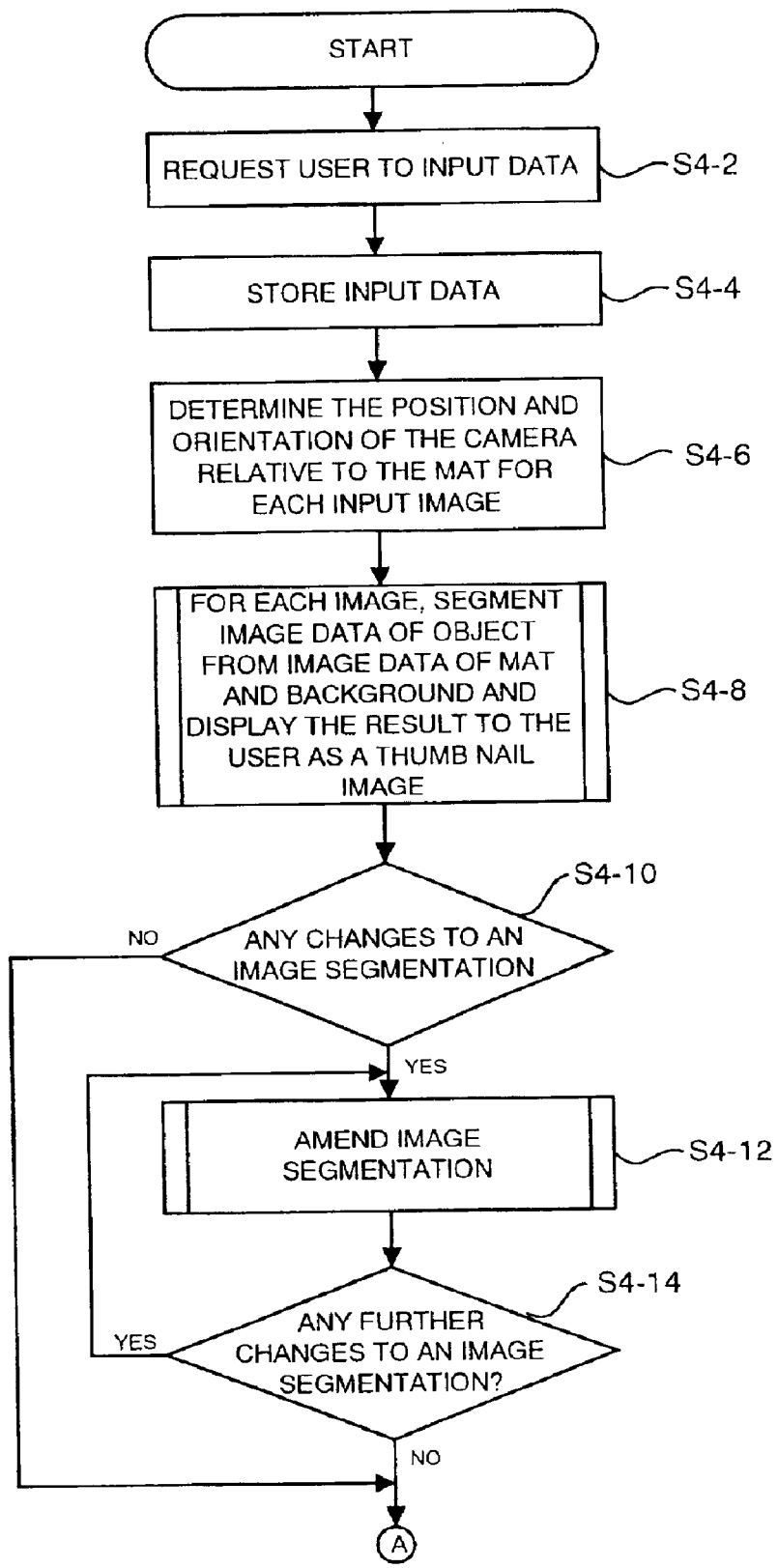
Figure 5A:
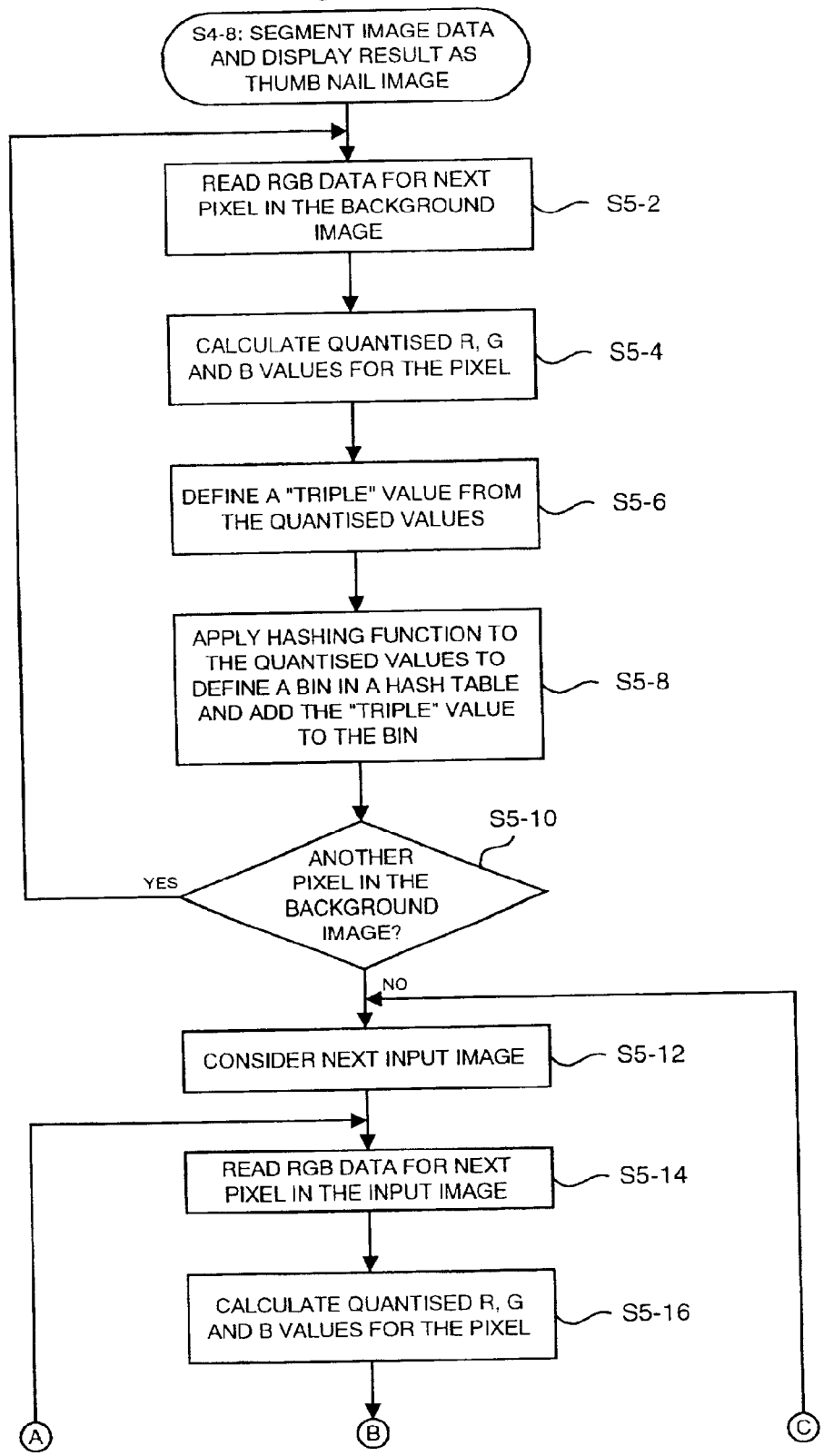
Figure 5B:
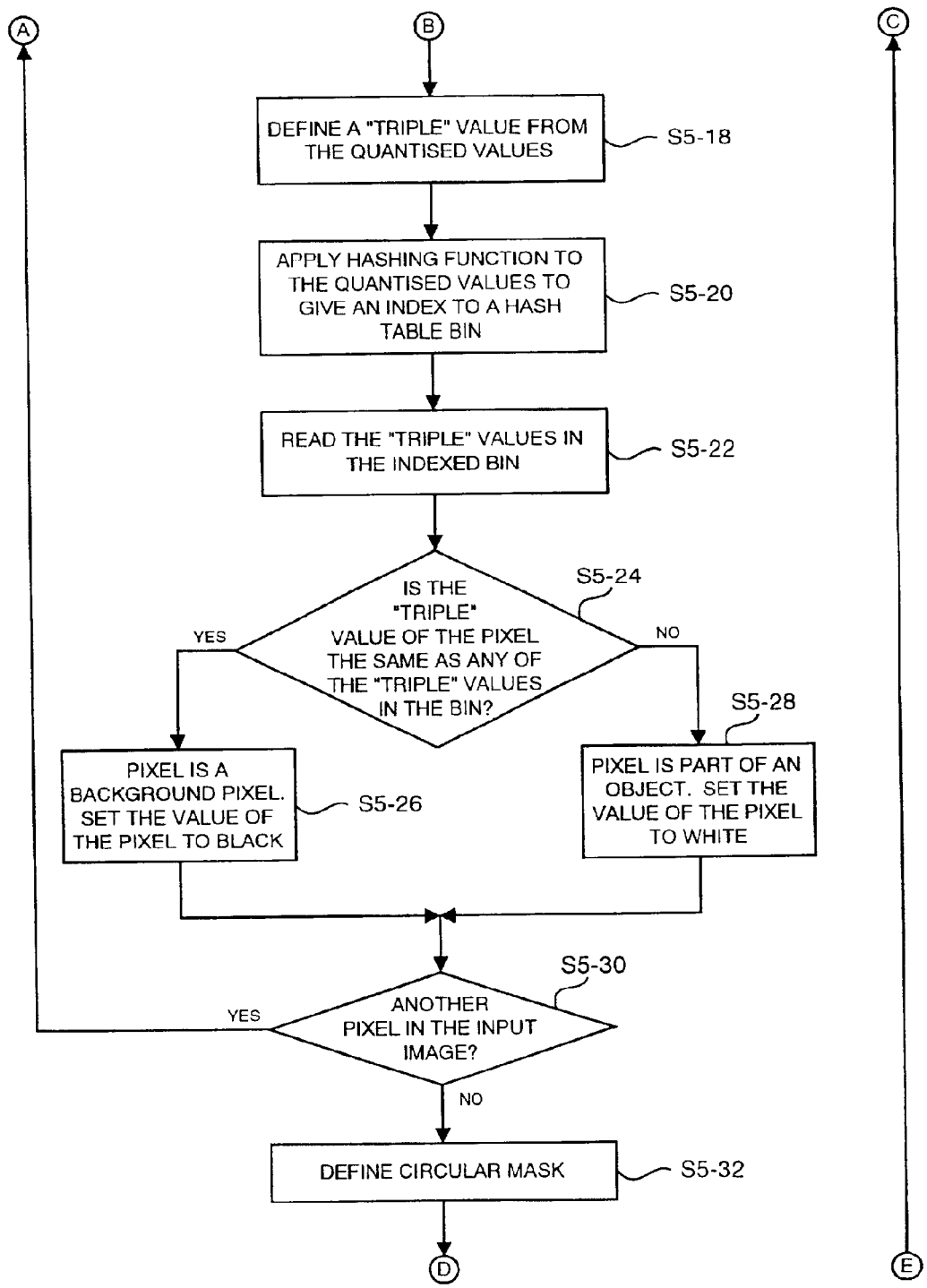
Figure 5C:
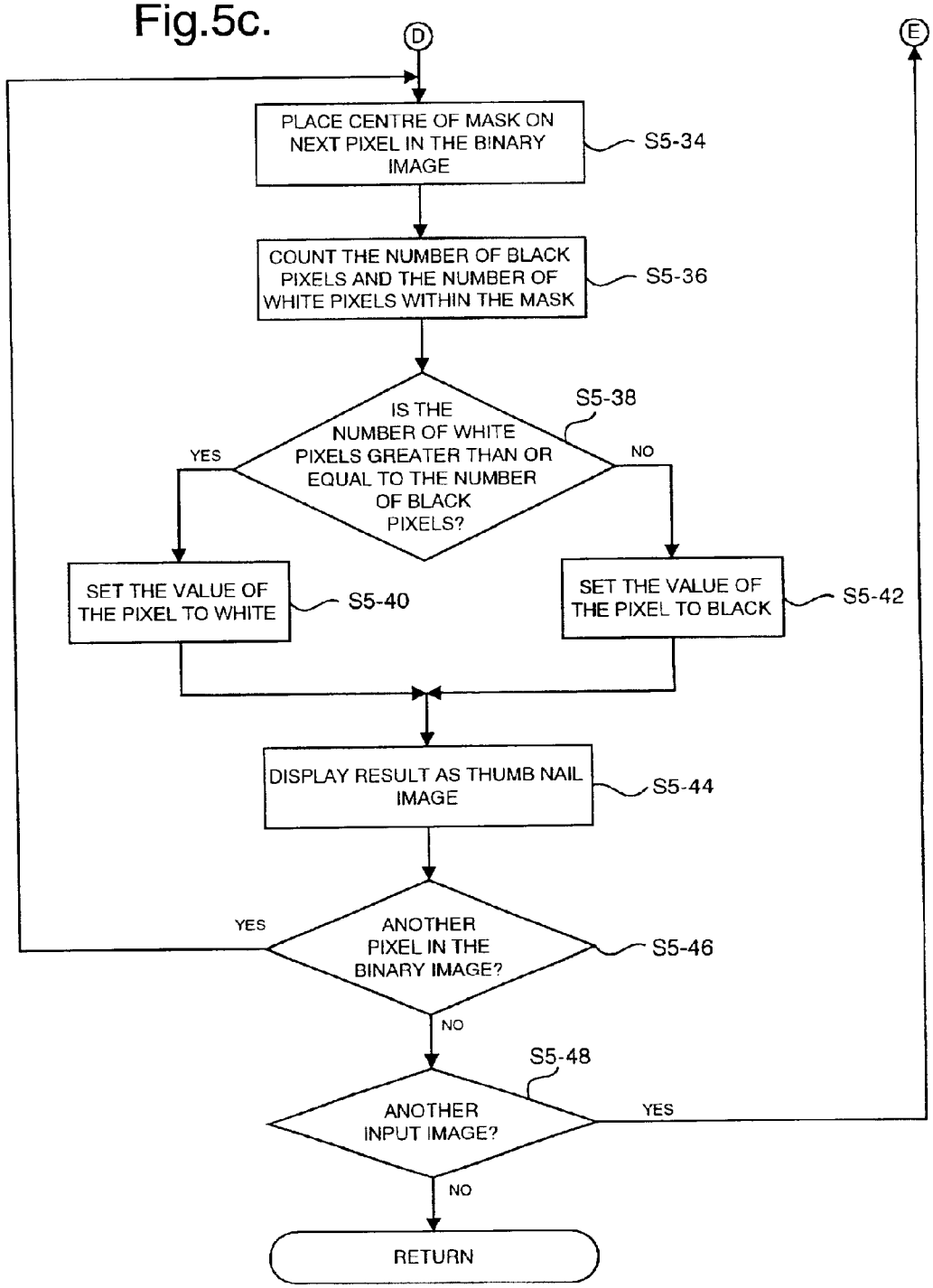
Figure 7:
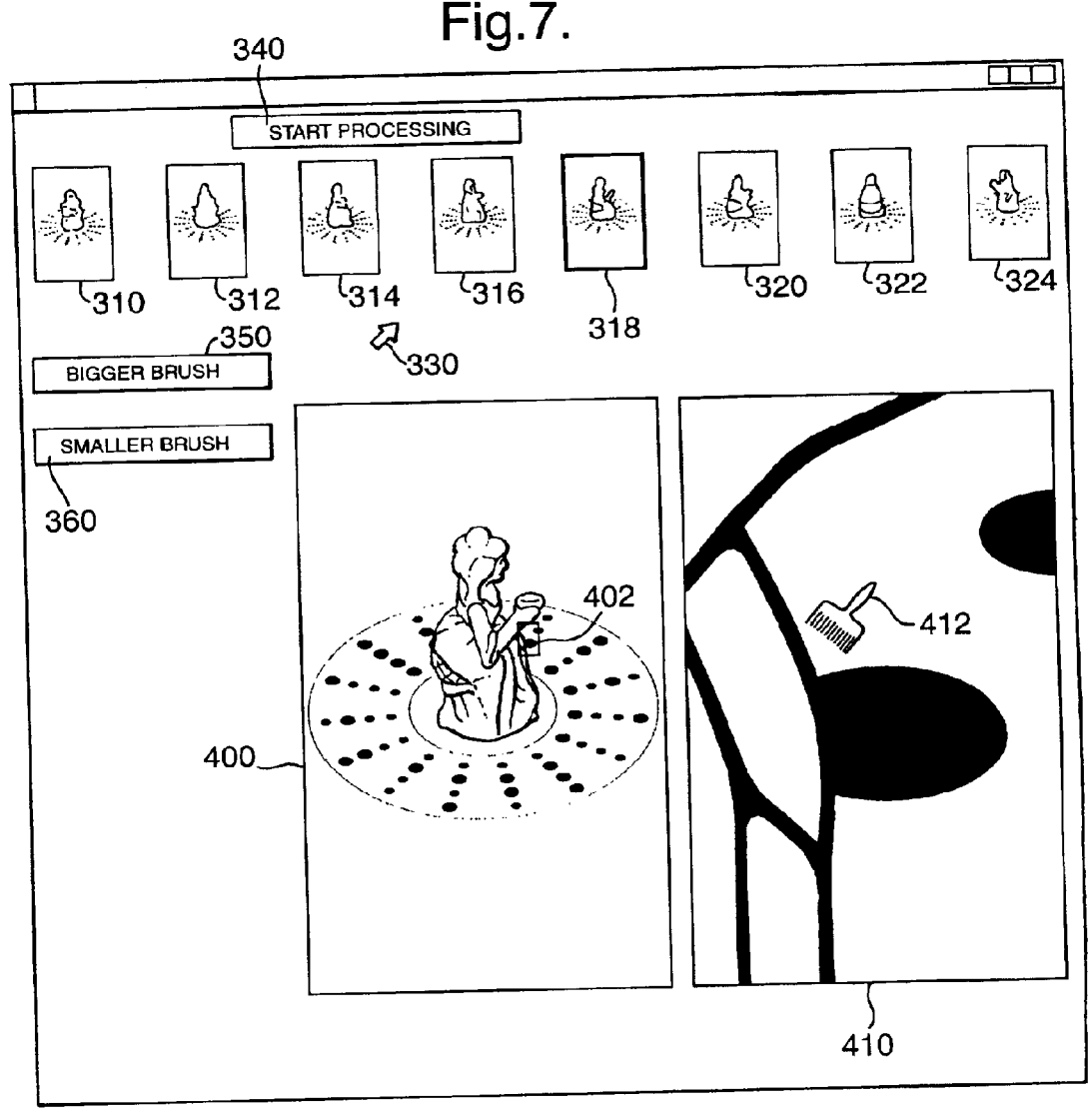
Figure 8:
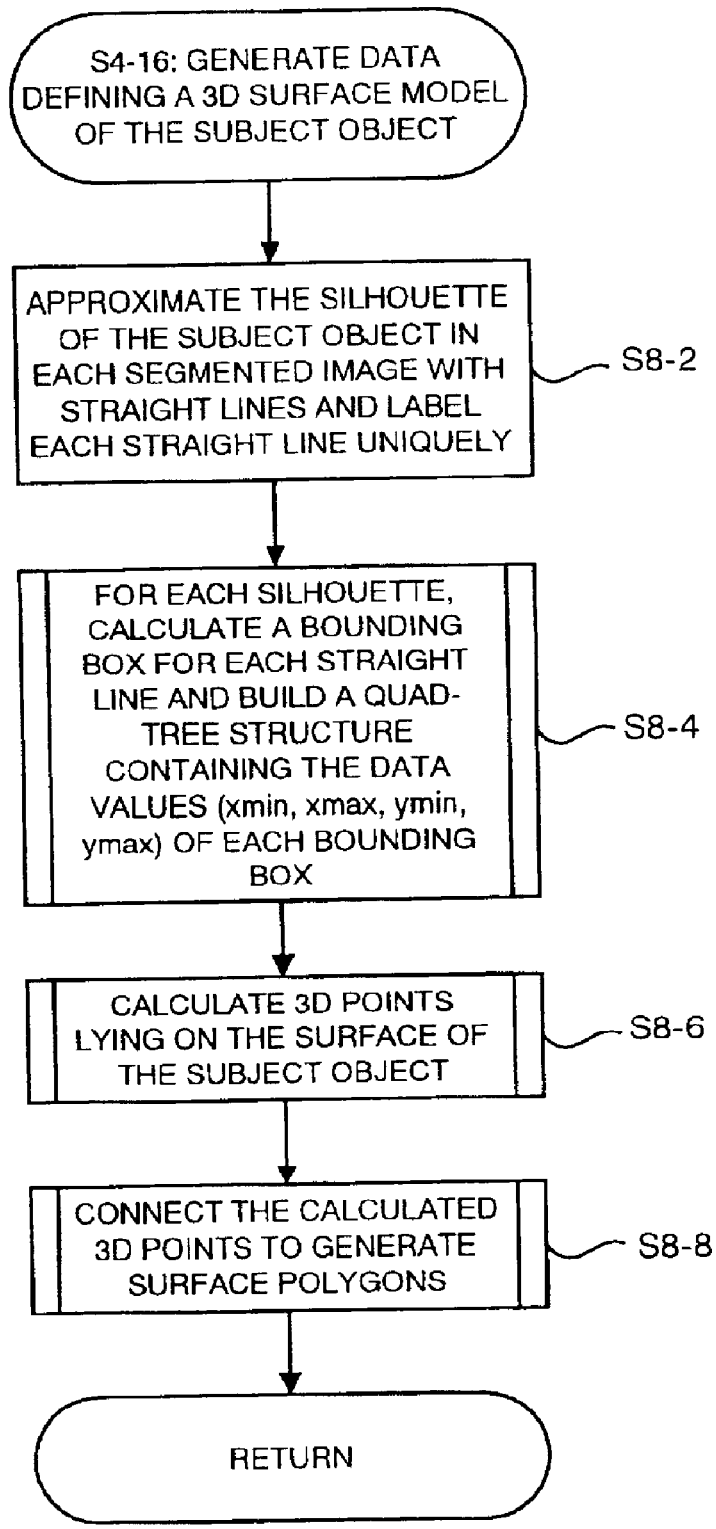
Figure 9:
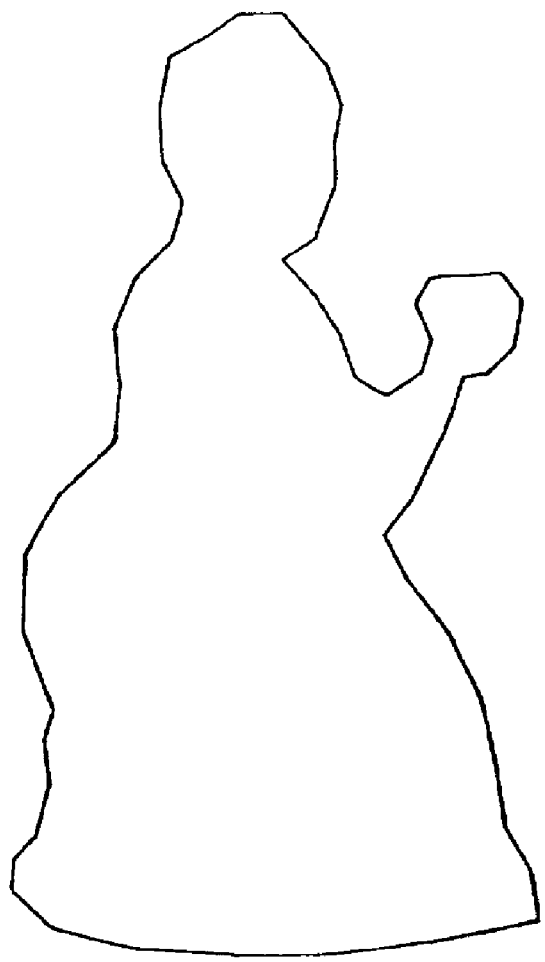
Figure 10:
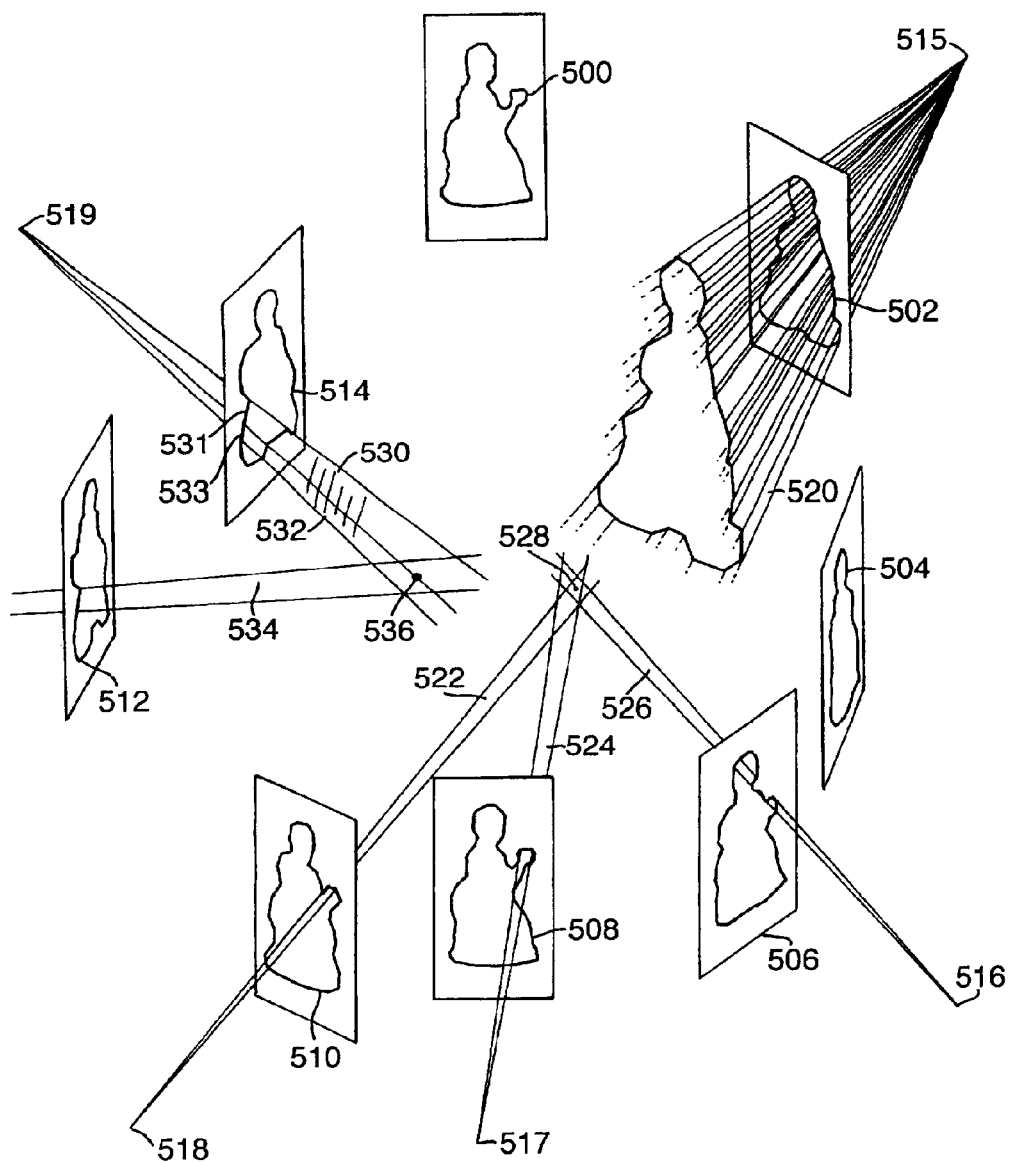
Figure 11A:
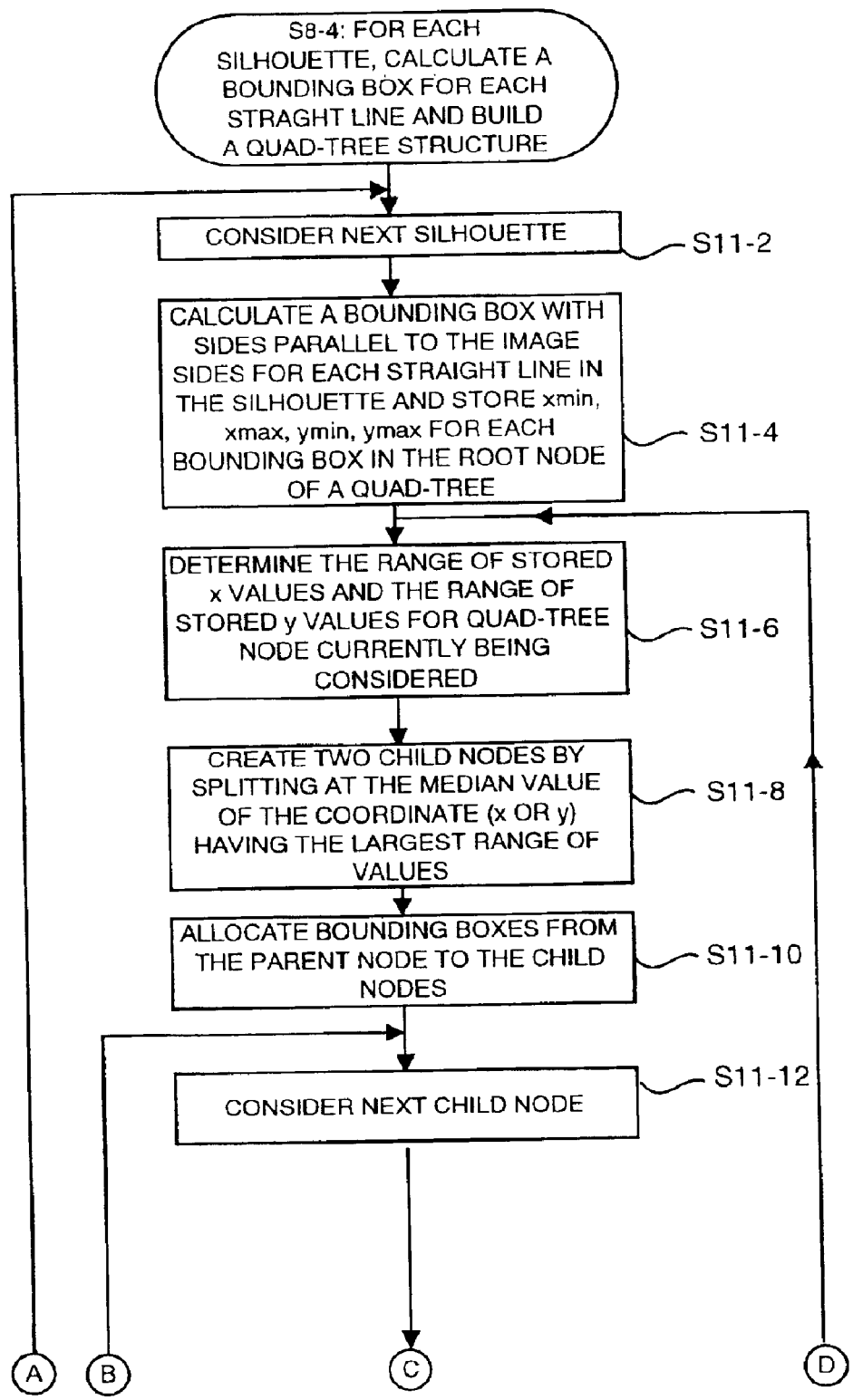
Figure 11B:
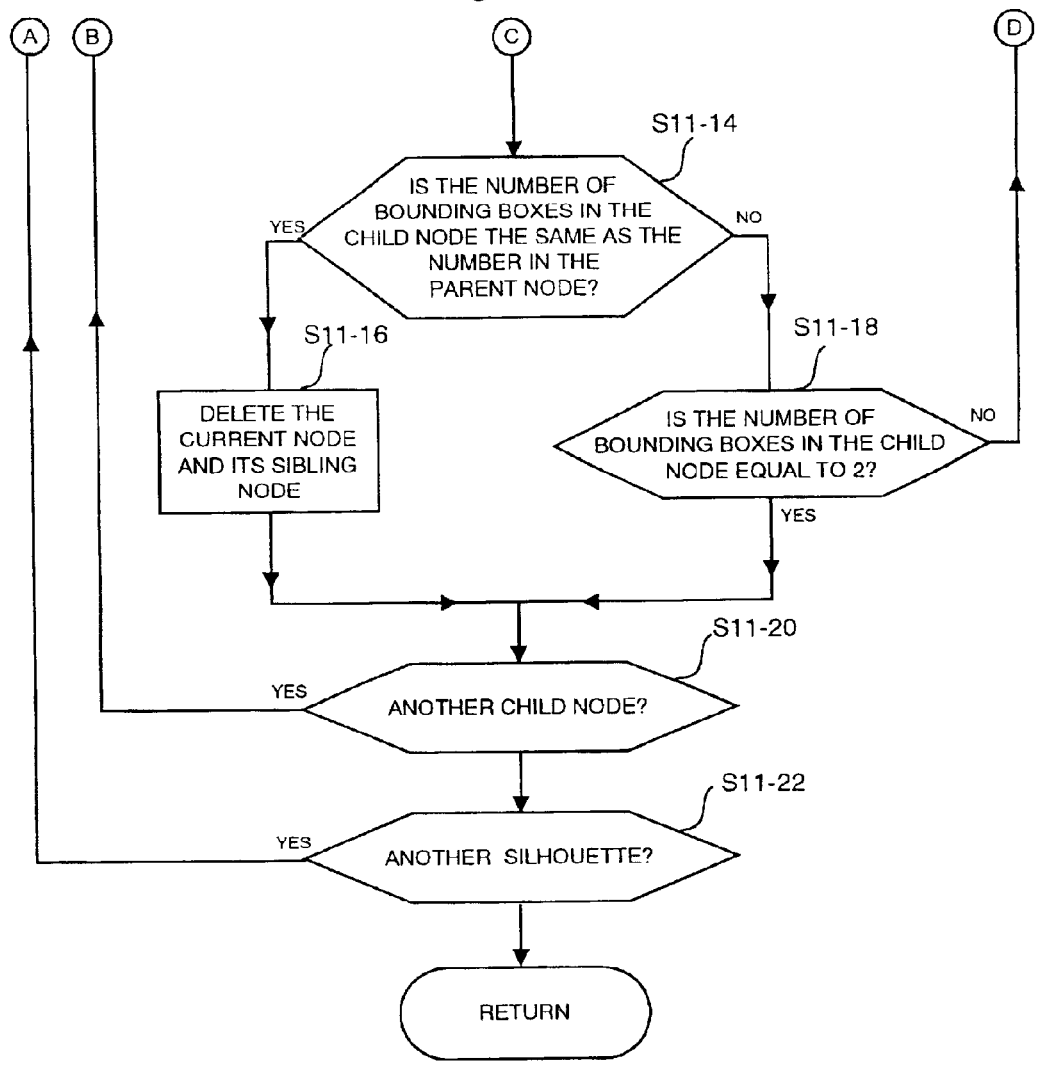
Figure 12:
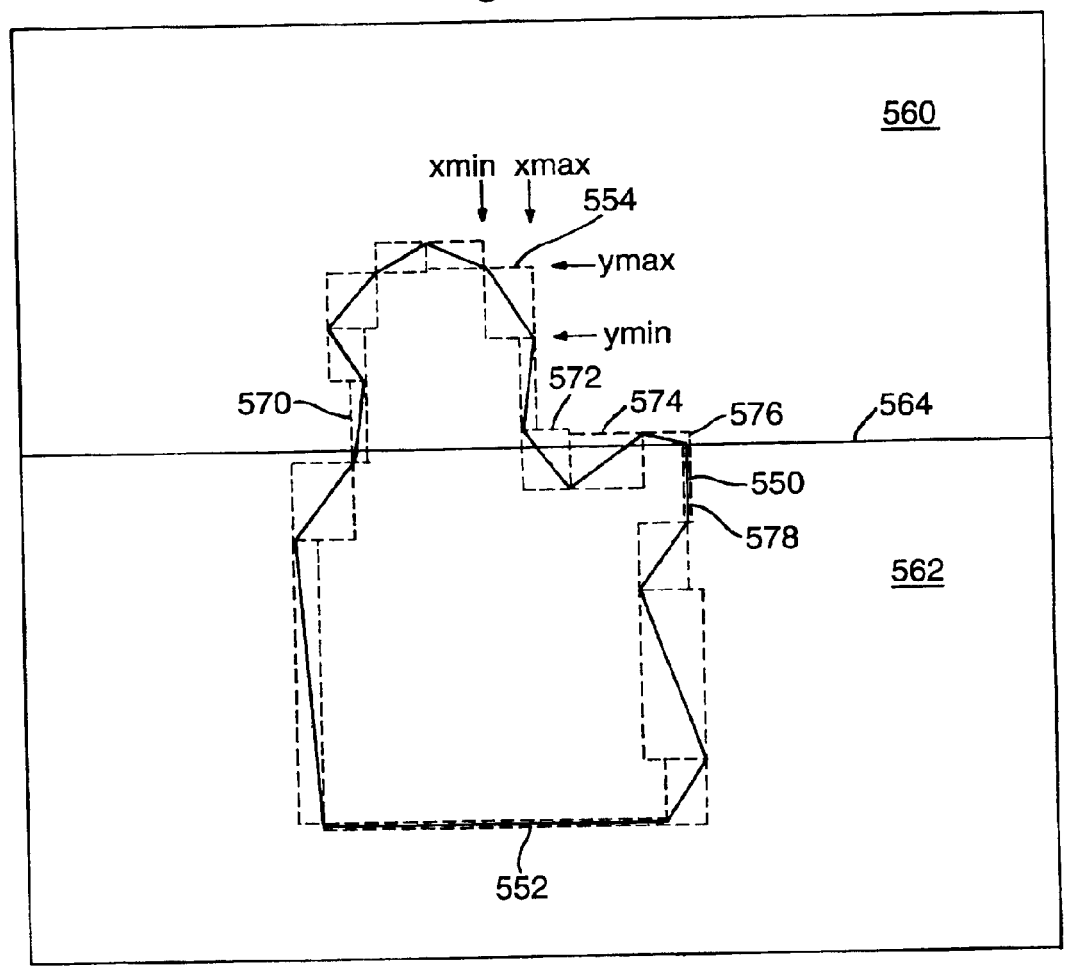
Figure 13:
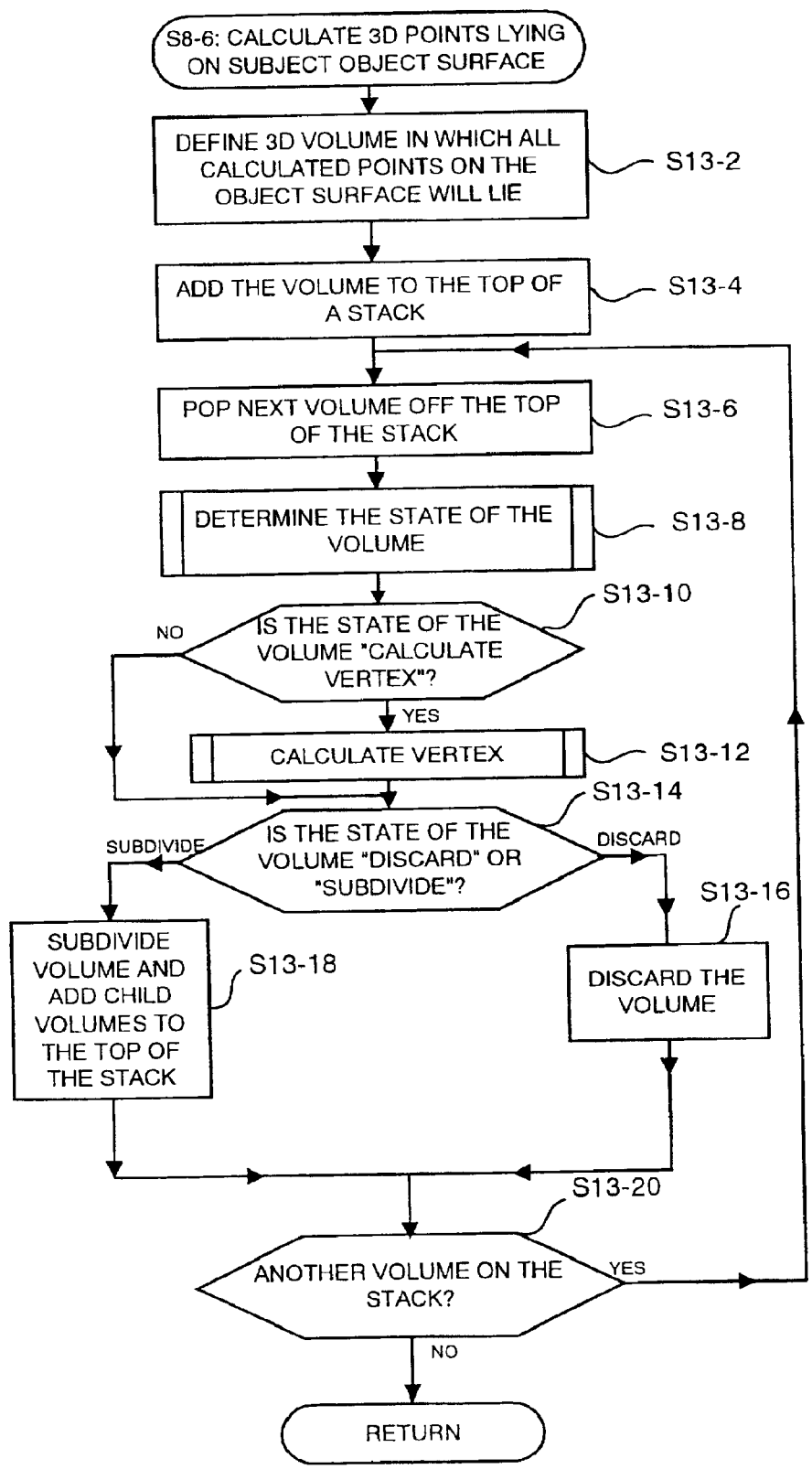
Figure 14B:
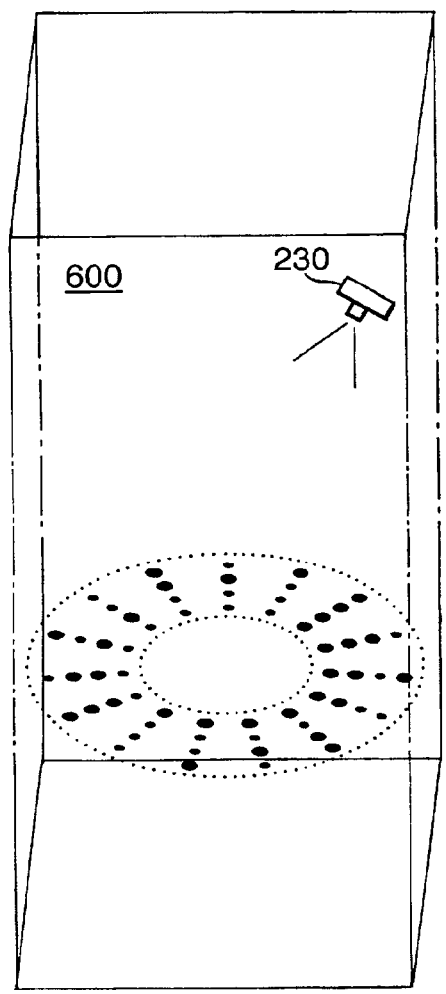
Figure 14C:
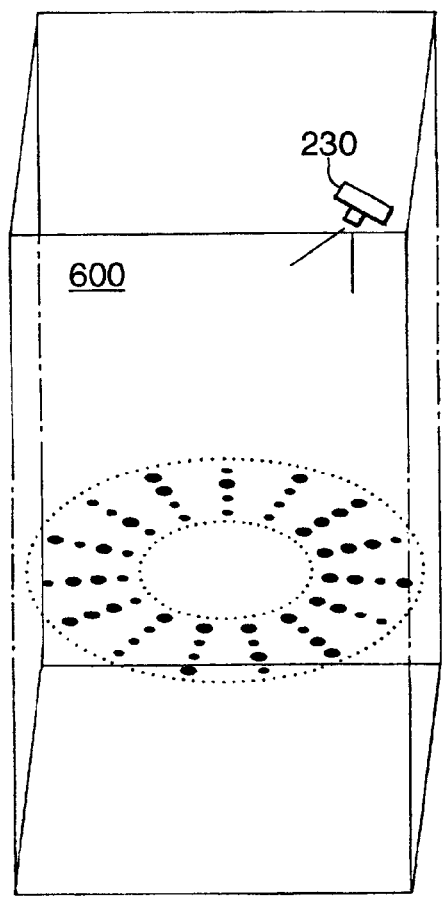
Figure 15B:
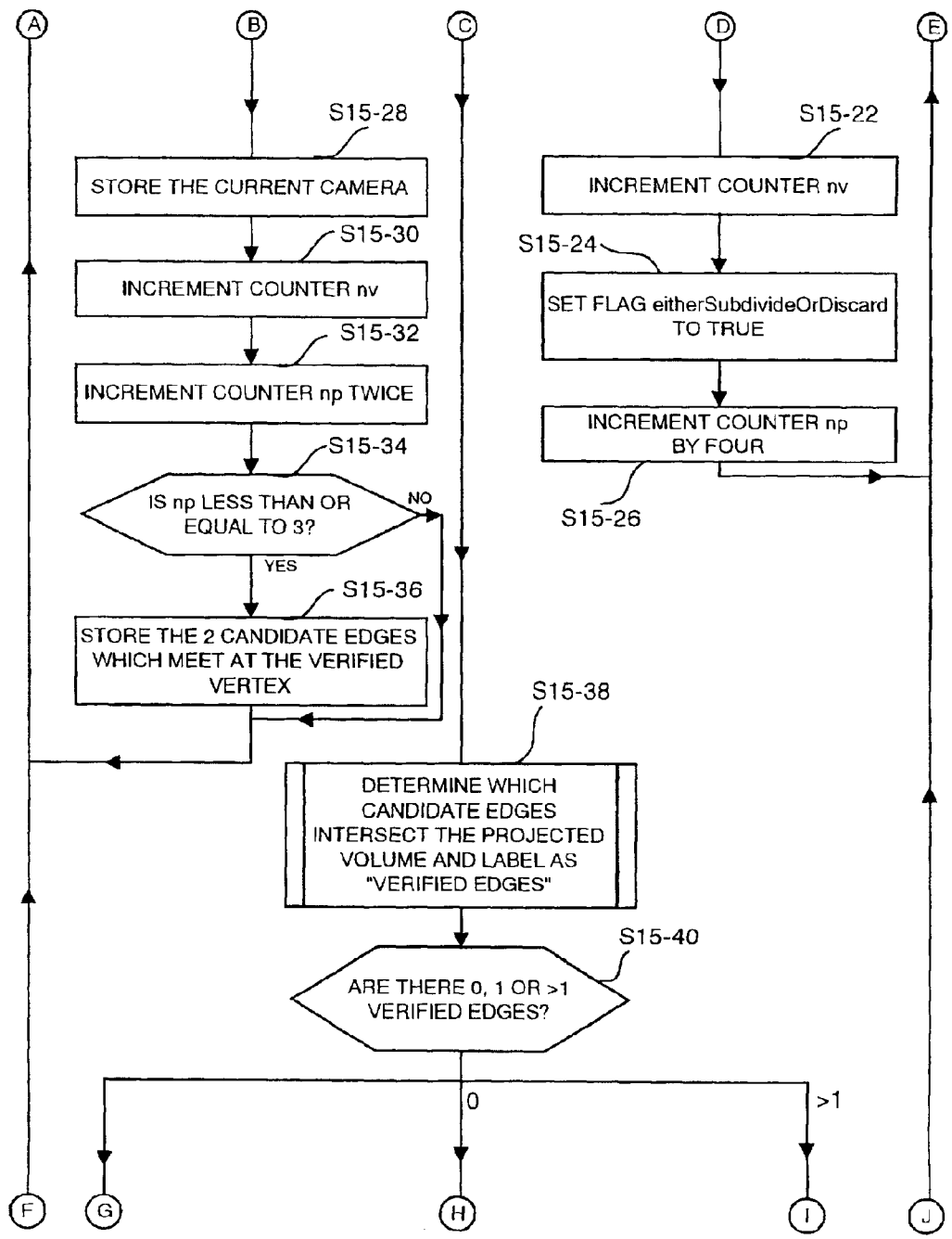
Figure 15C:
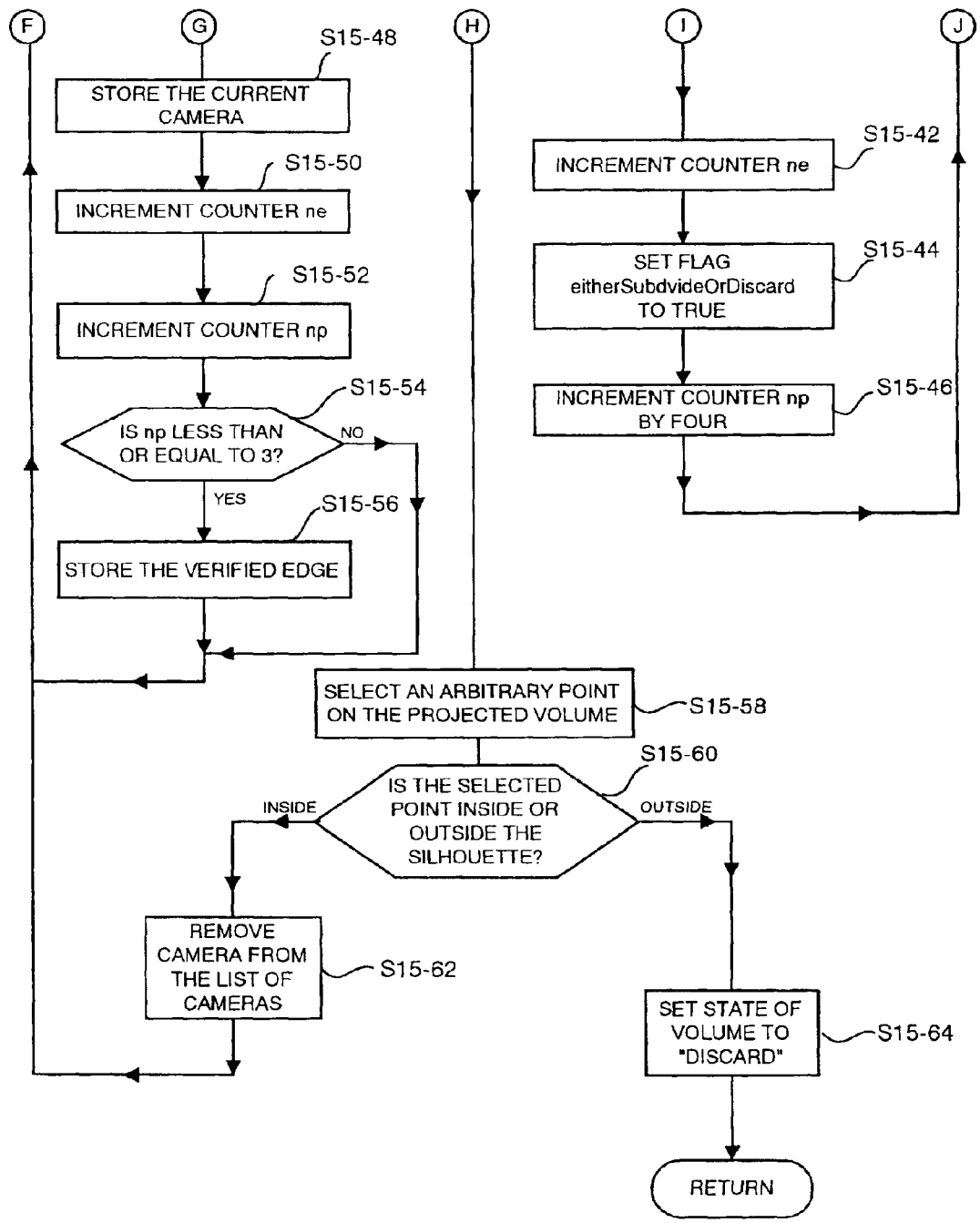
Figure 15D:
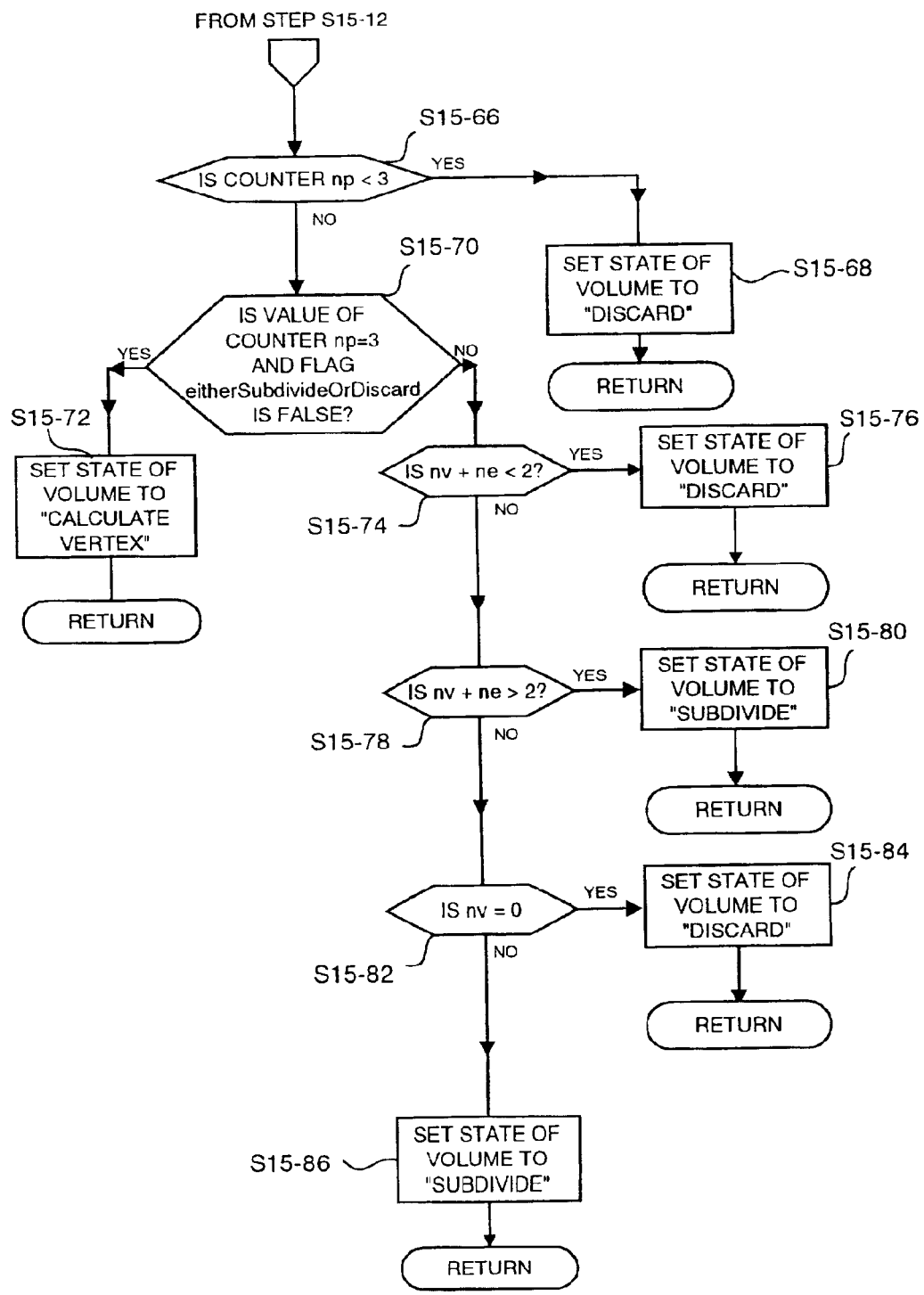
Figure 16:
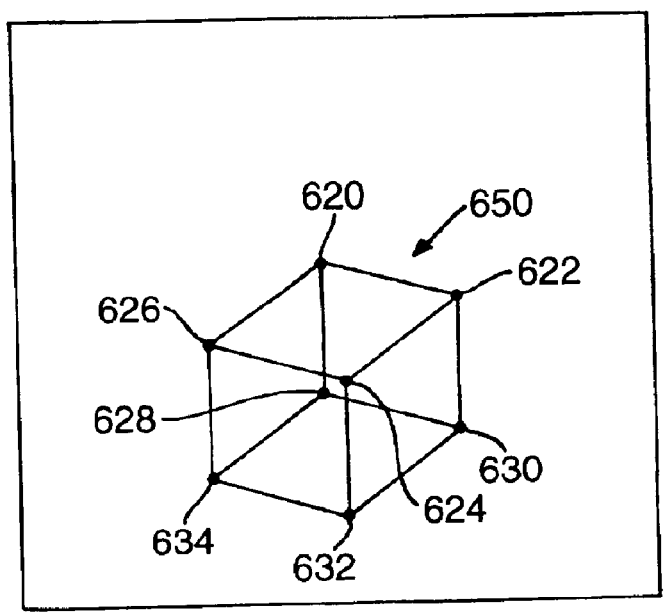
Figure 19:
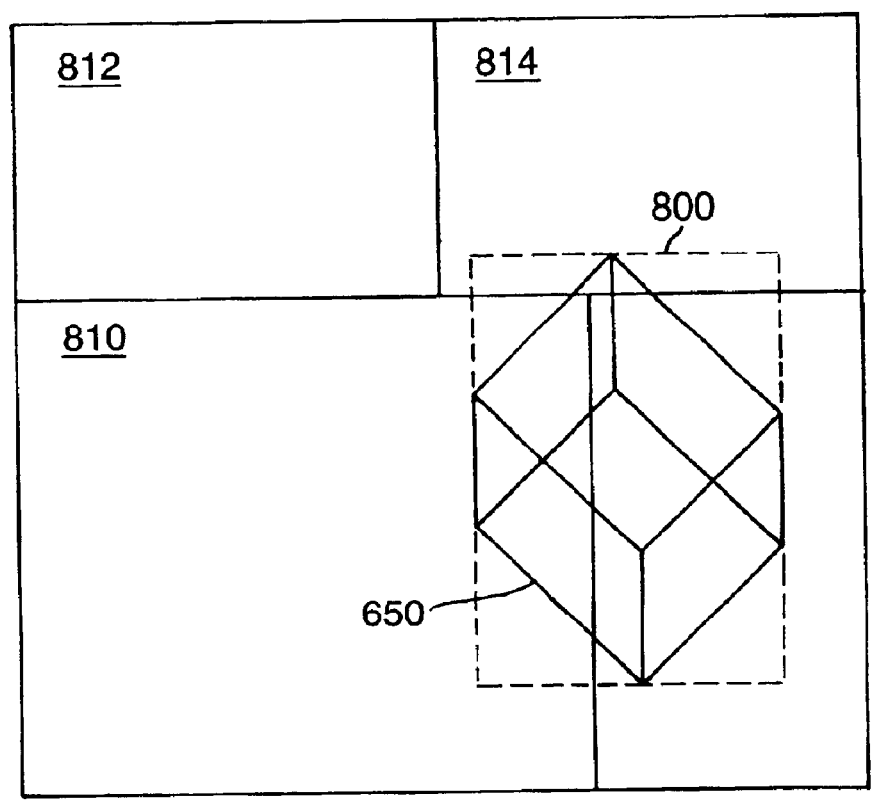
Figure 20:
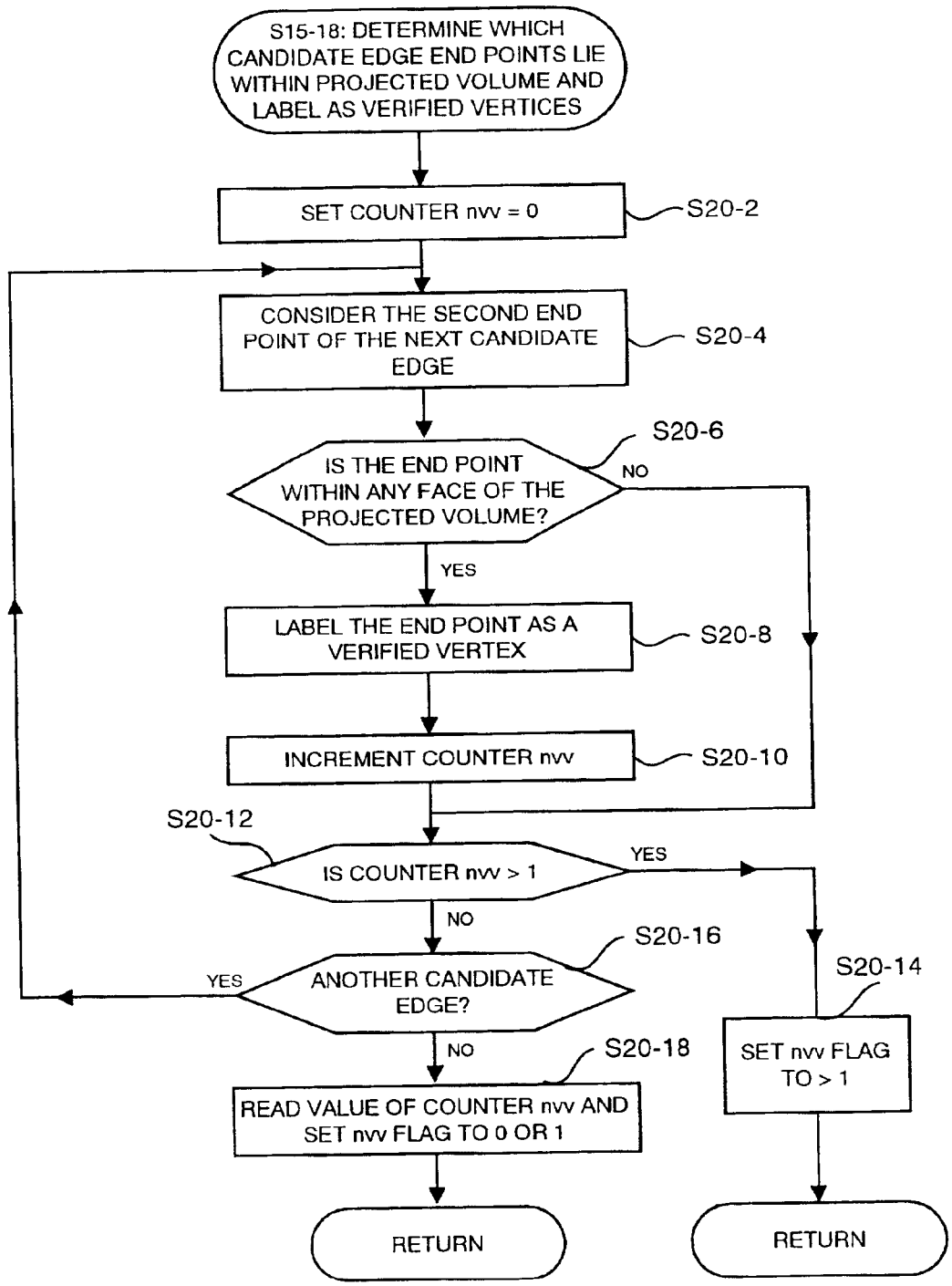
Figure 21:
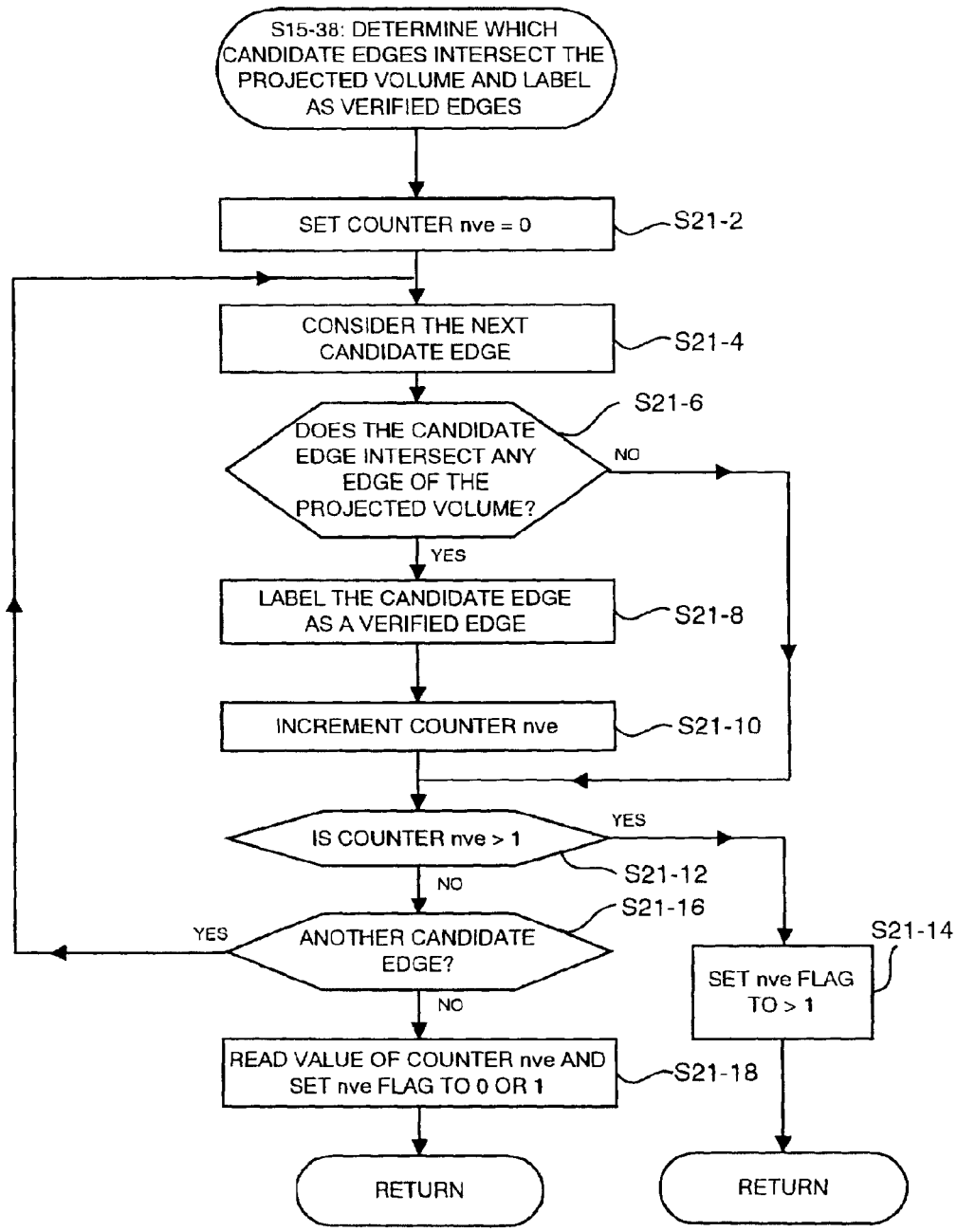
Figure 22:
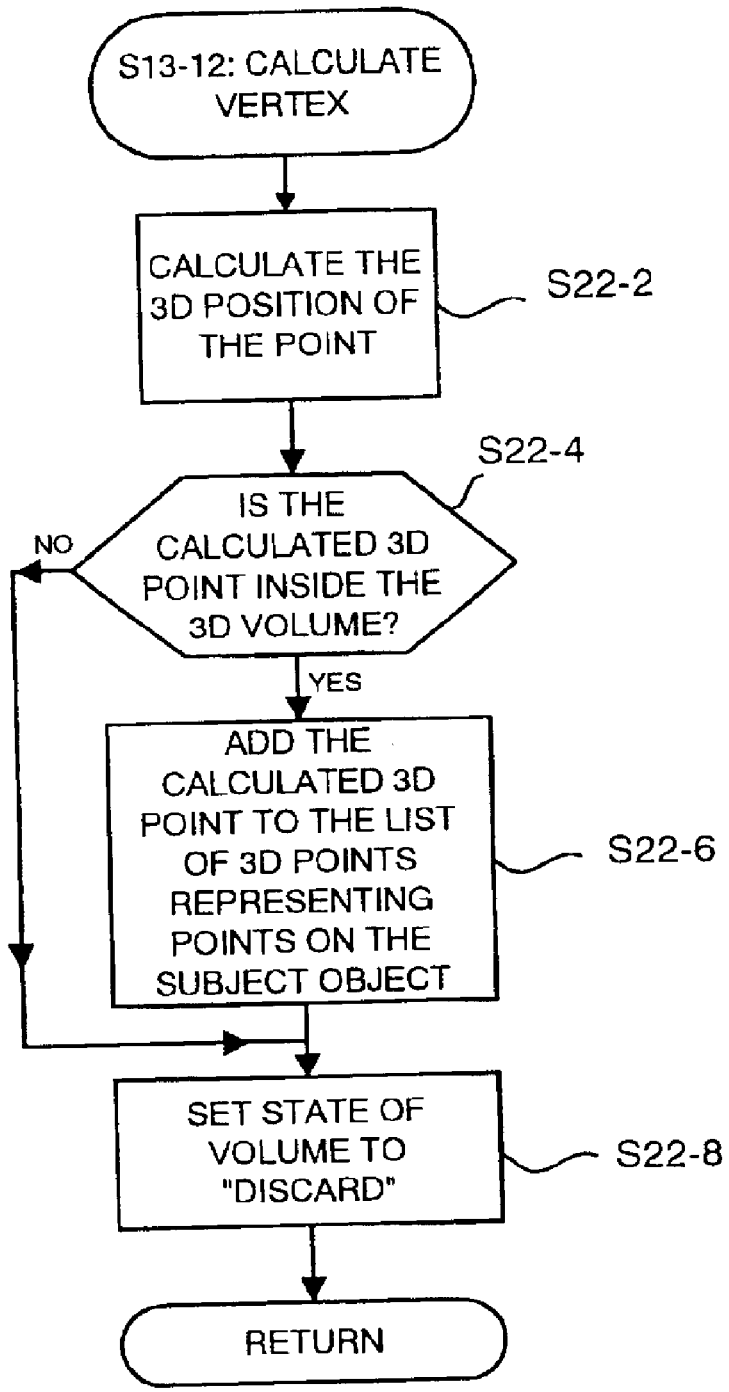
Figure 23:
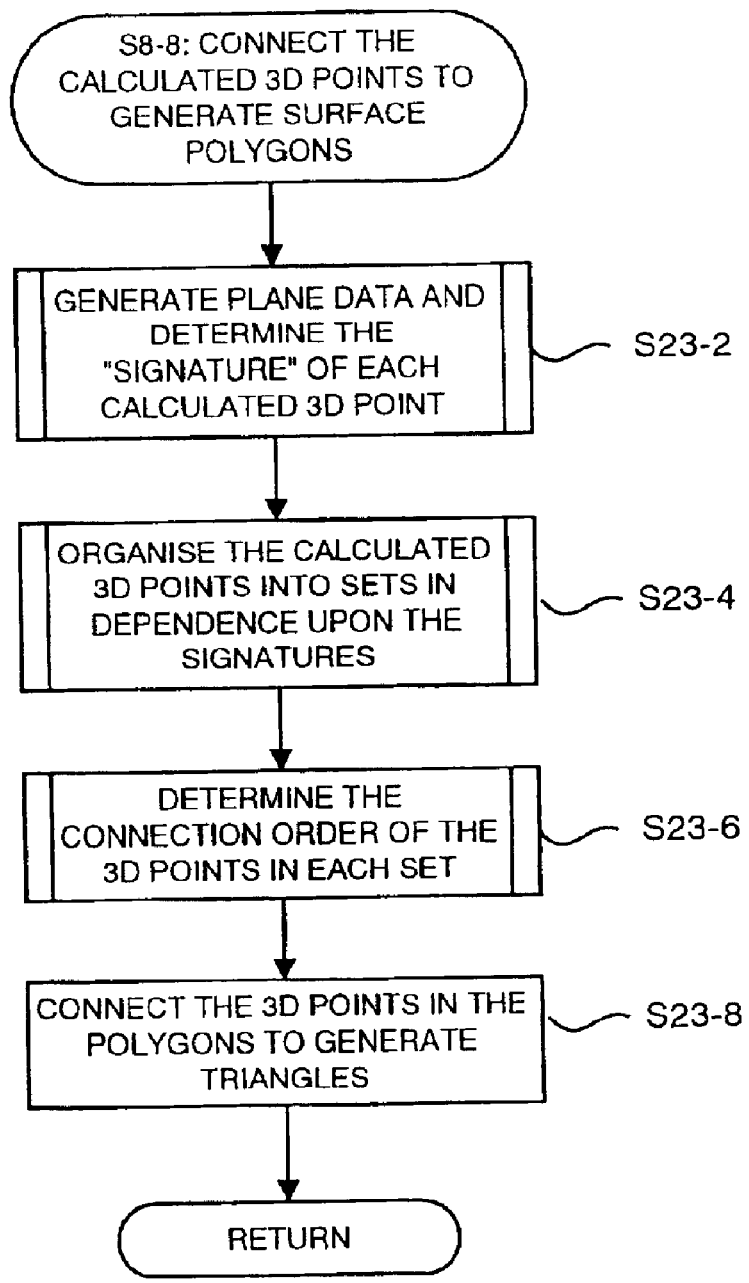
Figure 24:
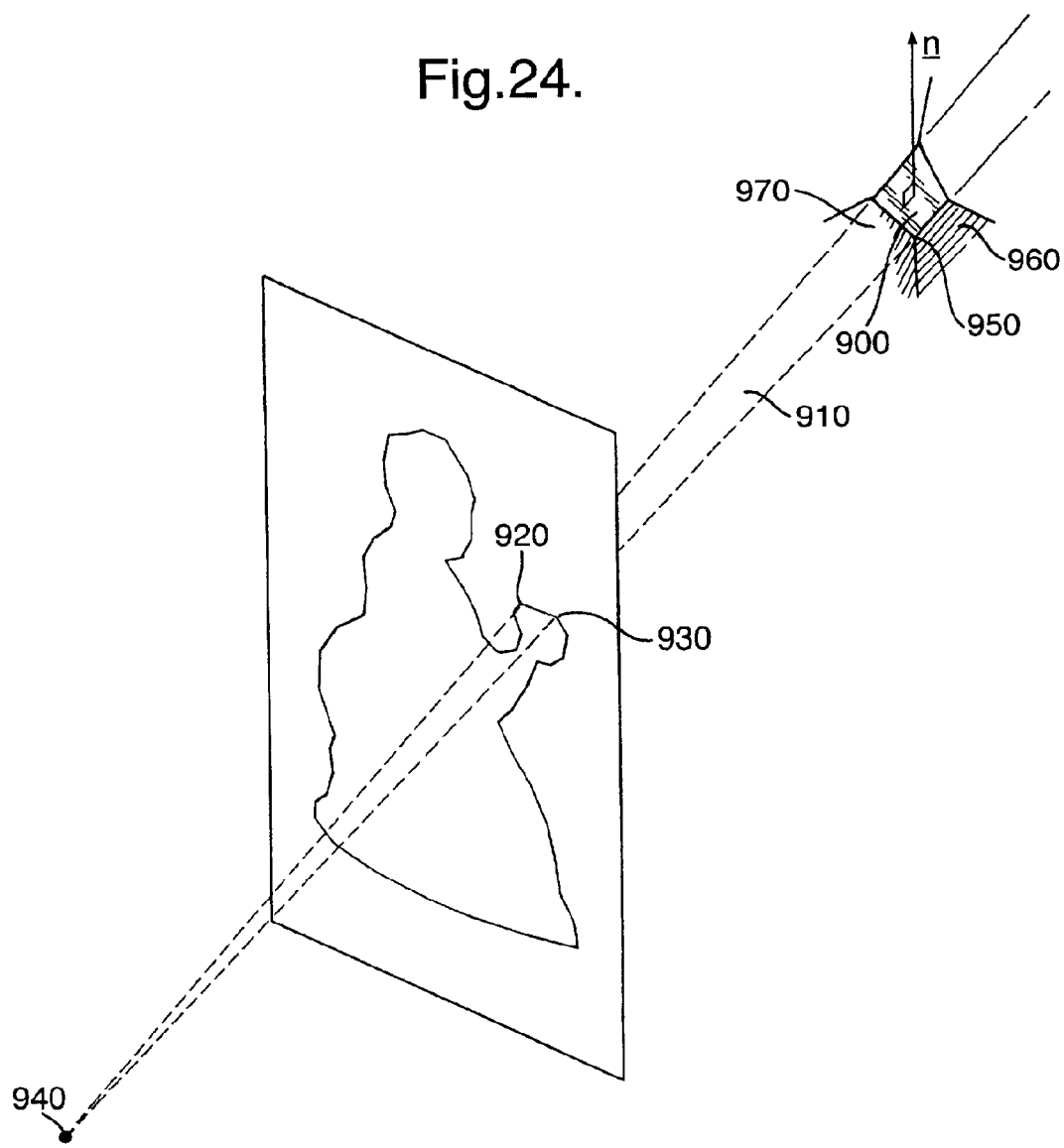
Figure 25:
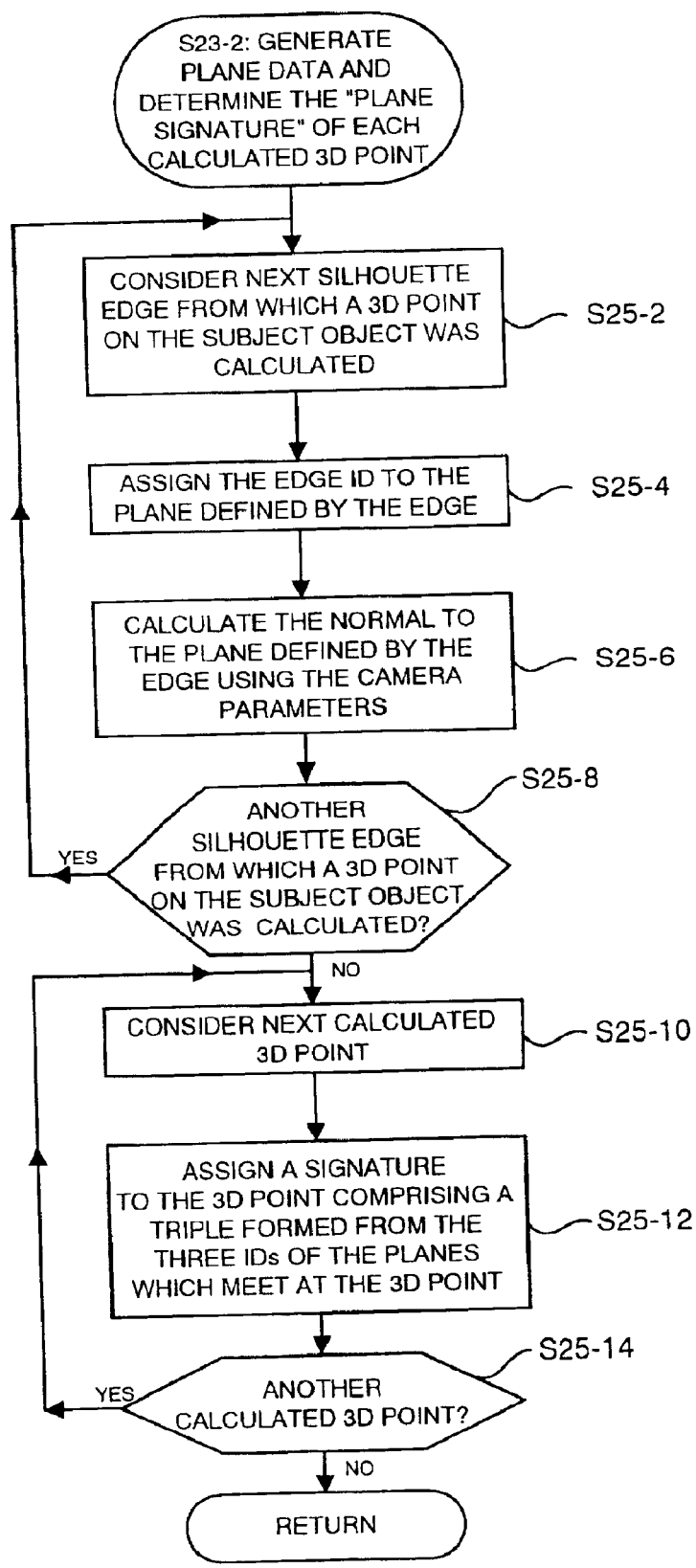
Figure 26:
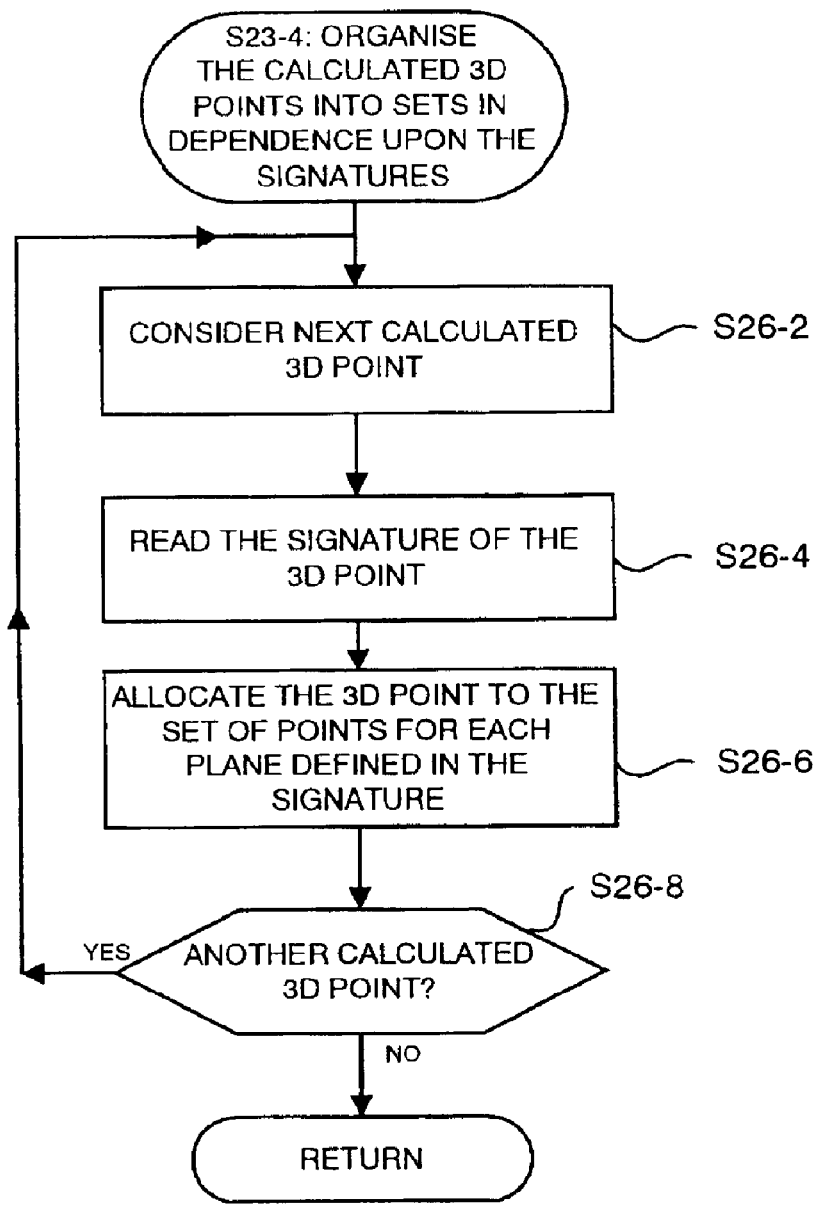
Figure 27:
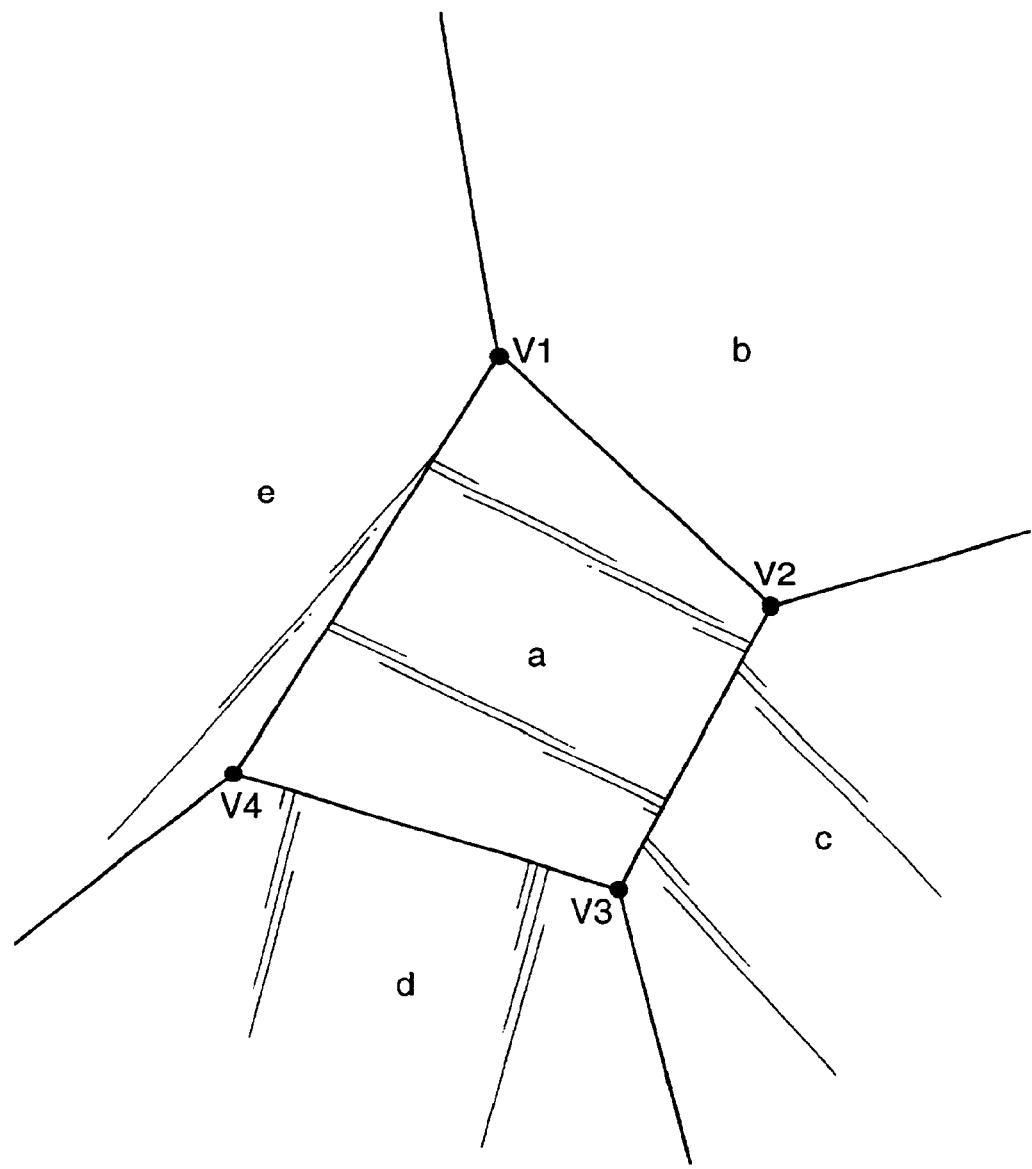
Figure 28:
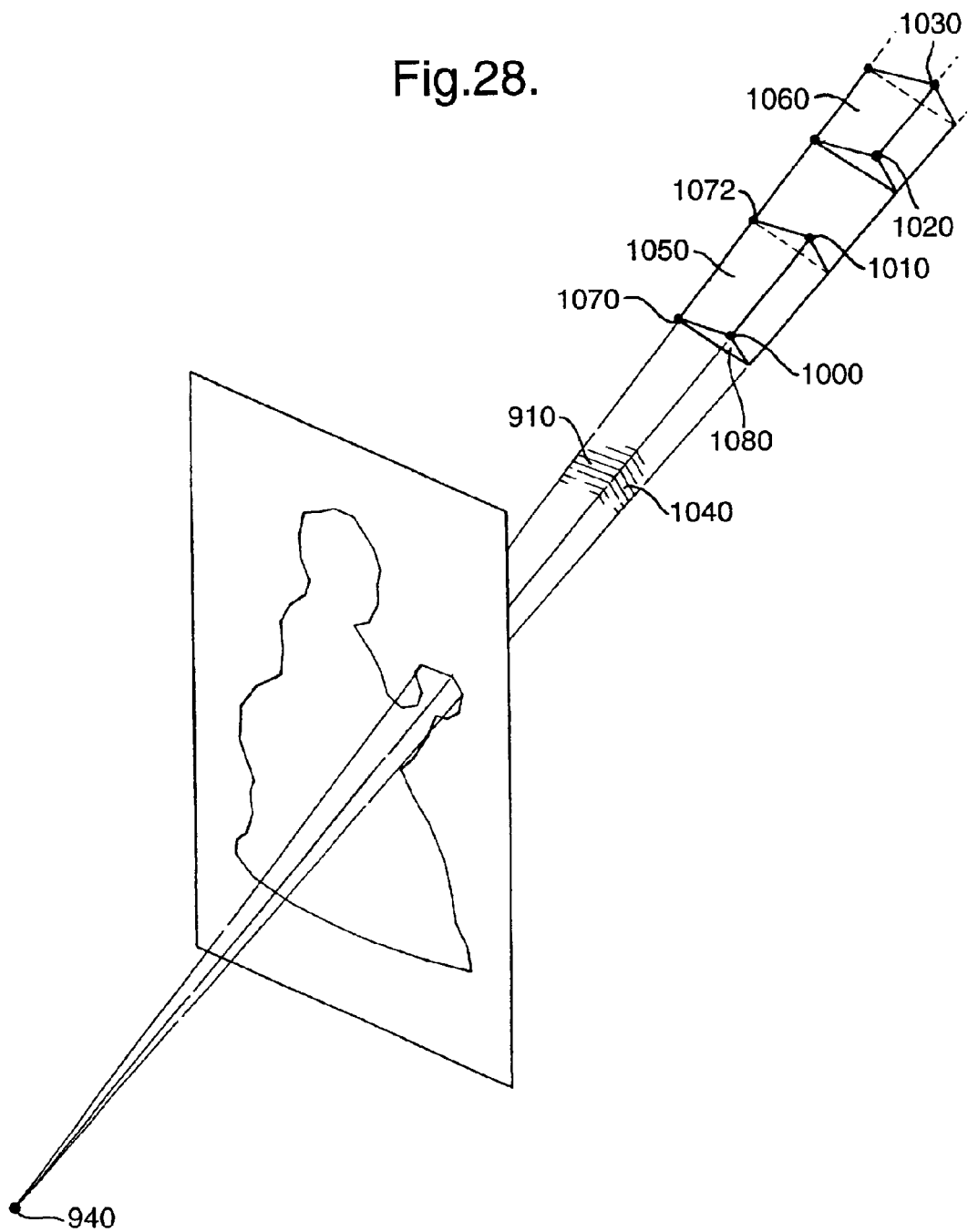
Figure 29:
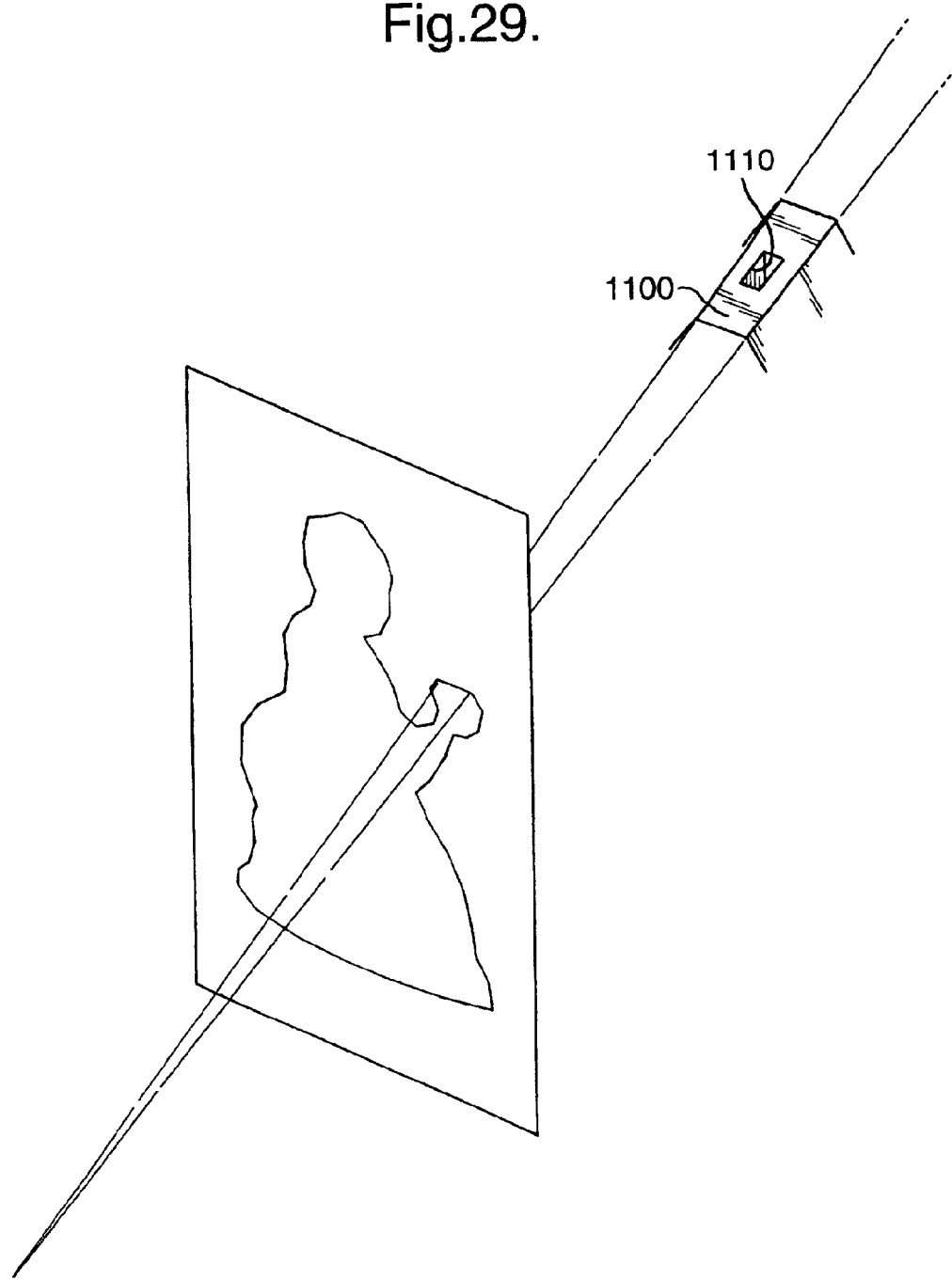
Figure 30A:
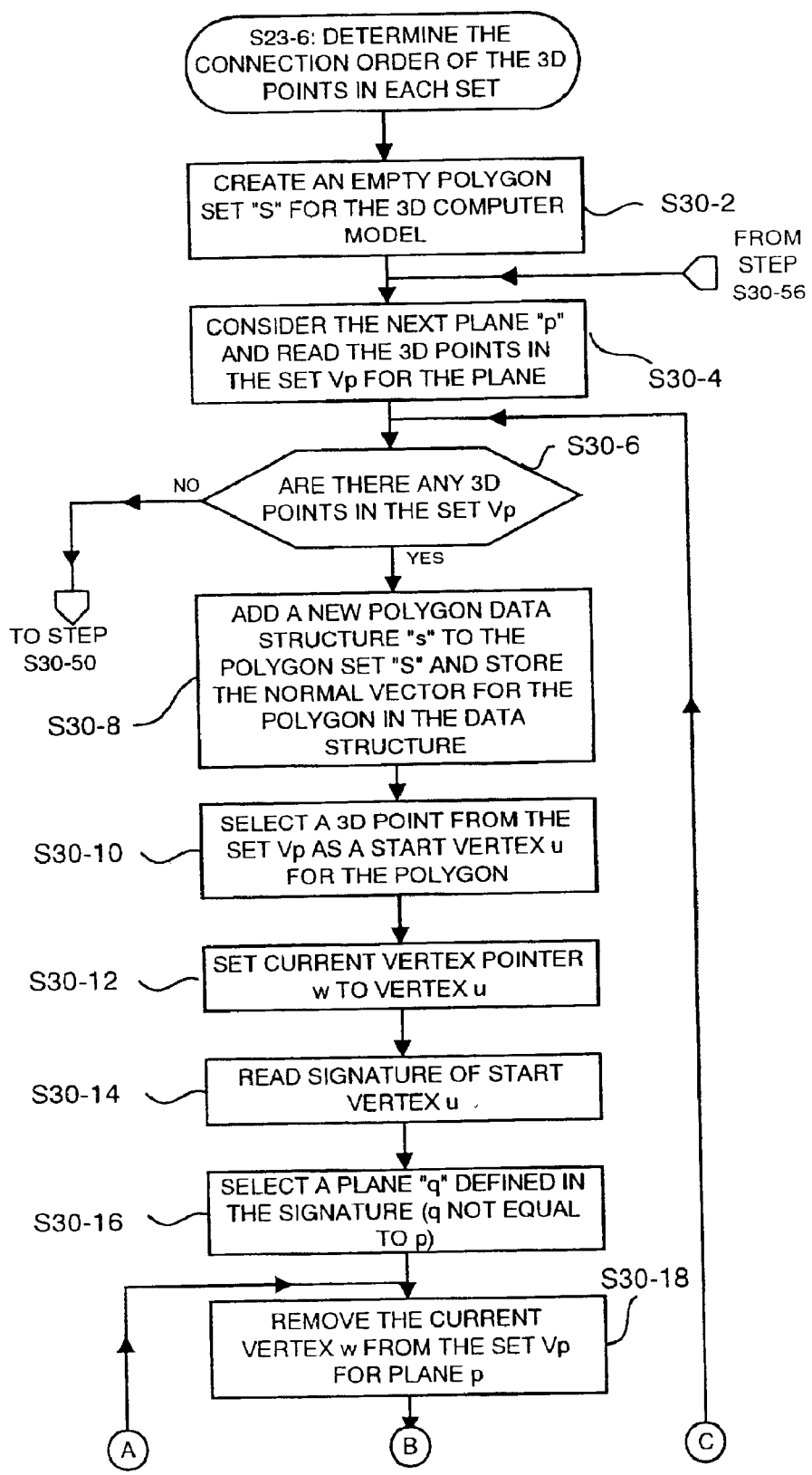
Figure 31:
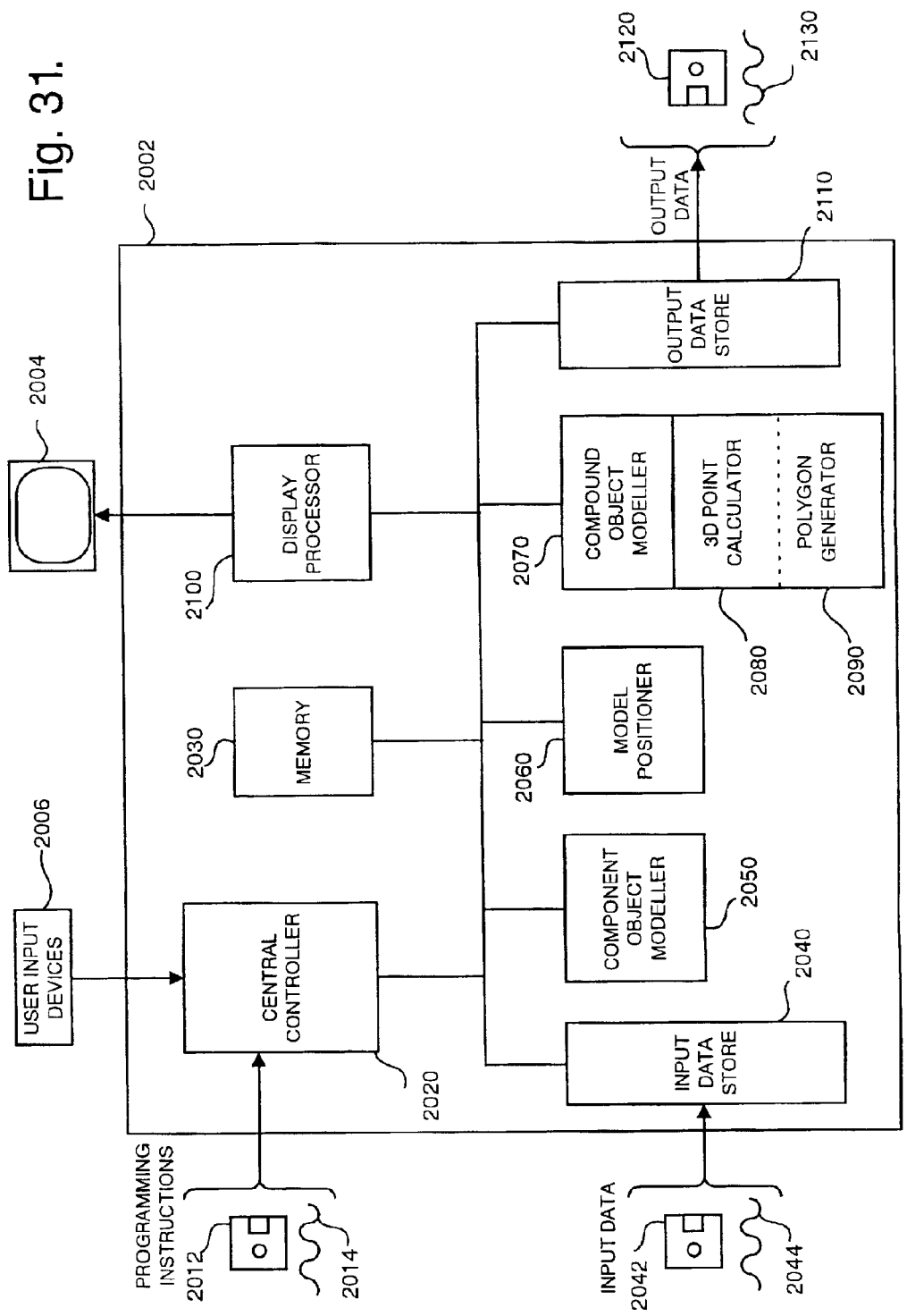
Figure 33A:
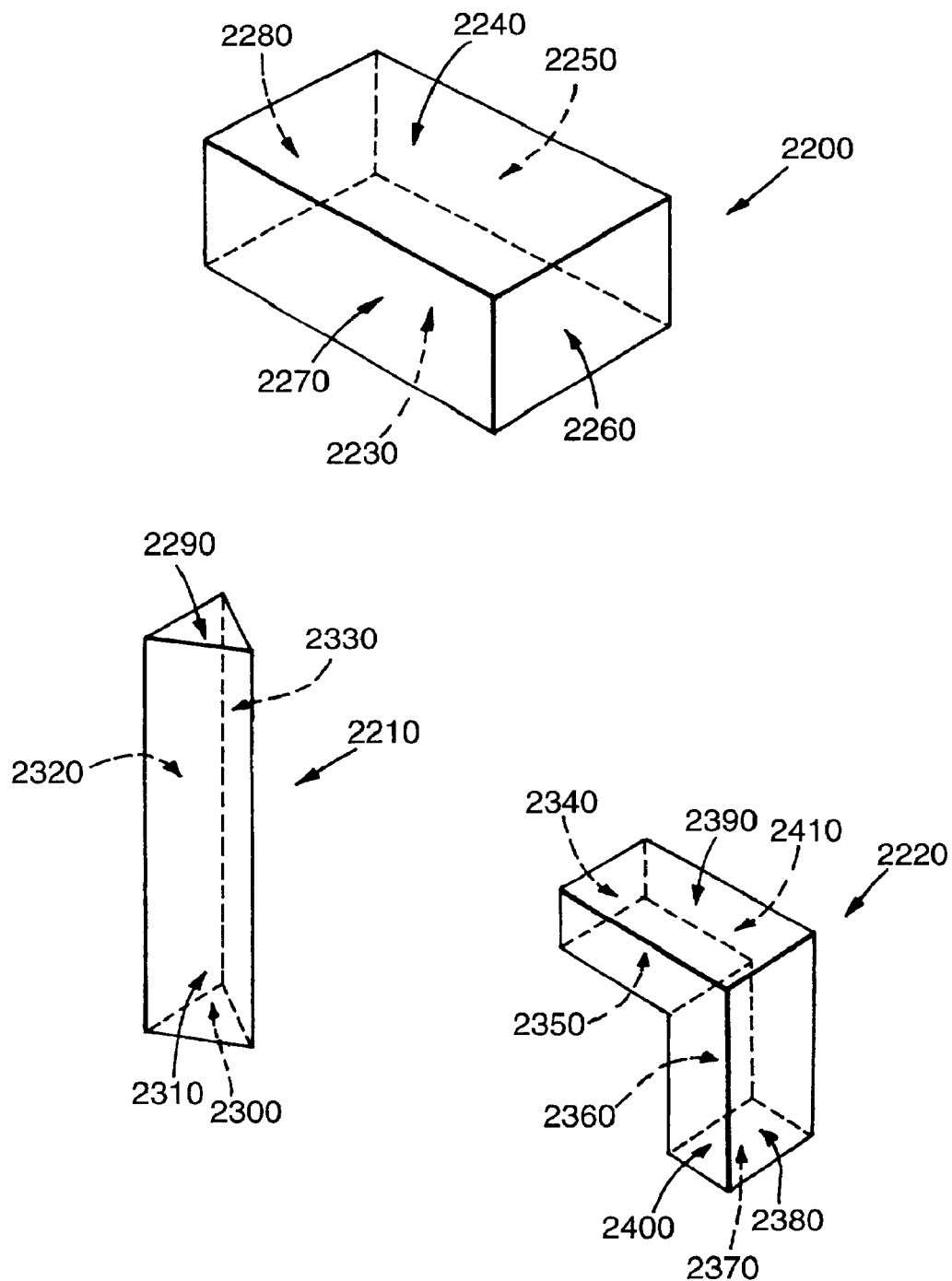
Figure 33B:
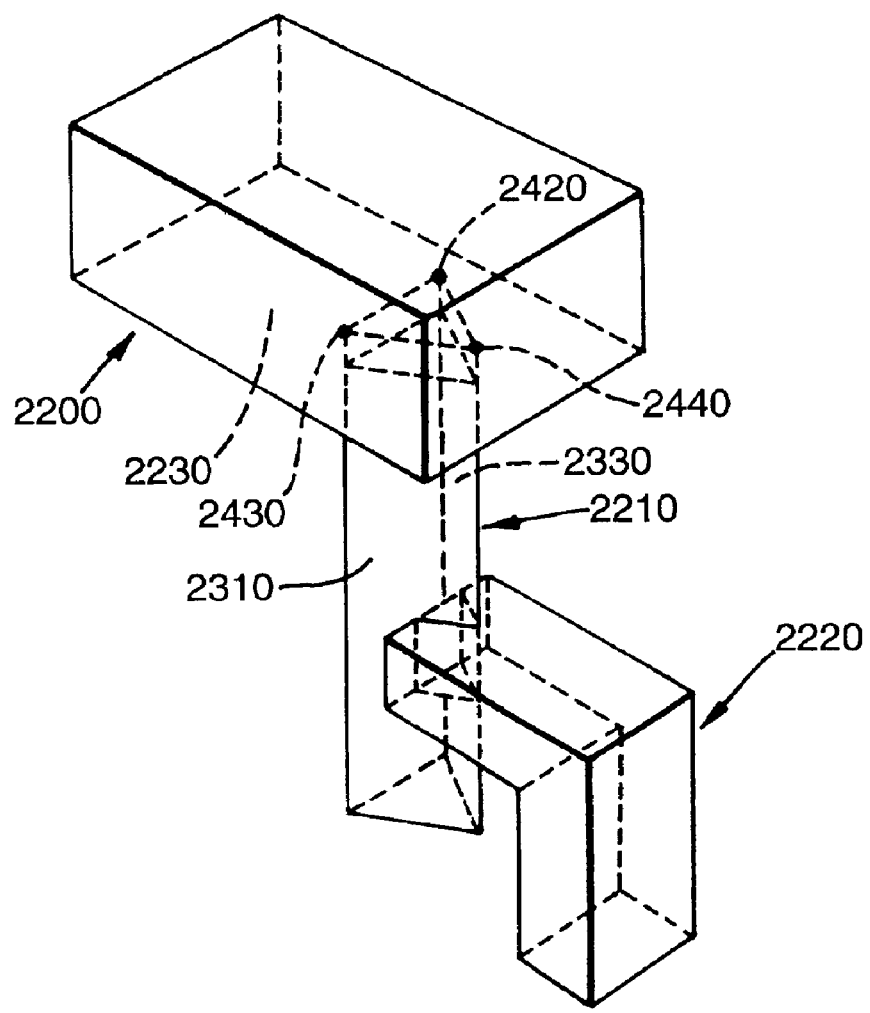
Figure 34:
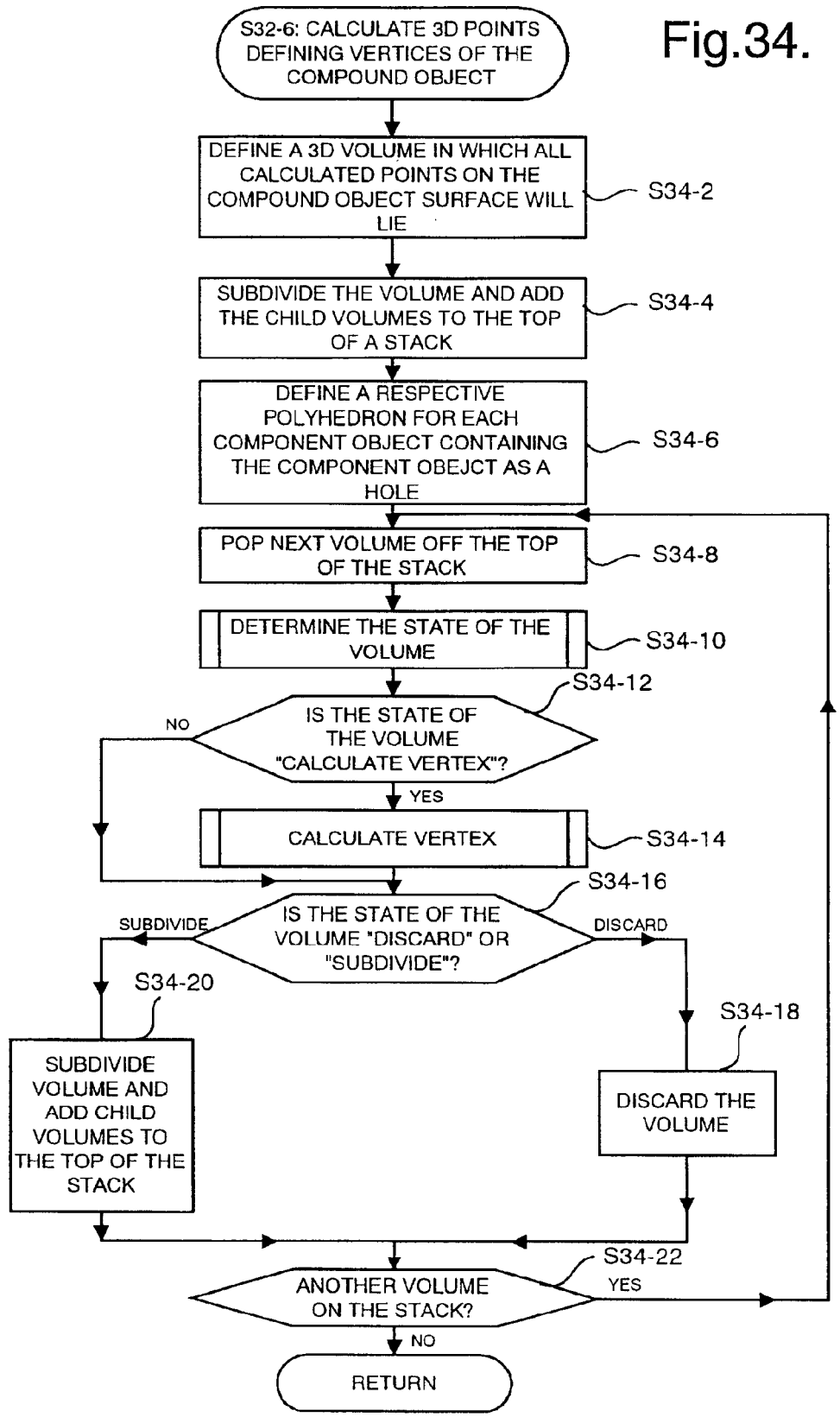
Figure 35:
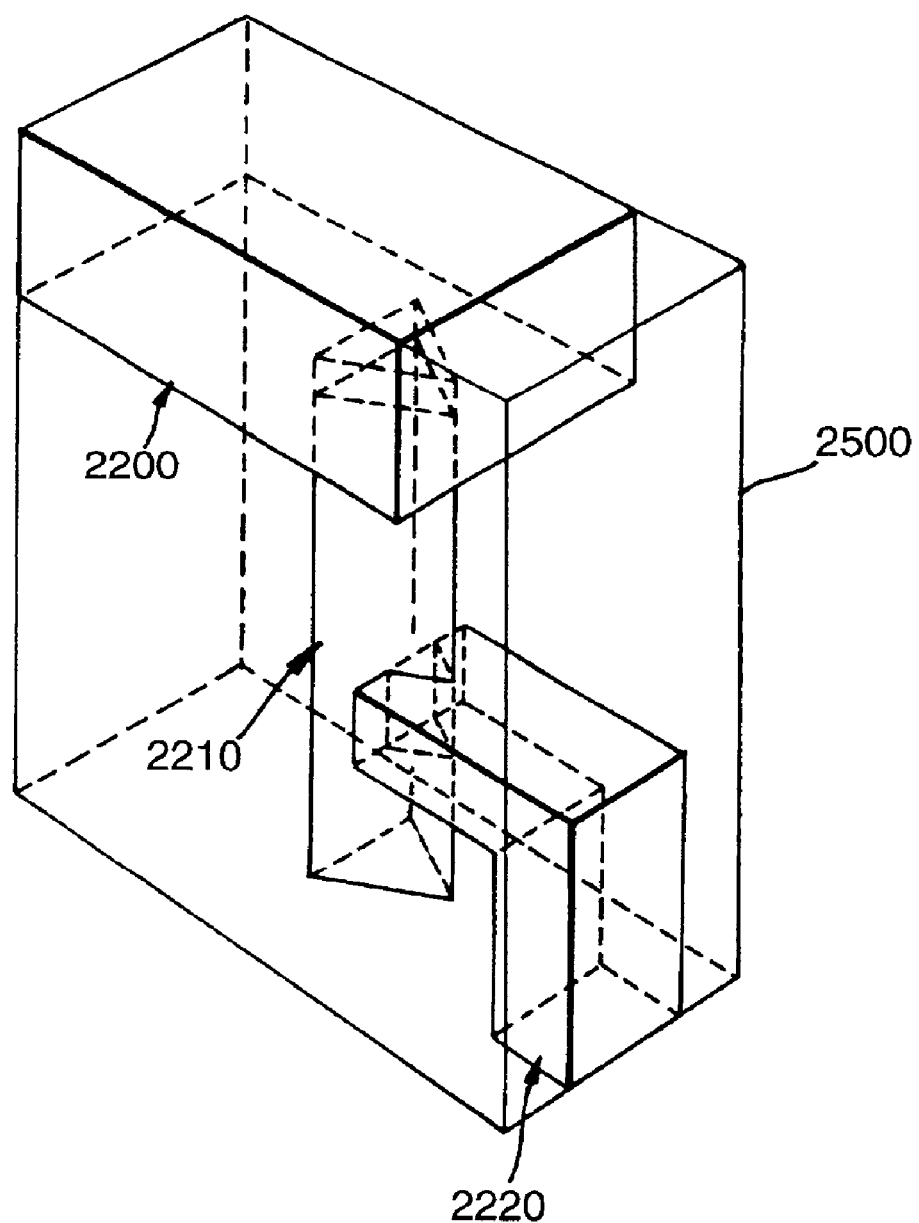
Figure 36:
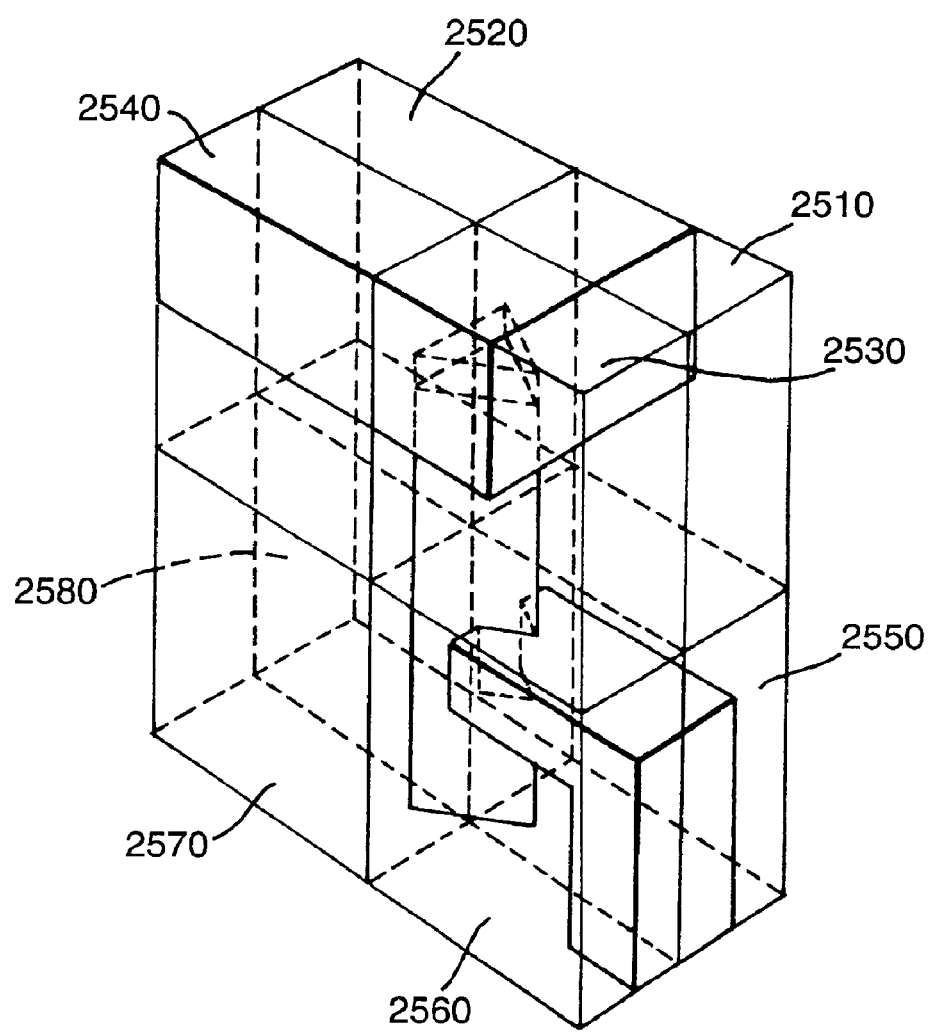
Figure 37:
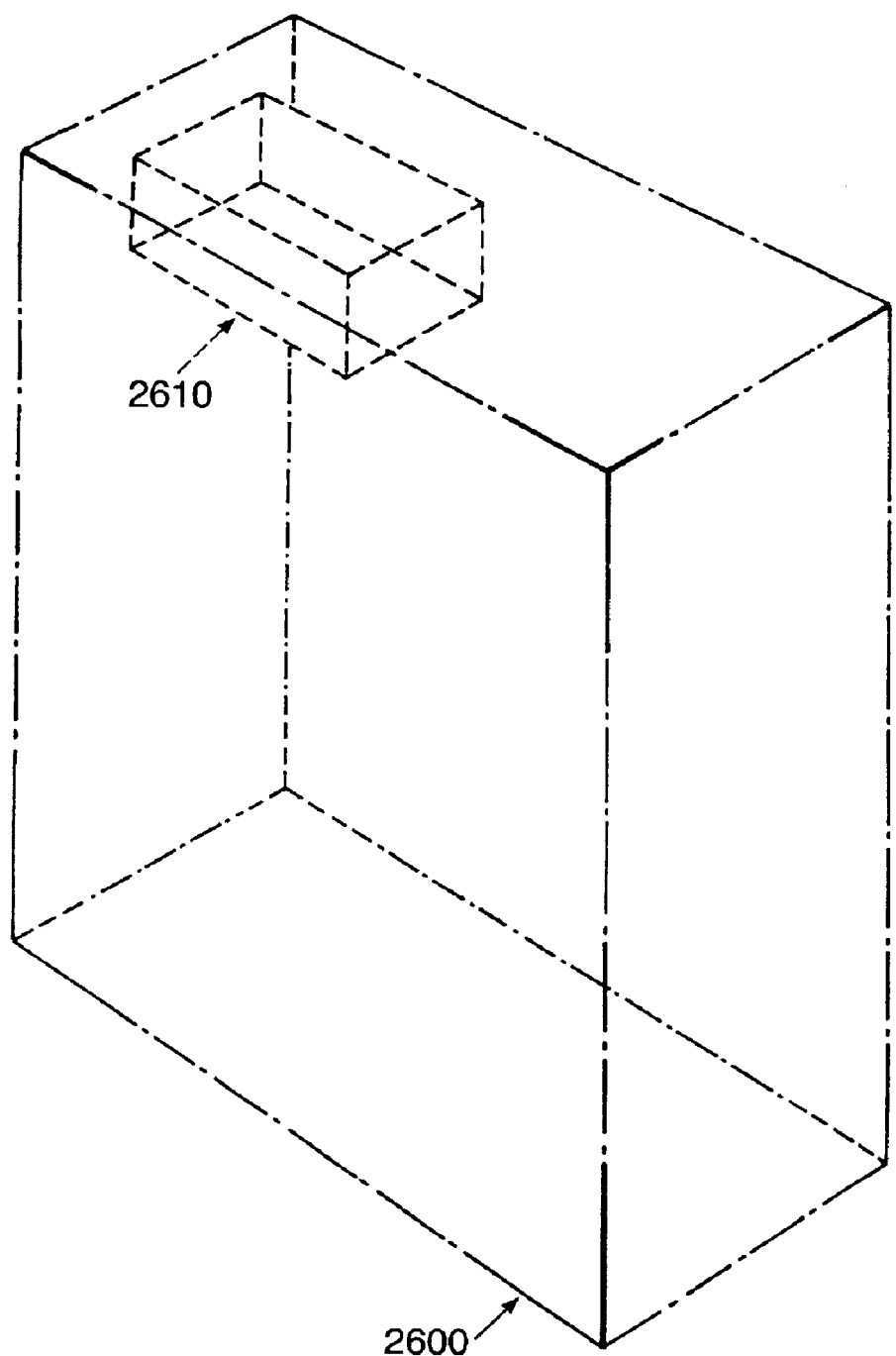
Figure 38A:
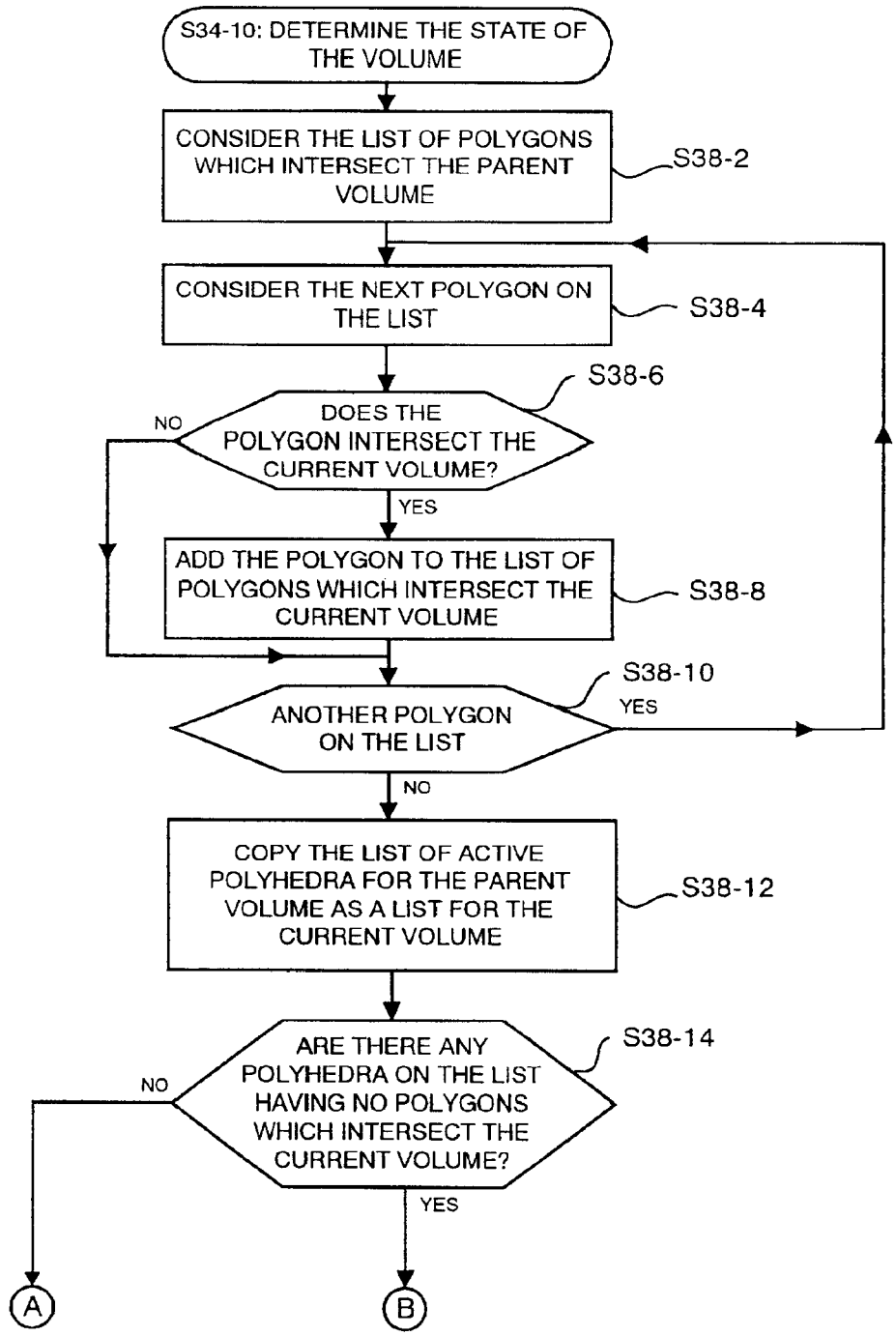
Figure 38C:
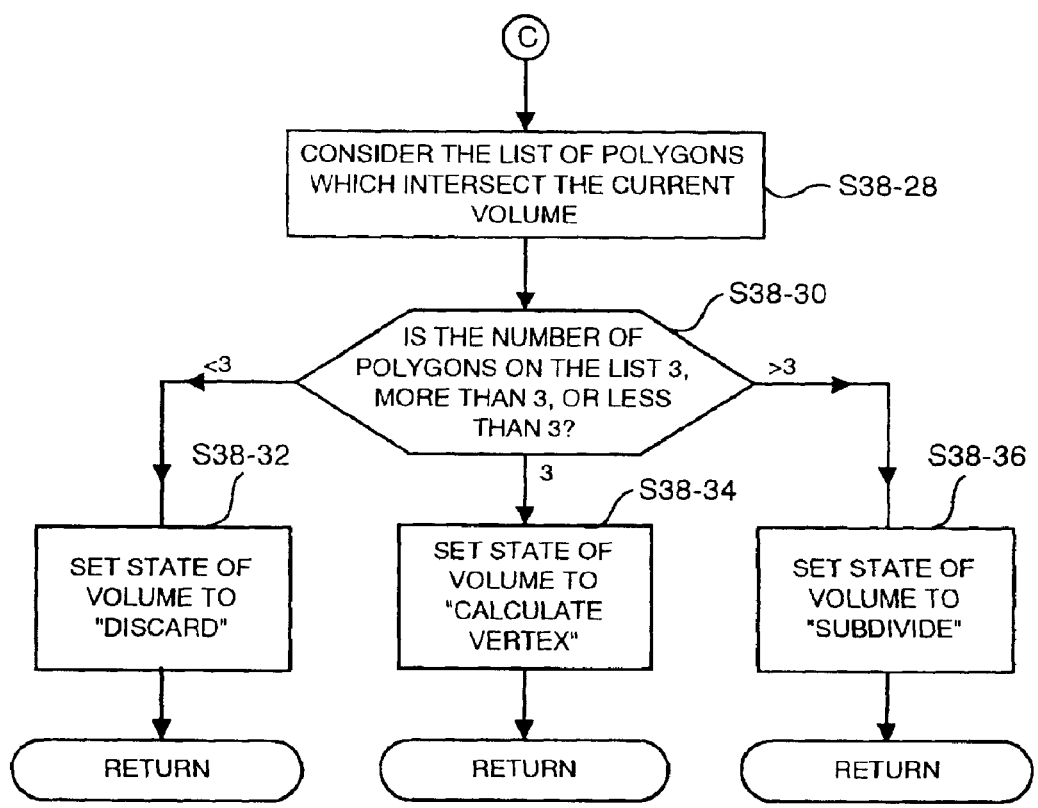
Figure 39:
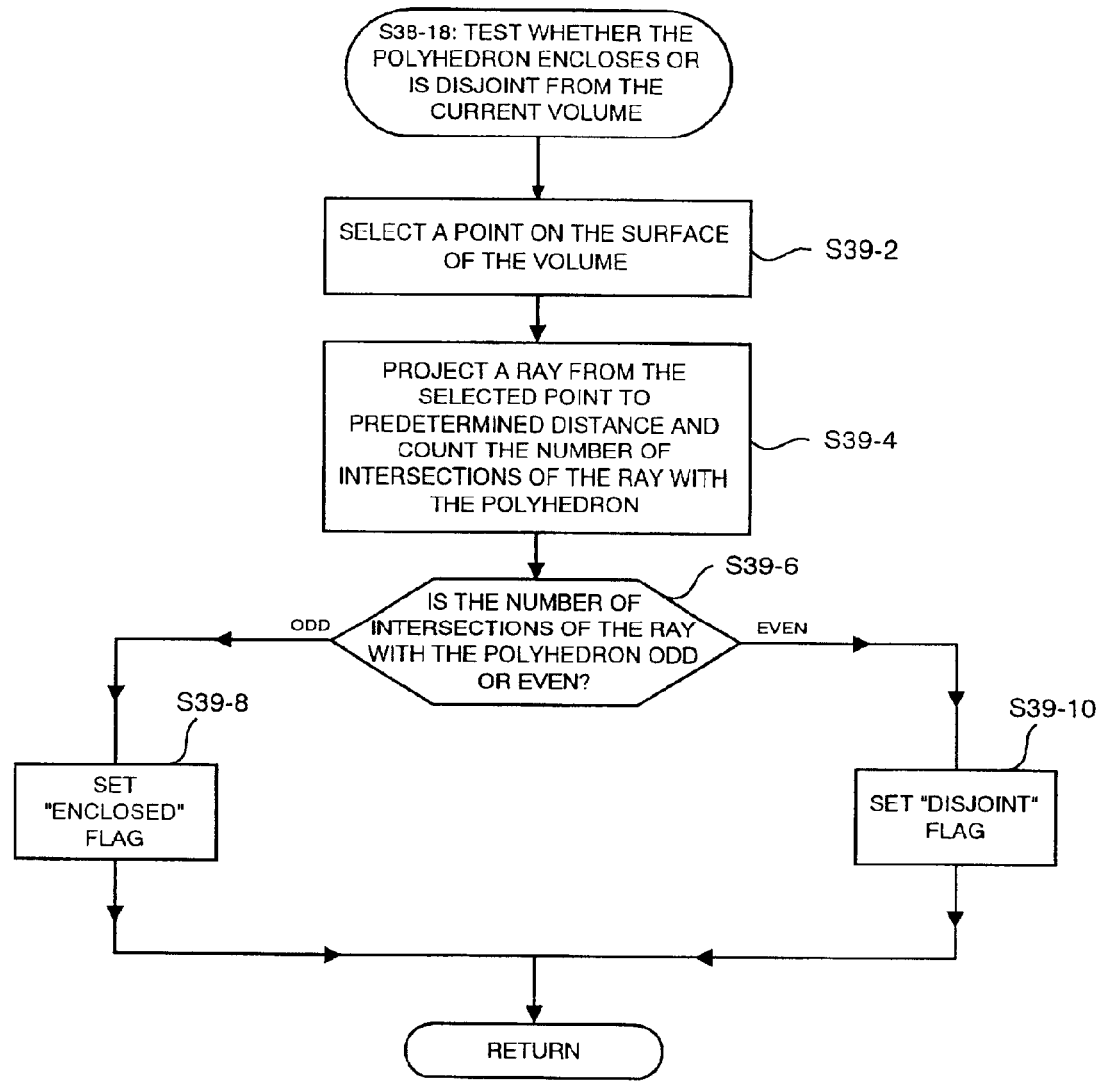
Figure 40A:
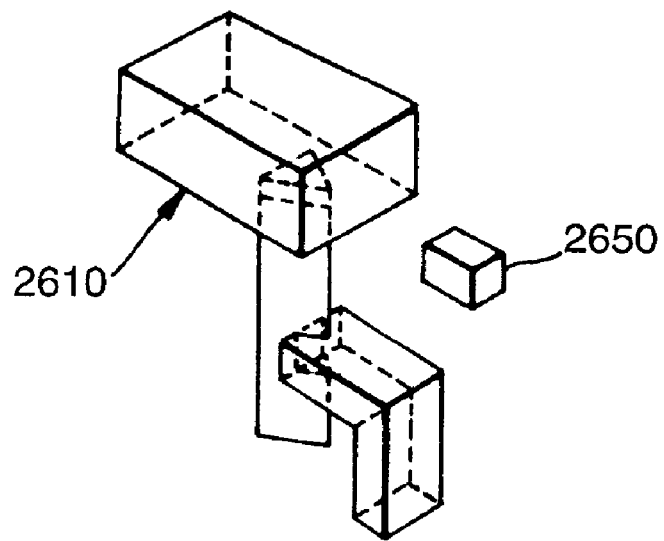
Figure 41A:
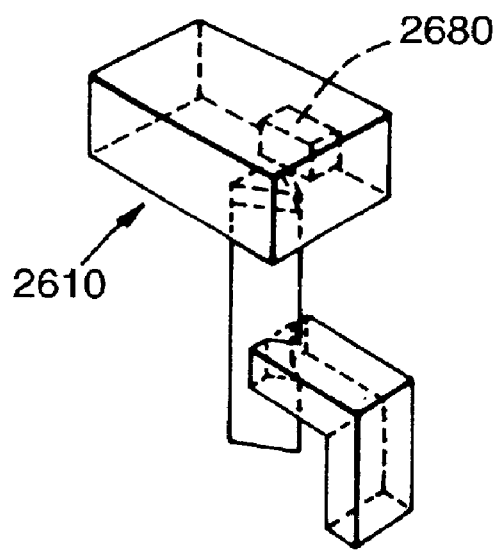
Figure 40B:
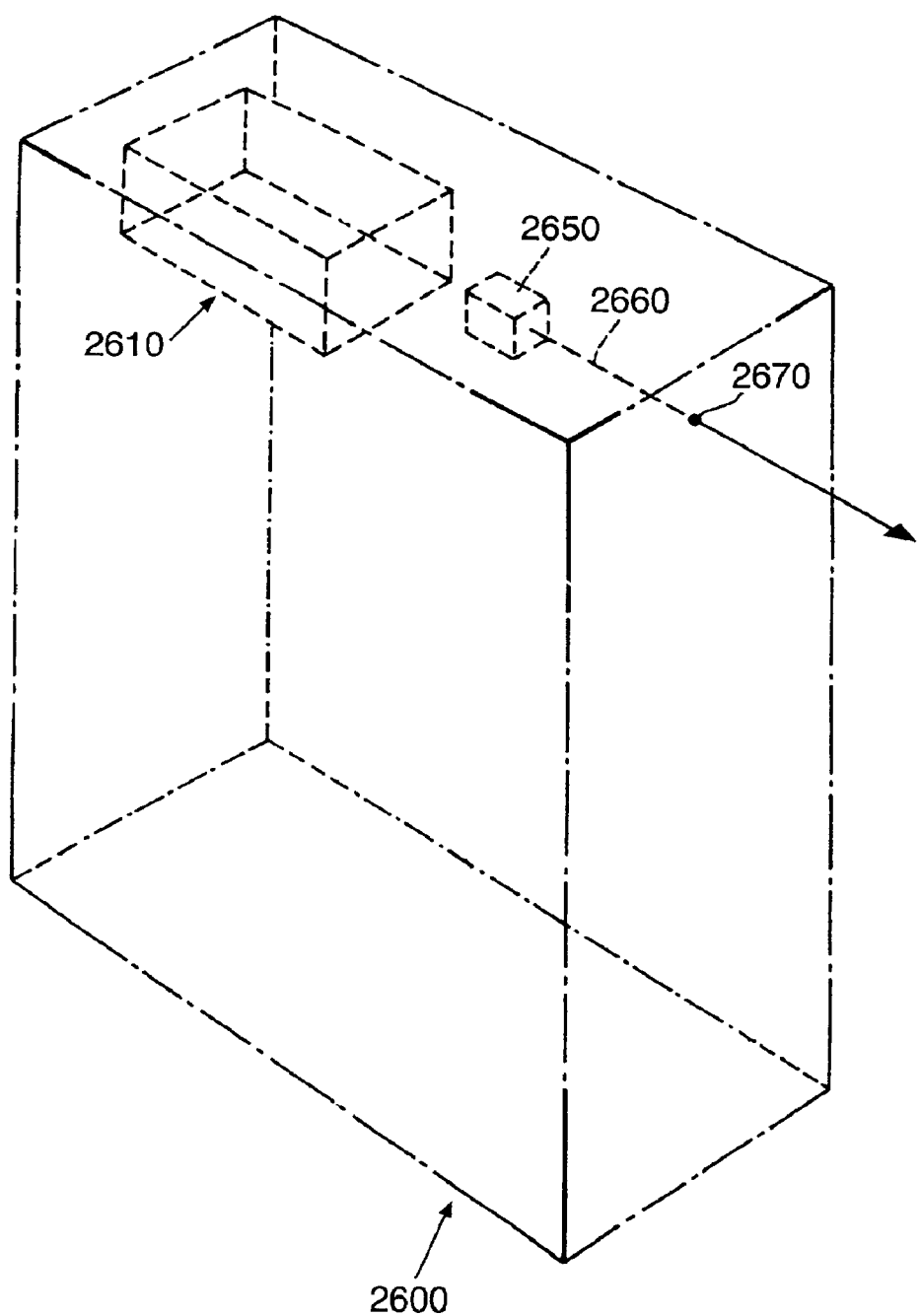
Figure 41B:
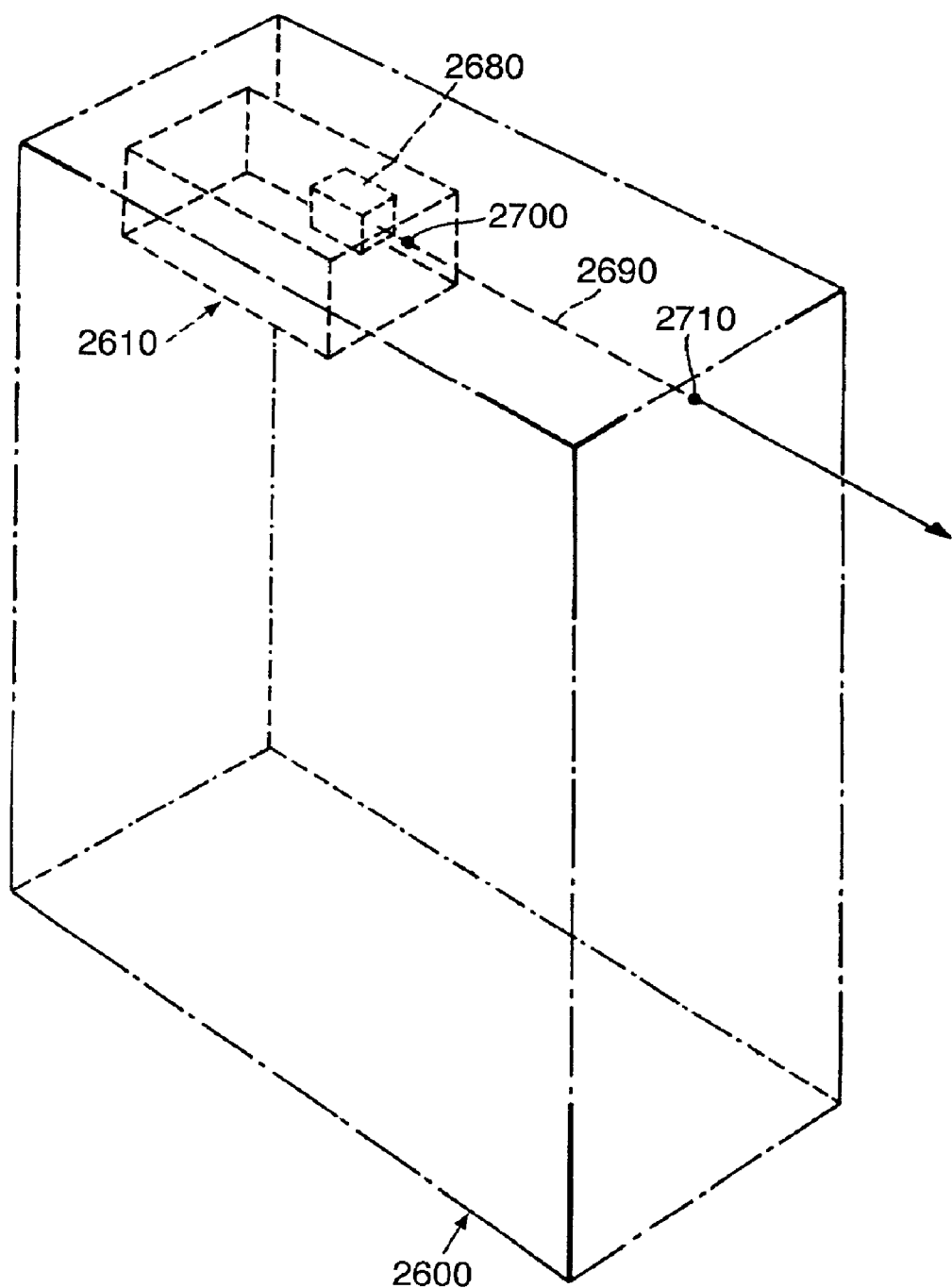
Figure 43:
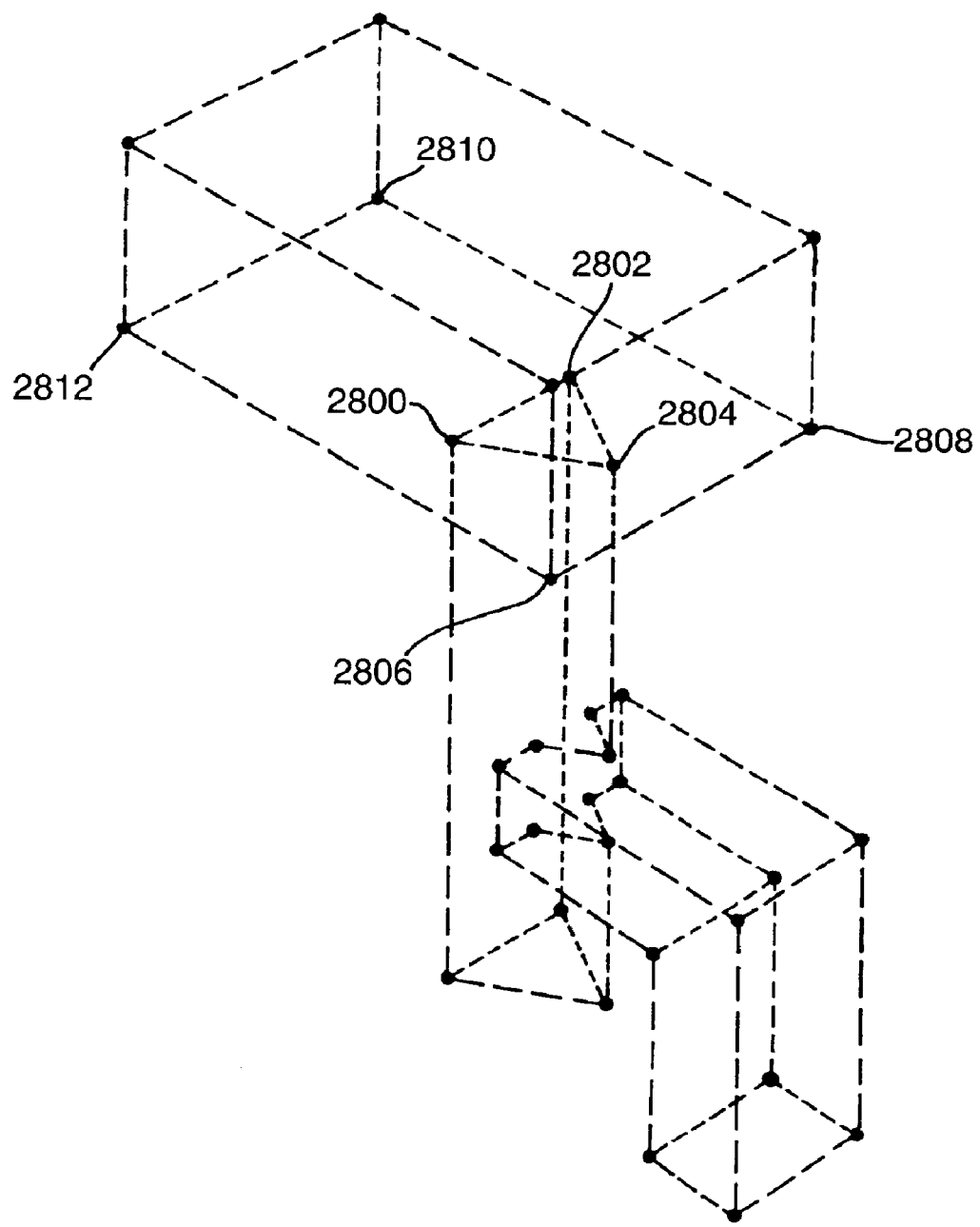
Figure 44:
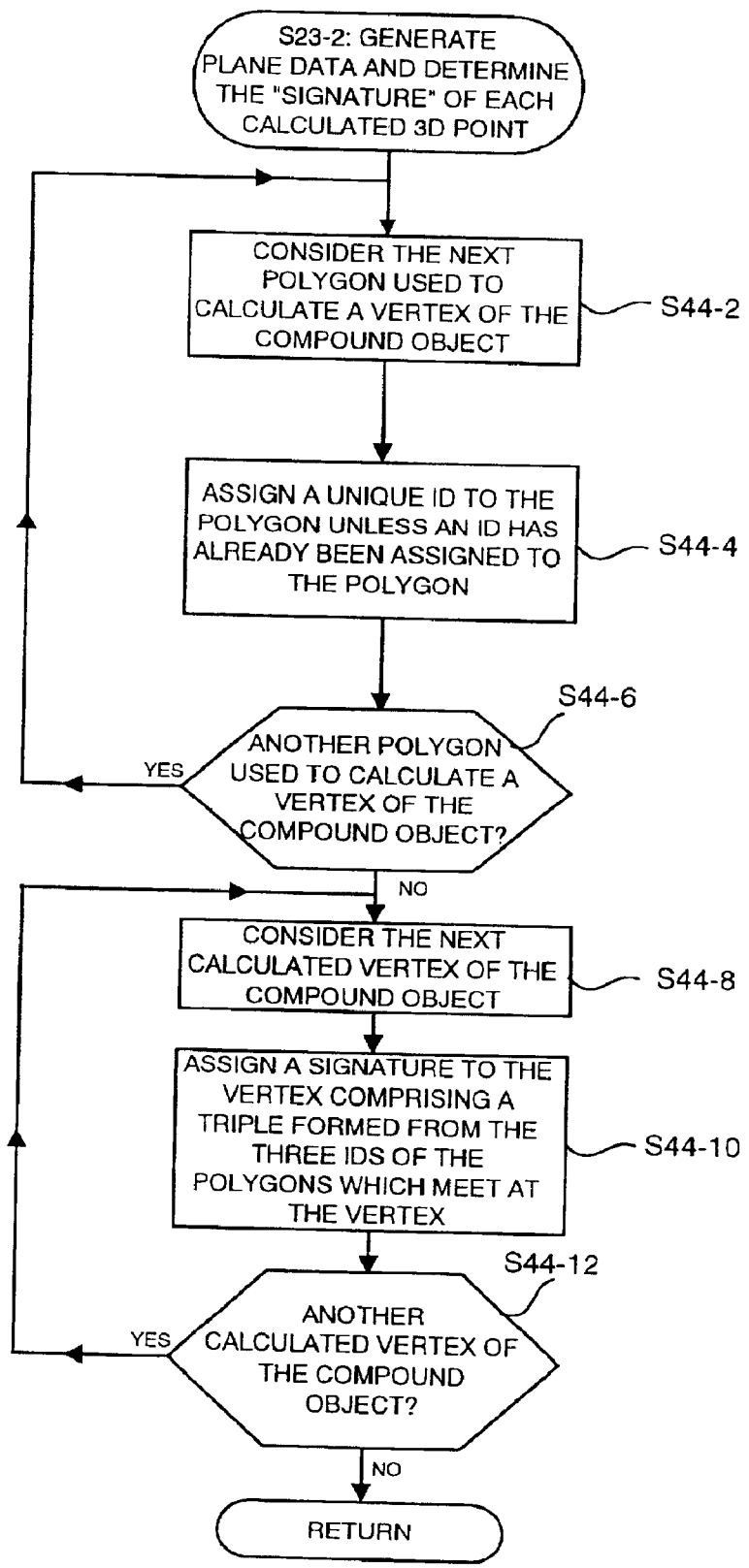
Figure 45A:
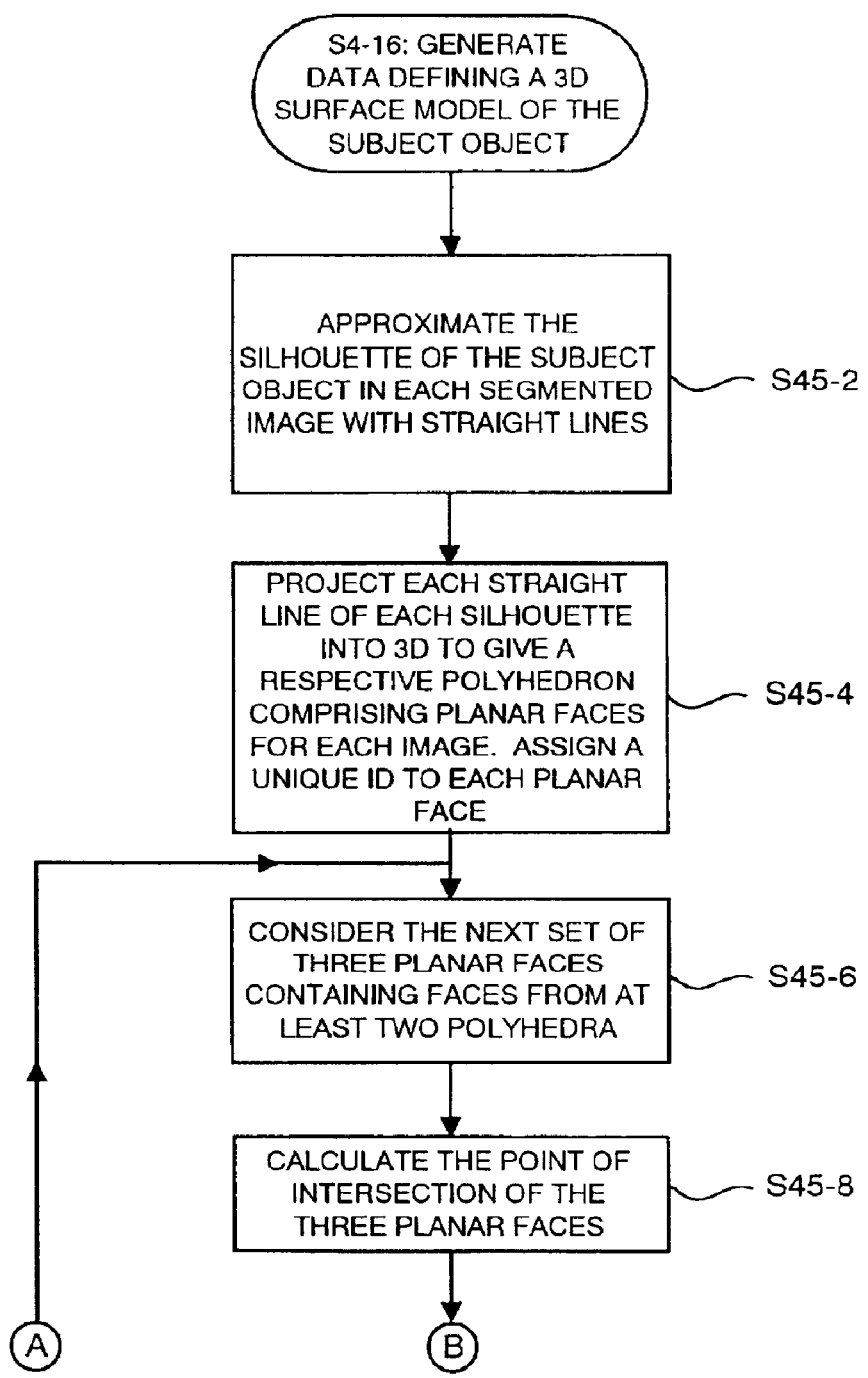
Figure 45B:
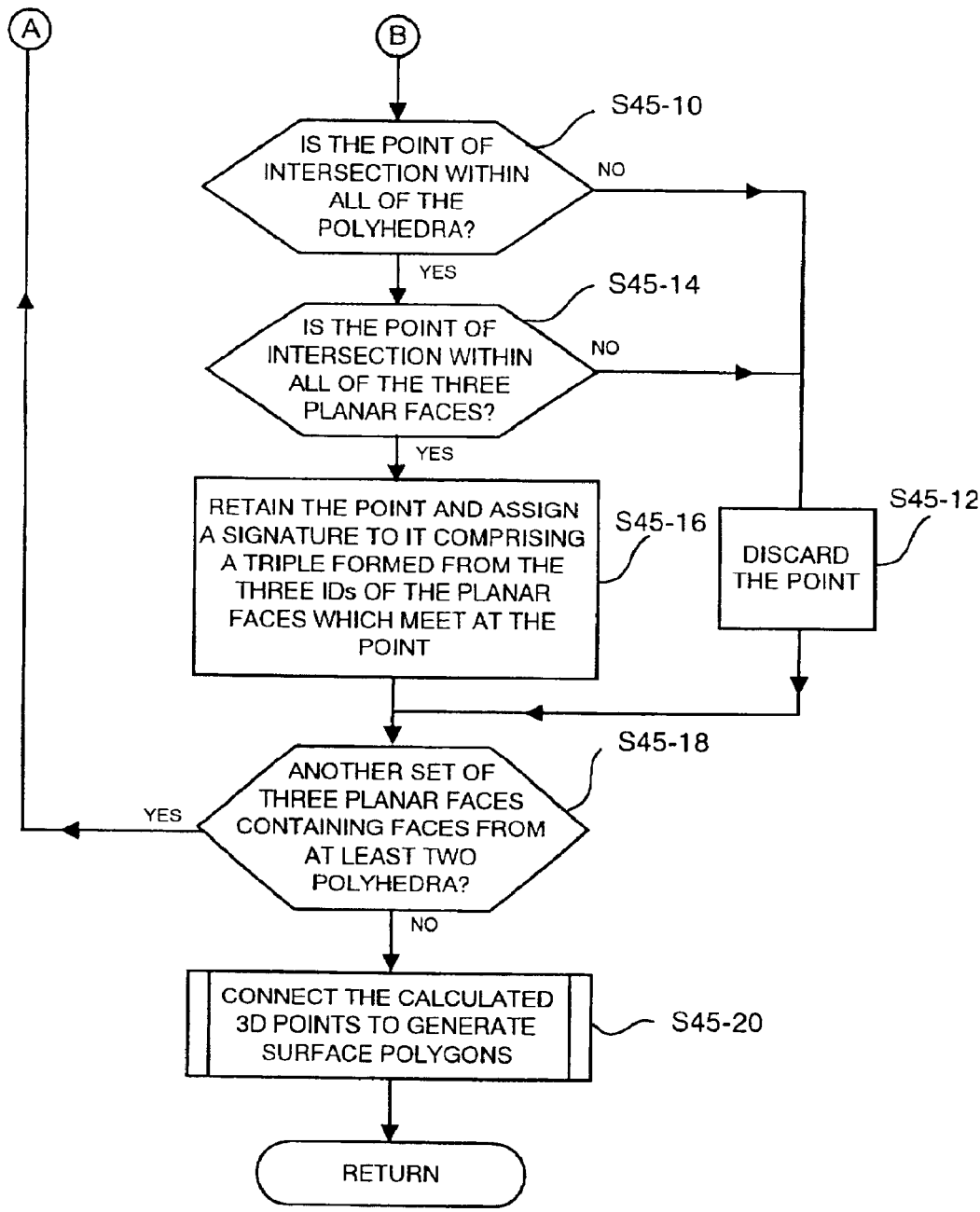

FIG. 4, comprising FIGS. 4a and 4b, shows the processing operations performed by the processing apparatus in FIG. 1 to process input data;

FIG. 5, comprising FIGS. 5a, 5b and 5c shows the processing operations performed at step S4-8 in FIG. 4;

FIG. 6 shows the processing operations performed at step S4-12 in FIG. 4;

FIG. 7 illustrates an example of the display on the display device of FIG. 1 during processing at steps S6-2 and S6-4 in FIG. 6;

FIG. 8 shows the processing operations performed at step S4-16 in FIG. 4;

FIG. 9 shows an example of a subject object silhouette approximated with straight lines as a result of the processing performed at step S8-2;

FIG. 10 shows an example of a polyhedron defined by a silhouette, and illustrates how polygons from different polyhedra intersect to generate points in the 3D computer model;

FIG. 11, comprising FIGS. 11a and 11b, shows the processing operations performed at step S8-4 in FIG. 8;

FIG. 12 shows an example illustrating the processing performed at steps S11-4 to S11-8 in FIG. 11;

FIG. 13 shows the processing operations performed at step S8-6 in FIG. 8;

FIGS. 14a, 14b and 14c show an example illustrating how a 3D volume is defined at step S13-2 in FIG. 13;

FIG. 15, comprising FIGS. 15a, 15b, 15c and 15d, shows the processing operations performed at step S13-8 in FIG. 13;

FIG. 16 shows an example illustrating the projection of a volume into a 2D image at step S15-2 in FIG. 15;

FIGS. 17a–h illustrate eight respective relationships between the projection of a volume in a two-dimensional image and the edges of the object silhouette in the image, processing being carried out in the first embodiment to test which of these relationships exists;

FIG. 18 shows the processing operations performed at step S15-16 in FIG. 15;

FIG. 19 shows an example illustrating the processing performed at steps S18-2, S18-4 and S18-6 in FIG. 18;

FIG. 20 shows the processing operations performed at step S15-18 in FIG. 15;

FIG. 21 shows the processing operations performed at step S15-38 in FIG. 15;

FIG. 22 shows the processing operations performed at step S13-12 in FIG. 13;

FIG. 23 shows the processing operations performed at step S8-8 in FIG. 8;

FIG. 24 shows an example to illustrate the processing performed at step S23-2 in FIG. 23;

FIG. 25 shows the processing operations performed at step S23-2 in FIG. 23;

FIG. 26 shows the processing operations performed at step S23-4 in FIG. 23;

FIG. 27 shows an example to illustrate the processing performed at step S23-6 in FIG. 23;

FIG. 28 shows another example to illustrate the processing performed at step S23-6 in FIG. 23;

FIG. 29 shows a further example to illustrate the processing performed at step S23-6 in FIG. 23;

FIG. 30, comprising FIGS. 30a, 30b, 30c and 30d, shows the processing operations performed at step S23-6 in FIG. 23;

FIG. 31 schematically shows the components of a second embodiment of the invention, together with the notional functional processing units into which the processing apparatus component may be thought of as being configured when programmed by programming instructions;

FIG. 32 shows the processing operations performed by the processing apparatus in FIG. 31 to process input data;

FIG. 33a shows an example of component objects generated at step S32-2 in FIG. 32;

FIG. 33b shows an example of how the component objects from FIG. 33a are positioned at step S32-4 in FIG. 32;

FIG. 34 shows the processing operations performed at step S32-6 in FIG. 32;

FIG. 35 illustrates how a bounding volume is defined at step S34-2 in FIG. 34;

FIG. 36 illustrates how the volume defined at step S34-2 is subdivided at step S34-4 in FIG. 34;

FIG. 37 illustrates how a polyhedron containing a hole representing a component object is generated at step S34-6 in FIG. 34;

FIG. 38, comprising FIGS. 38a, 38b and 38c, shows the processing operations performed at step S34-10 in FIG. 34;

FIG. 39 shows the processing operations performed at step S38-18 in FIG. 38;

FIGS. 40a and 40b show a first example to illustrate the processing operations performed at steps S39-2, S39-4 and S39-6 in FIG. 39;

FIGS. 41a and 41b show a second example to illustrate the processing operations performed at steps S39-2, S39-4 and S39-6 in FIG. 39;

FIG. 42 shows the processing operations performed at step S34-14 in FIG. 34;

FIG. 43 shows an example to illustrate the result of the processing performed at step S32-6 in FIG. 32;

FIG. 44 shows the processing operations performed in the second embodiment at step S23-2 in FIG. 23; and FIG. 45 shows the processing operations performed in a third embodiment at step S4-16 in FIG. 4.

FIRST EMBODIMENT

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, user input devices 6, such as a keyboard, mouse etc, a printer 8, and a display panel 10 comprising a flat panel having controllable pixels, such as the PL400 manufactured by WACOM.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of images of one or more subject objects recorded at different positions and orientations to calculate the positions and orientations at which the input images were recorded, and to use the calculated positions and orientations to generate data defining a three-dimensional computer model of the subject object(s). In this embodiment, the subject object(s) is imaged on a calibration object (a two-dimensional photographic mat in this embodiment) which has a known pattern of features thereon, and the positions and orientations at which the input images were recorded are calculated by detecting the positions of the features of the calibration object pattern in the images. The 3D computer model of the subject object(s) is generated using a novel and inventive polyhedra intersection technique, in which the outline of the subject object(s) in each image is divided into parts and processing is performed to calculate 3D points representing points on the surface of the subject object by determining the intersections of the polyhedra defined by the 3D projections of the outline parts. As will be described in detail below, this processing is performed in a particularly efficient way, in particular because it avoids calculating intersections of faces within the polyhedra which cannot result in 3D points on the subject object surface.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent units and connections into which the processor, memory etc of the processing apparatus 2 become configured.

Referring to the functional units shown in FIG. 1, a central controller 20 is arranged to process inputs from the user input devices 6, and also to provide control and processing for the other functional units. Memory 24 is provided for use by central controller 20 and the other functional units.

Mat generator 30 is arranged to generate control signals to control printer 8 or display panel 10 to print a calibration pattern on a recording medium such as a piece of paper to form a printed photographic mat, or to display the calibration pattern on display panel 10 to display a photographic mat. As will be described in more detail below, the photographic mat comprises a predetermined calibration pattern of features and the object(s) for which a three-dimensional computer model is to be generated is placed on the printed photographic mat 34 or on the display panel 10 on which the calibration pattern is displayed. Images of the object and the calibration pattern are then recorded and input to the processing apparatus 2. Mat generator 30 is arranged to store data defining the calibration pattern of features printed or displayed on the photographic mat for use by the processing apparatus 2 in calculating the positions and orientations at which the input images were recorded. More particularly, in this embodiment, mat generator 30 is arranged to store data defining the pattern of features together with a coordinate system relative to the pattern of features (which, in effect, defines a reference position and orientation of the calibration pattern), and processing apparatus 2 is arranged to calculate the positions and orientations at which the input images were recorded in the defined coordinate system (and thus relative to the reference position and orientation).

In this embodiment, the calibration pattern on the photographic mat comprises spatial clusters of features for example as described in PCT application GB00/04469 (the full contents of which are incorporated herein by cross-reference) or any known pattern of features, such as a pattern of coloured dots, with each dot having a different hue/brightness combination so that each respective dot is unique, for example as described in JP-A-9-170914, a pattern of concentric circles connected by radial line segments with known dimensions and position markers in each quadrant, for example as described in "Automatic Reconstruction of 3D Objects Using A Mobile Camera" by Niem in Image and Vision Computing 17 (1999) pages 125–134, or a pattern comprising concentric rings with different diameters, for example as described in "The Lumigraph" by Gortler et al in Computer Graphics Proceedings, Annual Conference Series, 1996 ACM-0-89791-764-4/96/008.

In the remainder of the description, it will be assumed that the calibration pattern is printed by printer 8 on a recording medium (in this embodiment, a sheet of paper) to generate a printed photographic mat 34, although, as mentioned above, the calibration pattern could be displayed on display panel 10 instead.

Input data store 40 is arranged to store input data input to the processing apparatus 2 for example as data stored on a storage device, such as disk 42, as a signal 44 transmitted to the processing apparatus 2, or using a user input device 6. The input data defines a plurality of images of one or more subject objects on the photographic mat recorded at different positions and orientations, and an input image showing the background against which the object(s) was imaged together with part of the photographic mat to show the background colour thereof or a different object having the same colour as the background colour of the mat. In addition, in this embodiment, the input data also includes data defining the intrinsic parameters of the camera which recorded the images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the input images may be generated for example by downloading pixel data from a digital camera which recorded the images, or by scanning photographs using a scanner (not shown). The input data defining the intrinsic camera parameters may be input by a user using a user input device 6.

Camera calculator 50 is arranged to process each input image to detect the positions in the image of the features in the calibration pattern of the photographic mat and to calculate the position and orientation of the camera when the input image was recorded.

Image data segmenter 60 is arranged to process each input image to separate image data corresponding to the subject object from other image data in the image.

Image segmentation editor 70 is operable, under user control, to edit the segmented image data generated by image data segmenter 60. As will be explained in more detail below, this allows the user to correct an image segmentation produced by image data segmenter 60, and in particular for example to correct pixels mistakenly determined by image data segmenter 60 to relate to the subject object 210 (for example pixels relating to marks or other features visible on the surface on which the photographic mat 34 and subject object are placed for imaging, pixels relating to shadows on the photographic mat 34 and/or surface on which it is placed, and pixels relating to a calibration feature on the photographic mat 34 which touches the outline of the subject object in the input image have all been found to be mistakenly classified during image data segmentation and to lead to inaccuracies in the resulting 3D computer model if not corrected).

Surface modeller 80 is arranged to process the segmented image data produced by image data segmenter 60 and image segmentation editor 70 and the data defining the positions and orientations at which the images were recorded generated by camera calculator 50, to generate data defining a 3D computer model representing the actual surfaces of the object(s) in the input images.

Surface modeller 80 comprises a silhouette approximator 82, a 3D point calculator 84, and a polygon generator 86.

Silhouette approximator 82 is arranged to process the segmented image data generated by image data segmenter 60 and image segmentation editor 70 for each input image to approximate the silhouette of the subject object(s) in each image with straight line segments.

3D point calculator 84 is arranged to process the straight line segments generated by silhouette approximator 82 to calculate intersections of polygons defined by the projection of the line segments into a three-dimensional space. These intersections define 3D points which are potentially on the surface of the subject object(s). 3D point calculator 84 is arranged to test the calculated 3D points to determine which ones represent actual points in the surface object(s).

Polygon generator 86 is arranged to connect the 3D points generated by 3D point calculator 84 to form a polygon mesh representing the surface of the subject object(s).

More particularly, the intersections of the polygons calculated by 3D point calculator 84 define 3D points on the visual hull of the subject object(s), and accordingly these 3D points are connected by polygon generator 86 so that they form the vertices of the polygons in the polygon mesh representing the surface of the subject object(s). For this reason, hereinafter, the 3D points calculated by 3D point calculator 84 will be referred to as 3D vertices.

Surface texturer 90 is arranged to generate texture data from the input image data for rendering onto the surface model produced by surface modeller 80.

Display processor 110, under the control of central controller 20, is arranged to display images and instructions to a user via display device 4 during processing to generate the 3D computer model. In addition, under the control of central controller 20, display processor 110 is also arranged to display images of the 3D computer model of the object from a user-selected viewpoint by processing the surface model data generated by surface modeller 80 and rendering texture data produced by surface texturer 90 onto the surface model.

Output data store 120 is arranged to store the data defining the surface model generated by surface modeller 80 and optionally the texture data generated by surface texturer 90 as well. Central controller 20 is arranged to control the output of data from output data store 120, for example as data on a storage device, such as disk 122, and/or as a signal 124.

Figure 2:
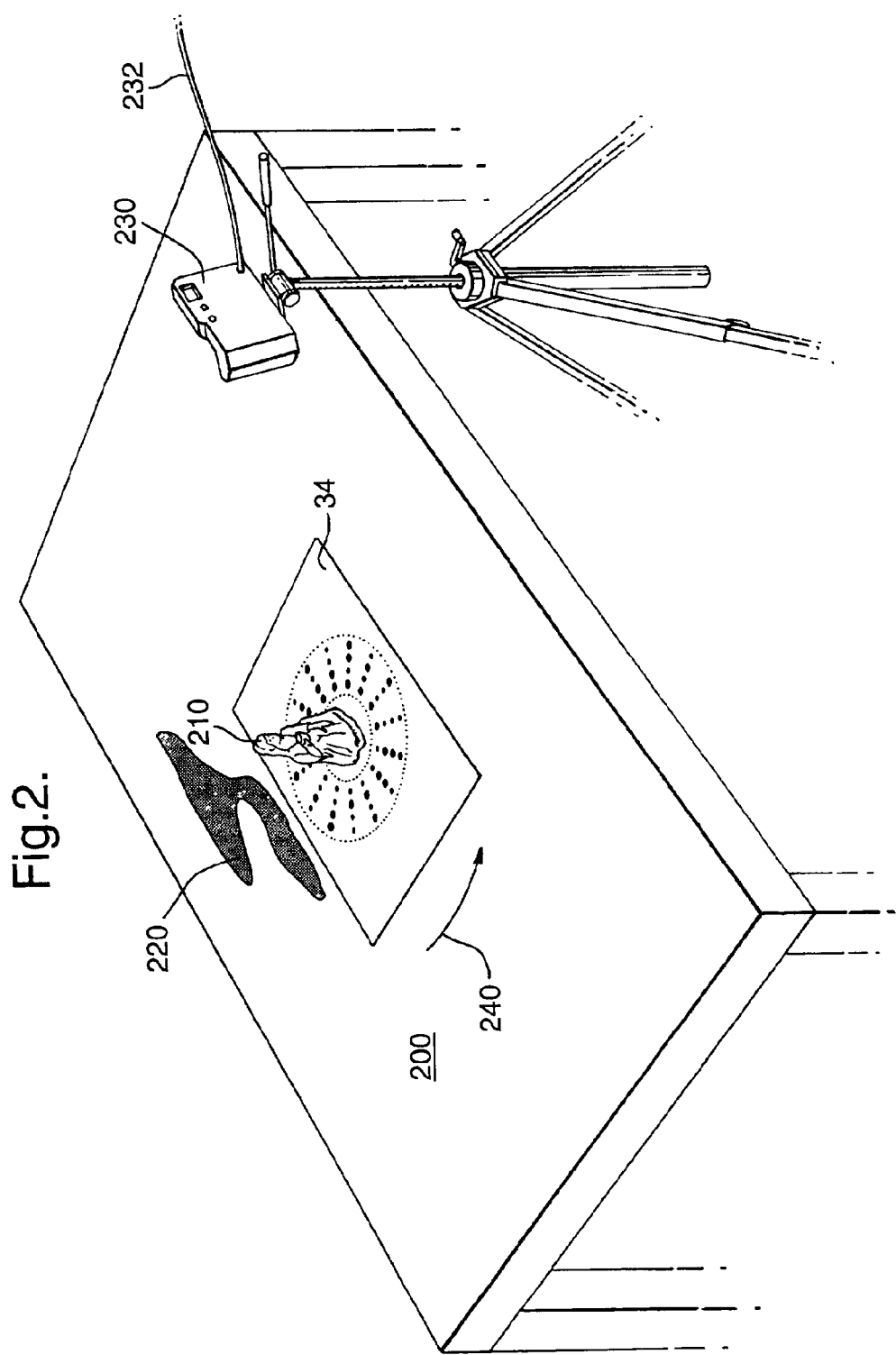
FIG. 2 illustrates the recording of images of an object for which a 3D computer model is to be generated.

Referring to FIG. 2, the printed photographic mat 34 is placed on a surface 200, and the subject object 210 for which a 3D computer model is to be generated is placed on the photographic mat 34 so that the object 210 is surrounded by the features making up the calibration pattern on the mat.

Preferably, the surface 200 is of a substantially uniform colour, which, if possible, is different to any colour in the subject object 210 so that, in input images, image data relating to the subject object 210 can be accurately distinguished from other image data during segmentation processing by image data segmenter 60. However, if this is not the case, for example if a mark 220 having a colour the same as the colour in the subject object 210 appears on the surface 200 (and hence in input images), processing can be performed in this embodiment to accommodate this by allowing the user to edit segmentation data produced by image data segmenter 60, as will be described in more detail below.

Images of the object 210 and photographic mat 34 are recorded at different positions and orientations to show different parts of object 210 using a digital camera 230. In this embodiment, data defining the images recorded by camera 230 is input to processing apparatus 2 as a signal 44 along wire 232.

More particularly, in this embodiment, camera 230 remains in a fixed position and photographic mat 34 with object 210 thereon is moved (translated) and rotated (for example in the direction of arrow 240) on surface 200, and photographs of the object 210 at different positions and orientations relative to the camera 230 are recorded. During the rotation and translation of the photographic mat 34 on surface 200, the object 210 does not move relative to the mat 34.

FIG. 3 shows examples of images 300, 302, 304 and 306 defined in data input to processing apparatus 2 of the object 210 and photographic mat 34 in different positions and orientations relative to camera 230.

In this embodiment, following the recording and input of images of object 210 and photographic mat 34, a further image is recorded and input to processing apparatus 2. This further image comprises a "background image", which is an image of the surface 200 and an object having the same colour as the paper on which photographic mat 34 is printed. Such a background image may be recorded by placing a blank sheet of paper having the same colour as the sheet on which photographic mat 34 is recorded on surface 200, or by turning the photographic mat 34 over on surface 200 so that the pattern thereon is not visible in the image.

FIG. 4 shows the processing operations performed by processing apparatus 2 to process input data in this embodiment.

Referring to FIG. 4, at step S4-2, central controller 20 causes display processor 110 to display a message on display device 4 requesting the user to input data for processing.

At step S4-4, data input by the user in response to the request at step S4-2 is stored in the input data store 40. More particularly, in this embodiment, the input data comprises image data defining the images of the object 210 and photographic mat 34 recorded at different positions and orientations relative to the camera 230, the "background image" showing the surface 200 on which photographic mat 34 was placed to record the input images together with an object having the same colour as the recording material on which the calibration pattern of photographic mat 34 is printed, and data defining the intrinsic parameters of the camera 230 which recorded the input images, that is the aspect ratio, focal length, principal point (the point at which the optical axis intersects the imaging plane), the first order radial distortion coefficient, and the skew angle (the angle between the axes of the pixel grid).

At step S4-6, camera calculator 50 processes the input data stored at step S4-4 to determine the position and orientation of the camera 230 relative to the calibration pattern on the photographic mat 34 (and hence relative to the object 210) for each input image. This processing comprises, for each input image, detecting the features in the image which make up the calibration pattern on the photographic mat 34 and comparing the features to the stored pattern for the photographic mat to determine the position and orientation of the camera 230 relative to the mat. The processing performed by camera calculator 50 at step S4-6 depends upon the calibration pattern of features used on the photographic mat 34. Accordingly, suitable processing is described, for example, in co-pending PCT application GB00/04469, JP-A-9-170914, "Automatic Reconstruction of 3D Objects Using A Mobile Camera" by Niem in Image and Vision Computing 17 (1999) pages 125–134 and "The Lumigraph" by Gortler et al in Computer Graphics Proceedings, Annual Conference Series, 1996 ACM-0-89791-764-4/96/008.

At step S4-8, image data segmenter 60 processes each input image to segment image data representing the object 210 form image data representing the photographic mat 34 and the surface 200 on which the mat 34 is placed (step S4-8 being a preliminary step in this embodiment to generate data for use in the subsequent generation of a 3D computer model of the surface of object 210, as will be described in more detail below).

FIG. 5 shows the processing operations performed by image data segmenter 60 at step S4-8.

Referring to FIG. 5, at steps S5-2 to S5-10, image data segmenter 60 builds a hash table of quantised values representing the colours in the input images which represent the photographic mat 34 and the background 200 but not the object 210 itself.

More particularly, at step S5-2, image data segmenter 60 reads the RBG data values for the next pixel in the "background image" stored at step S4-4 in FIG. 4 (that is, the final image to be input to processing apparatus 2 which shows the surface 200 and an object having the same colour as the material on which photographic mat 34 is printed).

At step S5-4, image data segmenter 60 calculates a quantised red (R) value, a quantised green (G) and a quantised blue (B) value for the pixel in accordance with the following equation:

$$q = \frac{(p+t/2)}{t} \quad (1)$$

where:

"q" is the quantised value;

"p" is the R, G or B value read at step S5-2;

"t" is a threshold value determining how near RGB values from an input image showing the object 210 need to be to background colours to be labelled as background. In this embodiment, "t" is set to 4.

At step S5-6, image data segmenter 60 combines the quantised R, G and B values calculated at step S5-4 into a "triple value" in a conventional manner.

At step S5-8, image data segmenter 60 applies a hashing function to the quantised R, G and B values calculated at step S5-4 to define a bin in a hash table, and adds the "triple" value defined at step S5-6 to the defined bin. More particularly, in this embodiment, image data segmenter 60 applies the following hashing function to the quantised R, G and B values to define the bin in the hash table:

$$h(q)=(q_{red}\&7)*2^{\wedge}6+(q_{green}\&7)*2^{\wedge}3+(q_{blue}\&7) \quad (2)$$

That is, the bin in the hash table is defined by the three least significant bits of each colour. This function is chosen to try and spread out the data into the available bins in the hash table, so that each bin has only a small number of "triple" values. In this embodiment, at step S5-8, the "triple" value is added to the bin only if it does not already exist therein, so that each "triple" value is added only once to the hash table.

At step S5-10, image data segmenter 60 determines whether there is another pixel in the background image. Steps S5-2 to S5-10 are repeated until each pixel in the "background" image has been processed in the manner described above. As a result of this processing, a hash table is generated containing values representing the colours in the "background" image.

At steps S5-12 to S5-48, image data segmenter 60 considers each input image in turn and uses the hash table to segment the data in the input image relating to the photographic mat 34 and background from the data in the input image relating to the object 210. The result of the segmentation processing is displayed on display device 4.

In this embodiment, the "background" image processed at steps S5-2 to S5-10 to generate the hash table does not show the calibration features on the photographic mat 34. Accordingly, the segmentation performed at steps S5-12 to S5-48 does not distinguish pixel data relating to the object 210 from pixel data relating to a calibration feature on the photographic mat 34. Instead, in this embodiment, the processing performed by surface modeller 80 to generate the 3D computer model of the surface of object 210 is carried out in such a way that pixels relating to a calibration feature on photographic mat 34 do not contribute to the surface model, as will be described in more detail below.

At step S5-12, image data segmenter 60 considers the next input image, and at step S5-14 reads the R, G and B values for the next pixel in the input image (this being the first pixel the first time step S5-14 is performed).

At step S5-16, image data segmenter 60 calculates a quantised R value, a quantised G value and a quantised B value for the pixel using equation (1) above.

At step S5-18, image data segmenter 60 combines the quantised R, G and B values calculated at step S5-16 into a "triple value".

At step S5-20, image data segmenter 60 applies a hashing function in accordance with equation (2) above to the quantised values calculated at step S5-16 to define a bin in the hash table generated at steps S5-2 to S5-10.

At step S5-22, image data segmenter 60 reads the "triple" values in the hash table bin defined at step S5-20, these "triple" values representing the colours of the material of the photographic mat 34 and the background surface 200.

At step S5-24, image data segmenter 60 determines whether the "triple" value generated at step S5-18 of the pixel in the input image currently being considered is the same as any of the background "triple" values in the hash table bin.

If it is determined at step S5-24 that the "triple" value of the pixel is the same as a background "triple" value, then, at step S5-26, it is determined that the pixel is a background pixel and the value of the pixel is set to "black".

On the other hand, if it is determined at step S5-24 that the "triple" value of the pixel is not the same as any "triple" value of the background, then, at step S5-28, it is determined that the pixel is part of the object 210 and image data segmenter 60 sets the value of the pixel to "white".

At step S5-30, image data segmenter 60 determines whether there is another pixel in the input image. Steps S5-14 to S5-30 are repeated until each pixel in the input image has been processed in the manner described above.

At steps S5-32 to S5-46, image data segmenter 60 performs processing to correct any errors in the classification of image pixels as background pixels or object pixels, and to display the result of the segmentation processing on display device 4.

More particularly, at step S5-32, image data segmenter 60 defines a circular mask for use as a median filter. In this embodiment, the circular mask has a radius of 4 pixels.

At step S5-34, image data segmenter 60 performs processing to place the centre of the mask defined at step S5-32 at the centre of the next pixel in the binary image generated at steps S5-26 and S5-28 (this being the first pixel the first time step S5-34 is performed).

At step S5-36, image data segmenter 60 counts the number of black pixels and the number of white pixels within the mask.

At step S5-38, image data segmenter 60 determines whether the number of white pixels within the mask is greater than or equal to the number of black pixels within the mask.

If it is determined at step S5-38 that the number of white pixels is greater than or equal to the number of black pixels, then, at step S5-40 image data segmenter 60 sets the value of the pixel on which the mask is centred to white. On the other hand, if it is determined at step S5-38 that the number of black pixels is greater than the number of white pixels then, at step S5-42, image data segmenter 60 sets the value of the pixel on which the mask is centred to black.

At step S5-44, display processor 110 displays on display device 4 a reduced resolution version (a "thumb nail" image) of the input image currently being processed and displays in the thumb nail image the result of the segmentation processing previously performed on the pixel at steps S5-34 to S5-42. Thus, the thumb nail image is changed incrementally to show the result of the segmentation processing as each pixel in the input image is processed. In this embodiment, display processor 110 displays the result of the segmentation processing in the thumb nail image so that image data in the input image which is determined to represent the background is presented as a predetermined colour, for example blue, in the thumb nail image.

As a result of displaying the thumb nail image in this way, the user sees which parts of the input image have been processed and the result of the segmentation processing, and hence can determine whether any amendment is necessary.

At step S5-46, image data segmenter 60 determines whether there is another pixel in the binary image, and steps S5-34 to S5-46 are repeated until each pixel has been processed in the manner described above.

At step S5-48, image data segmenter 60 determines whether there is another input image to be processed. Steps S5-12 to S5-48 are repeated until each input image has been processed in the manner described above.

Referring again to FIG. 4, at step S4-10, central controller 20 determines whether a signal has been received from a user via a user input device 6 indicating that the user wishes to amend an image segmentation generated at step S4-8 (this signal being generated by the user in this embodiment by pointing and clicking on the thumb nail image displayed on display device 4 corresponding to the segmentation which it is desired to amend).

If it is determined at step S4-10 that an image segmentation is to be changed then, at step S4-12, image segmentation editor 70 amends the segmentation selected by the user at step S4-10 in accordance with user input instructions.

FIG. 6 shows the processing operations performed by image segmentation editor 70 during the interactive amendment of an image segmentation at step S4-12.

Referring to FIG. 6, at step S6-2, image segmentation editor 70 causes display processor 110 to display the image segmentation selected by the user at step S4-10 (by pointing and clicking on the corresponding thumb nail image) on display device 4 for editing. More particularly, referring the FIG. 7, in this embodiment, the image segmentation 318 selected by the user at step S4-10 from all of the displayed thumb nail images 310-324 is displayed in a window 400 in a form larger than that in the thumb nail image. In this embodiment, the image segmentation displayed in window 400 has the same number of pixels as the input image which was processed to generate the segmentation. In addition, the border of the thumb nail image selected by the user (thumb nail image 318 in the example of FIG. 7) is highlighted, or the thumb nail image is otherwise distinguished from the other thumb nail images, to indicate that this is the segmentation displayed in enlarged form for editing.

Also at step S6-2, image segmentation editor 70 causes display processor 110 to display a window 402 moveable by the user over the displayed image segmentation within window 400. In addition, image segmentation editor 70 causes display processor 110 to display a further window 410 in which the part of the image segmentation contained in window 402 is shown in magnified form so that the user can see which pixels were determined by the image data segmenter 60 at step S4-8 to belong to the object 210 or to features on the photographic mat 34 and which pixels were determined to be background pixels.

At step S6-4, image segmentation editor 70 changes the pixels displayed in window 410 from background pixels to object pixels (that is, pixels representing object 210 or features on the photographic mat 34) and/or changes object pixels to background pixels in accordance with user instructions. More particularly, for editing purposes, image segmentation editor 70 causes display processor 110 to display a pointer 412 which, in this embodiment, has the form of a brush, which the user can move using a user input device 6 such as a mouse to designate pixels to be changed in window 410. In this embodiment, each pixel which the user touches with the pointer 412 changes to an object pixel if it was previously a background pixel or changes to a background pixel if it was previously an object pixel. In this embodiment, the segmentation editor 70 causes display processor 110 to display a user-selectable button 350, the selection of which causes pointer 412 to become wider (so that more pixels can be designated at the same time thereby enabling large areas in window 410 to be changed quickly) and a user-selectable button 360, the selection of which causes the pointer 412 to become narrower.

By performing processing in this way, the user is, for example, able to edit a segmentation generated by image data segmenter 60 to designate as background pixels any pixels mistakenly determined by image data segmenter 60 to relate to the subject object 210 (for example pixel data relating to the mark 220 on surface 200 which would not be separated from image data relating to subject object 210 by image data segmenter 60 if it has the same colour as a colour in subject object 210) and/or to designate as background pixels relating to each calibration feature on the photographic mat 34 which touches the outline of the subject object 210 in an image segmentation (as shown in the example of FIG. 7) which, if not corrected, have been found to cause errors in the three-dimensional computer model of the subject object subsequently generated by surface modeller 80. Similarly, the user is able to designate as background pixels relating to shadows on the photographic mat 34 and/or surface 200 which have mistakenly been determined by image data segmenter 60 to be pixels relating to the subject object 210.

At step S6-6, after the user has finished editing the segmentation currently displayed (by pointing and clicking on a different thumb nail image 310-324 or by pointing and clicking on the "start processing" button 340), display processor 110 changes the displayed thumb nail image corresponding to the segmentation edited by the user at step S6-4 (thumb nail image 318 in the example of FIG. 7) to show the changes to the image segmentation made by the user at step S6-4.

Referring again to FIG. 4, at step S4-14, image segmentation editor 70 determines whether the user wishes to make any further changes to an image segmentation, that is, whether the user has pointed and clicked on a further thumb nail image 310-324.

When it is determined at step S4-10 or step S4-14 that no further changes are to be made to an image segmentation (that is, the user has pointed and clicked on the "start processing" button 340), then processing proceeds to step S4-16.

At step S4-16, surface modeller 80 performs processing to generate data defining a 3D computer model of the surface of subject object 210.

FIG. 8 shows the processing operations performed by surface modeller 80 at step S4-16.

Referring to FIG. 8, at step S8-2, silhouette approximator 82 processes the segmented image data previously generated by image data segmenter 60 at step S4-8 and image segmentation editor 70 at step S4-12 to approximate the silhouette (that is, the outline) of the subject object in each input image with straight lines and to assign a unique label to each straight line. In this embodiment, to approximate the subject object silhouette in each image with straight lines, silhouette approximator 82 performs processing in a conventional manner, for example as described in "Dynamic Strip Algorithm in Curve Fitting" by M. K. Leung and Y. H. Yang in Computer Vision Graphics and Image Processing 51(2): 145–165, August 1990.

As a result of performing the processing at step S8-2, the silhouette of the subject object in each image is approximated by a plurality of connected straight lines, as illustrated in FIG. 9, which shows an approximation of the object silhouette resulting from processing of input image 302 in FIG. 3. It should be noted, however, that in the example of FIG. 9 (and in all subsequent Figures which show silhouettes), the number of straight lines which are shown approximating the silhouette may be far fewer than would actually be generated in practice by silhouette approximator 82 at step S8-2.

Referring to FIG. 10, at this stage in the processing, the silhouette 500–514 in each input image has been approximated by straight line segments, and the position and orientation of each silhouette in three-dimensional space is known as a result of the calculations performed at step S4-6 by camera calculator 50 to determine the position and orientation of each input image (each silhouette 500–514 lying in the two-dimensional plane of an input image). In addition, the position of the focal point of the camera 230 in three-dimensional space is known for each input image as a result of the calculations performed by camera calculator 50 at step S4-6.

Each silhouette defines, together with the focal point 515–519 of the camera 230 which recorded the image in which the silhouette is situated, an infinite cone in three-dimensional space which touches the surface of the subject object 210 at (as yet unknown) points in the three-dimensional space (because the silhouette defines the outline of the object surface in the image). This is illustrated in FIG. 10 for silhouette 502, which, together with focal point position 515, defines cone 520. The cross-section of the cone is the same shape as the silhouette, and each cone is therefore made up of a plurality of infinite planar triangles, each triangle defined by lines passing through the end points of one of the straight line segments approximating the silhouette and the focal point of the camera 230 (each planar triangle therefore being defined by the projection of a silhouette straight line segment into 3D space). Accordingly, each cone is an infinite polyhedron made up of infinite triangular planar faces which all meet at the focal point of the camera 230.

The intersection of the cones defined by all of the silhouettes 500–514 defines the bounding surface of the subject object in three-dimensional space. Consequently, a three-dimensional computer model of the subject object can be generated by calculating the intersection of all of the cones, that is the visual hull.

In this embodiment, the intersection of the cones is calculated by calculating the intersections of the planar triangles making up each cone. Any 3D point at which three of the planar triangles from at least two different cones (that is, from at least two different silhouettes) meet may define a vertex of the surface of the subject object 210. The case where three triangles from different respective silhouettes meet is illustrated in FIG. 10 for triangles 522, 524 and 526 which meet at 3D point 528. In the case where three triangles from two silhouettes meet, the triangles which originate from the same silhouette are defined by the 3D projection of adjacent straight line segments in the silhouette (that is, straight line segments which meet at a vertex point in the silhouette). This is illustrated in FIG. 10 for planes 530, 532 and 534 which meet at 3D point 536 (planes 530 and 532 being defined by adjacent line segments 531, 533 in silhouette 514 and point 536 lying on the edge where planes 530 and 532 meet).

To ensure that the generated 3D computer model accurately represents the surface of the subject object 210, each intersection of triangles which results in a vertex of the surface of the subject object needs to be computed. As will be described in the third embodiment, this could be achieved by testing each triangle defined by a line segment in each silhouette against every triangle defined by all of the other line segments in all of the other silhouettes to generate a complete set of 3D points. However, the number of computations necessary to calculate 3D points representing vertices of the subject object surface in this way is extremely large. More particularly, if the total number of silhouettes is "m" and the total number of straight lines in the silhouettes is "n", then $O(mn^3)$ computations would be required. In addition, much of the computation will be unnecessary because many of the triangles tested will not intersect (and hence will not lead to the generation of a 3D point) and because 3D points which do not lie on the surface of subject object 210 may be generated by chance intersection of triangles (so that the 3D points will need to be processed further to determine which ones actually represent vertices for the model of the subject object 210).

Consequently, in this embodiment, processing is performed in a way which reduces the number of computations necessary to calculate 3D points representing vertices of the subject object surface.

Before describing this processing in detail, the principles of the processing will be described.

More particularly, in this embodiment, processing is performed to consider a volume of 3D space and to test the volume to determine whether:

(1) the volume can be discarded, either because there are not enough planar triangles in the volume (that is, three in this embodiment) to intersect to generate a 3D point, or because the planar triangles in the volume cannot intersect at a 3D point which represents a vertex of the surface of the subject object 210 (as will be explained in more detail below);

(2) the volume is to be subdivided to consider smaller volumes, because the volume contains enough planar triangles to intersect and generate more than a predetermined number of 3D points (in this embodiment one 3D point) which may represent a vertex of the surface of the subject object 210; or (3) the volume contains the correct number of planar triangles (three in this embodiment) to intersect and generate a sufficiently small predetermined number (one in this embodiment) of 3D points which may represent vertices of the surface of the subject object 210, in which case the 3D positions of these points are calculated and tested to determine whether they actually represent vertices of the subject object 210.

In this way, the processing ensures that all vertices of the surface of the subject object 210 defined by the intersection of the silhouette cones are calculated, while avoiding unnecessary processing which does not lead to the calculation of such a 3D point. In particular, large volumes of 3D space can be discarded without further calculation.

In this embodiment, the tests on a volume of 3D space to determine whether it is to be discarded, subdivided or a 3D point calculated are carried out by projecting the 3D volume into each two-dimensional image, and testing the 2D projection of the 3D volume against the straight lines making up each silhouette in the images (previously generated at step S8-2). By performing the tests in 2D in this way, the number of processing operations which need to be performed to test the volume is reduced.

To determine whether a volume can be discarded because the planar triangles therein cannot intersect at a 3D point which represents a vertex of the surface of the subject object 210, processing is performed to determine whether the 3D point will lie within all of the cones (polyhedra) defined by the silhouettes not contributing a plane which intersects at the 3D point. Thus, referring to the example shown in FIG. 10, in the case of planes 530, 532 and 534 processing is performed to determine whether the 3D point 536 will lie within all of the cones defined by silhouettes 500, 502, 504, 506, 508 and 510 (because these silhouettes do not define one of the three planes intersecting at the 3D point 536). In this embodiment, this processing is carried out by testing the 2D projection of the volume in each image to ensure that the 2D projection lies inside each silhouette. That is, the tests are performed in 2D, which reduces the processing operations which need to be performed.

In this embodiment, when a 3D point is calculated, it is subsequently tested to determine whether it represents a vertex of the subject object 210. This is because a 3D point is calculated when a 3D volume is identified which contains three planar triangles. However, the three planar triangles may not actually intersect at a 3D point within the volume. Accordingly, a test is carried out in this embodiment to determine whether the calculated 3D point is within the identified volume.

The processing in this embodiment assumes that the surface of the subject object is a simple polyhedron, that is, there are no coincidences where more than three planes meet at a single 3D point. In computer graphics applications, this is a trivial restriction because this situation can always be obtained, without affecting the visual result, by adding a small amount of random noise to the data defining the straight lines approximating each silhouette, if necessary.

The processing performed in this embodiment to calculate 3D points representing vertices of the surface of subject object 210 will now be described in detail.

Referring again to FIG. 8, at step S8-4, silhouette approximator 82 processes the data generated at step S8-2 for each silhouette to calculate a bounding box for each straight line segment therein and to store the bounding box data in a respective quad-tree structure for each silhouette.

This processing is performed prior to the calculation of any 3D vertex of the surface of the subject object 210 because, as will be explained later, the data resulting from step S8-4 is used to determine which straight lines in a silhouette do not need to be considered during processing to calculate 3D points because the processing of such straight lines cannot generate 3D vertices of the surface of the subject object 210.

FIG. 11 shows the processing operations performed by silhouette approximator 82 at step S8-4.

Referring to FIG. 11, at step S11-2, silhouette approximator 82 considers the next silhouette to be processed (this being the first silhouette the first time step S11-2 is performed), and at step S11-4, calculates a bounding box which has sides parallel to the image sides for each straight line approximating the silhouette which was generated at step S8-2.

More particularly, referring to FIG. 12 by way of example, silhouette approximator 82 calculates a bounding box (indicated by the dotted lines in FIG. 12) for each straight line segment making up the silhouette such that each side of a bounding box is parallel to a side of the image—the straight line in the silhouette for which the bounding box is calculated therefore being a diagonal of the bounding box. In the case of a straight line in the silhouette which is itself parallel to a side of the image (that is, lines 550 and 552 in the example of FIG. 12) the bounding box is defined to have zero width in the direction perpendicular to the line (although the bounding boxes for lines 550 and 552 in the example of FIG. 12 are shown with a small width in order that the bounding box can be seen in the Figure).

Silhouette approximator 82 stores the minimum and maximum x values and the minimum and maximum y values of each bounding box in the root node of a conventional quad-tree (these values being indicated for bounding box 554 in the example shown in FIG. 12).

At step S11-6, silhouette approximator 82 determines the range of x values and the range of y values stored in the quad-tree node currently being considered (this being the root node generated at step S11-4 the first time step S11-6 is performed). That is, at step S11-6, silhouette approximator 82 calculates the difference between the smallest x value and the largest x value, and the difference between the smallest y value and the largest y value.

At step S11-8, silhouette approximator 82 creates two child nodes in the quad-tree by splitting the node currently being considered at the median of the values in the coordinate determined at step S11-6 to have the largest range. That is, if it is determined at step S11-6 that the range of y values is larger than the range of x values, silhouette approximator 82 splits the node at the median of the y values, otherwise the split is made at the median of the x values.

Thus, referring to the example shown in FIG. 12, because the range of y values is greater than the range of x values, silhouette approximator 82 creates two child nodes 560 and 562 by defining a line 564 perpendicular to the y axis which passes through the median value of the y values (that is, the median line segment end point of the silhouette). In the example of FIG. 12, there are seventeen line end points, and accordingly the line 564 is defined to pass through the end point such that there are eight line segment end points above the line 564 and eight line segment end points below the line 564. If there is an even number of values, then in this embodiment, silhouette approximator 82 defines line 564 to pass through the mid-point of the two values which straddle the median.

At step S11-10, silhouette approximator 82 allocates bounding boxes calculated at step S11-4 from the parent node to be child nodes created at step S11-8.

More particularly, silhouette approximator 82 allocates a bounding box to a child node if it lies wholly or partially within the child node or if it touches the child node. Thus, referring to the example shown in FIG. 12, each bounding box lying wholly above line 564 is allocated to child node 560, and each bounding box lying wholly below line 564 is allocated to child node 562. Bounding boxes 570, 572 and 574 are allocated to both child node 560 and child node 562 because each of these bounding boxes lies partially in child node 560 and partially in child node 562. Bounding boxes 576 and 578 are allocated to both child node 560 and child node 562 because each of these bounding boxes touches the line 564 defining the boundary of the child nodes 560 and 562.

At step S11-12, silhouette approximator 82 considers the next child node, and at step S11-14, determines whether the number of bounding boxes in the child node is the same as the number of bounding boxes in the parent node.

If it is determined at step S11-14 that the number of bounding boxes in the child node and the parent node is the same, then further sub-division of the child node is unnecessary because separation of the bounding boxes between further child nodes would not be possible (each further child note would contain all of the bounding boxes from the parent). In addition, it is unnecessary to keep the current child node considered at step S11-12 because it contains the same bounding boxes as its parent, and it is also unnecessary to keep the other child node created at step S11-8 (that is, the sibling of the child node considered at step S11-12) because that child node does not contain any bounding boxes (all of the bounding boxes from the parent are in the current child node considered at step S11-12).

Accordingly, when it is determined at step S11-14 that the number of bounding boxes in the child node is the same as the number in the parent node, processing proceeds to step S11-16, at which silhouette approximator 82 deletes the child node considered at step S11-12 and the sibling node created at step S11-8. Processing then proceeds to step S11-20.

On the other hand, if it is determined at step S11-14 that the number of bounding boxes in the child node is not the same as the number in the parent node, processing proceeds to step S11-18, at which silhouette approximator 82 determines whether the number of bounding boxes in the child node is equal to two.

If it is determined at step S11-18 that the number of bounding boxes in the child node is equal to two, then further sub-division of the child node is not performed in this embodiment because a child node has already been obtained with a sufficiently small number of bounding boxes in it. Accordingly, processing proceeds to step S11-20.

On the other hand, if it is determined at step S11-18 that the number of bounding boxes in the child node is not equal to two, then processing returns to step S11-6. Steps S11-6 to S11-18 are repeated to repeatedly create and subdivide child nodes until it is determined at step S11-14 that the number of bounding boxes in a child node and its parent node are the same or until it is determined at step S11-18 that a child node has been generated containing two bounding boxes.

At step S11-20, silhouette approximator 82 determines whether there is another child node to be processed, and steps S11-12 to S11-20 are repeated until each child node has been processed in the way described above.

At step S11-22, silhouette approximator 82 determines whether there is another silhouette to be processed, and steps S11-2 to S11-22 are repeated until each silhouette has been processed in the way described above.

Referring again to FIG. 8, at step S8-6, 3D point calculator 84 performs processing to calculate 3D points representing vertices of the surface of the subject object 210.

FIG. 13 shows the processing operations performed by 3D point calculator 84 at step S8-6.

Referring to FIG. 13, at step S13-2, 3D point calculator 84 defines a volume in 3D space in which the subject object 210 lies, and hence in which all calculated 3D points representing points on the object surface will lie.

Referring to FIG. 14a, in this embodiment, the start volume defined by 3D point calculator 84 at step S13-2 comprises a cuboid 600 having vertical side faces and horizontal top and bottom faces. The vertical side faces are positioned so that they touch the edge of the calibration pattern of features on the photographic mat 34 (and therefore wholly contain the subject object 210). The position of the top face of the cuboid 600 is set at a position defined by intersecting a line 610 from the focal point 612 of the camera 230 through the top edge of any one of the input images stored at step S4-4 with a vertical line 614 through the centre of the photographic mat 34. More particularly, the focal point 612 of the camera 230 and the top edge of an image are known as a result of the position and orientation calculations performed at step S4-16 and, by setting the height of the top face to correspond to the point where the line 610 intersects the vertical line 614 through the centre of the photographic mat 34, the top face will always be above the top of the subject object 210 (provided that the top of the subject object 210 is visible in each input image). The position of the horizontal base face of the cuboid 600 is set at a position defined by intersecting a line 616 from the focal point 612 of the camera 230 through the bottom edge of any one of the input images stored at step S4-4 with the vertical line 614 through the centre of the photographic mat 34. This ensures that the base of the cuboid 600 extends below the bottom of the subject object 210 (provided that the base of the subject object 210 is visible in each input image).

In this embodiment, by imaging the subject object 210 as illustrated in FIG. 2 in which camera 230 is mounted on a tripod in a fixed position and the photographic mat 34 with subject object 210 thereon is moved relative to the camera, the camera 230 will always be outside the cuboid 600 when each image was recorded. However, instead of moving the photographic mat 34 and subject object 210 relative to stationary camera 230, it is possible to move camera 230 to different positions and orientations while leaving the photographic mat 34 and subject object 210 stationary. In this case, as illustrated in FIG. 14*b*, the position of camera 230 may be within cuboid 600 when an image is recorded to show the top of the subject object 210 from an elevated viewpoint. Since the processing to be performed by 3D point calculator 84 in this embodiment projects the cuboid 600 into the images recorded by camera 230 to determine information about what is contained in the projected volume, the cuboid 600 needs to lie completely in front of the camera 230 for all recorded images. Consequently, in this embodiment, 3D point calculator 84 tests the cuboid 600 against the camera positions and orientations calculated at step S4-6 and, as illustrated in FIG. 14*c*, adjusts the cuboid 600 so that each corner thereof is in front of every calculated camera position.

Referring again to FIG. 13, at step S13-4, 3D point calculator 84 adds the 3D volume defined at step S13-2 (that is, cuboid 600 in the example of FIGS. 14*a*, *b* and *c*) to the top of a storage stack, and at step S13-6 pops the next volume off the top of the stack (this being the initial volume defined at step S13-2 the first time step S13-6 is performed).

At step S13-8, 3D point calculator 84 determines the state of the volume popped off the stack at step S13-6.

In this processing, 3D point calculator 84 determines whether the volume popped off the stack at step S13-6 cannot contain any 3D vertex of the surface of the subject object 210 (and hence can be discarded), whether the volume needs to be subdivided because it may contain more than one 3D vertex of the surface of the subject object 210, or whether the volume contains planes which may define just a single vertex of the subject object surface, in which case the position of the 3D vertex can be calculated and tested. In this embodiment, 3D point calculator 84 performs these determinations by projecting the 3D volume popped off the stack at step S13-6 into each image and testing the resulting 2D projection against the straight lines approximating each silhouette previously calculated at step S8-2.

FIG. 15 shows the processing operations performed by 3D point calculator 84 at step S13-8.

Referring to FIG. 15, at step S15-2, 3D point calculator 84 projects the corners of the volume popped of the stack at step S13-6 into the two-dimensional imaging plane of camera 230 for each imaging position and orientation previously calculated at step S4-6, and retains data defining the connectivity of the projected corners.

The result of this projection, which is illustrated in FIG. 16 for one image, is a 2D projection 650 comprising eight points 620-634 defining six enclosed regions within the two-dimensional imaging plane (it being noted that these regions may overlap). In the example of FIG. 16, the six regions defined by the points are the regions defined by the groups of points (620, 622, 624, 626), (620, 622, 630, 628), (622, 630, 632, 624), (624, 632, 634, 626), (626, 620, 628, 634), and (628, 630, 632, 634).

At step S15-4, 3D point calculator 84 sets the value of a counter nv to be 0. As will be explained below, this counter represents the number of cameras on an "active camera" list in which at least one "verified vertex" (that is, a point at which two adjacent straight lines in a silhouette meet which lies within the 2D projected volume 650) has been detected. The list of active cameras comprises a list of the silhouettes generated at step S8-2 which are to be considered during processing. Initially, the active camera list contains all of the silhouettes but, as will be explained below, a silhouette is deleted from the list when it is determined that the silhouette encloses the 2D projected region 650 generated at step S15-2. More particularly, because the silhouette encloses the 2D projected region 650, it will therefore enclose all projected child volumes, and so to prevent the child volumes being generated and tested, the silhouette is removed from the active camera list.

At step S15-6, 3D point calculator 84 sets the value of a counter ne equal to 0. As will be explained below, the value of this counter represents the number of cameras on the active camera list in which at least one "verified edge" (that is, a straight line from a silhouette lying within the 2D projected volume 650) has been detected.

At step S15-8, 3D point calculator 84 sets the value of a counter np equal to 0. As will be explained below, the value of this counter represents the number of planar triangles (that is, triangles defined by a straight line segment—or "edge"—in a silhouette and the focal point of camera 230, as described above with reference to FIG. 10) which intersect the volume popped off the stack at step S13-6.

At step S15-10, 3D point calculator 84 sets the value of a flag "eitherSubdivideOrDiscard" to "false".

In subsequent processing, 3D point calculator 84 performs processing based on the relationship between the 2D projected volume 650 resulting from step S15-2 and the silhouette straight lines (edges) in each image resulting from the processing at step S8-2 to determine whether the 3D volume popped off the stack at step S13-6 can be discarded (because it does not contain any 3D vertices of the surface of the subject object 210), requires sub-division to consider smaller volumes (because it may contain more than one 3D vertex of the object surface) or it contains planes which may define a single vertex of the object surface (in which case the position of the vertex can be calculated and tested).

Before describing the specific processing steps carried out by 3D point calculator 84, a description will be given of the different relationships which may exist, and which are tested for by 3D point calculator 84, between the 2D projected volume 650 and the silhouette in an image. In addition, a description will be given of how 3D point calculator 84 determines what processing to perform on the volume popped off the stack at S13-6 based on the determined relationship between the silhouette and 2D projected volume 650 for each image.

Figure 17A:
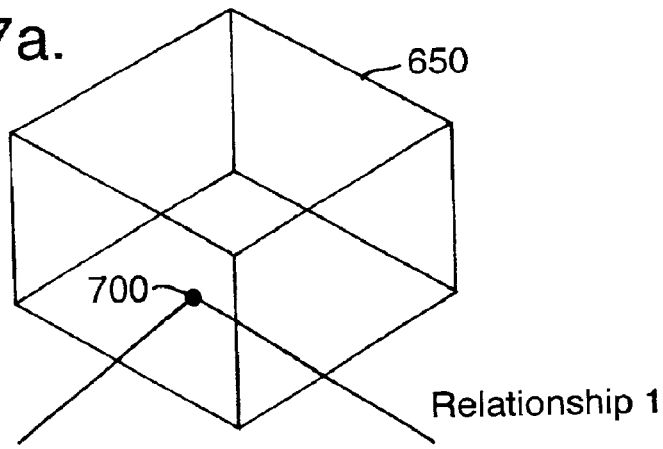

FIGS. 17*a* to 17*h* illustrate eight different relationships which the silhouette and the 2D projected volume 650 in an image may take and which are tested for by 3D point calculator 84. Referring to FIG. 17*a*, in a first relationship, one, and only one, vertex 700 of the silhouette (that is, a point in the silhouette at which two consecutive straight line segments making up the silhouette meet) lies within one of the six two-dimensional regions of the projected volume 650 (these regions being defined by the projected corners of the volume as described previously).

Figure 17B:
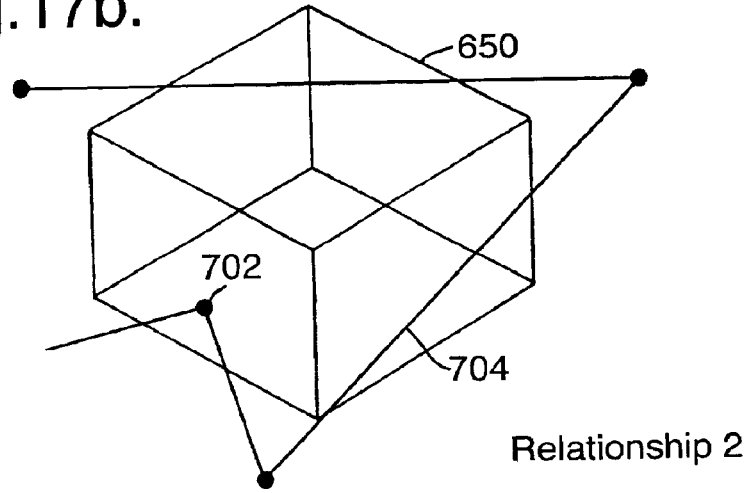

Referring to FIG. 17*b*, in a second relationship, one, and only one, vertex 702 lies within the 2D projected volume 650 and in addition at least one straight line segment 704 not having a vertex in the projected volume lies within the two-dimensional projected volume 650.

Figure 17C:
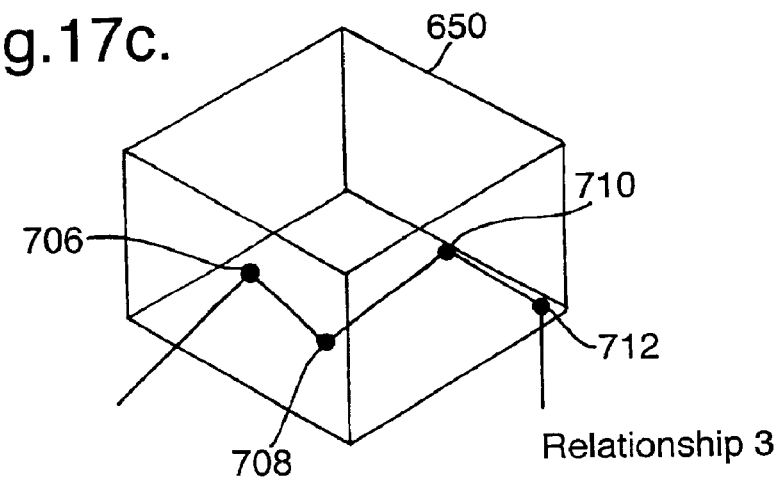

Referring to FIG. 17*c*, in a third relationship, the two-dimensional projected volume 650 contains more than one silhouette vertex (in the example of FIG. 17c, four silhouette vertices 706, 708, 710 and 712 are shown, although this third relationship is determined to exist when any number of vertices greater than or equal to two lie within the 2D projected volume 650).

Figure 17D:
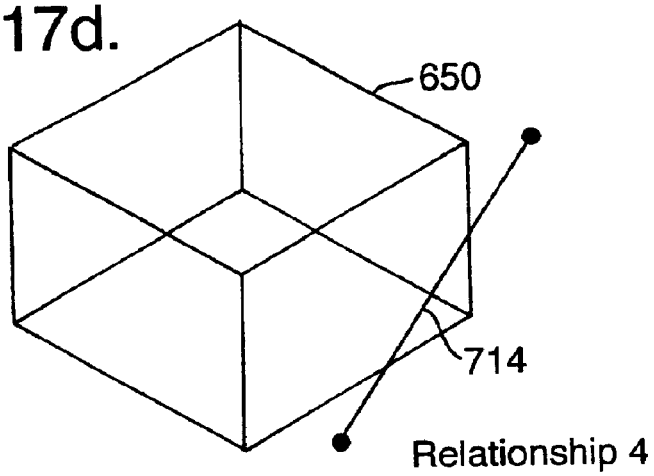

Referring to FIG. 17d, in a fourth relationship, one, and only one, single straight line segment 714 of the silhouette lies within the two-dimensional projected volume 650 and neither of the vertices of the straight line segment 714 lie in the projected volume 650.

Figure 17E:
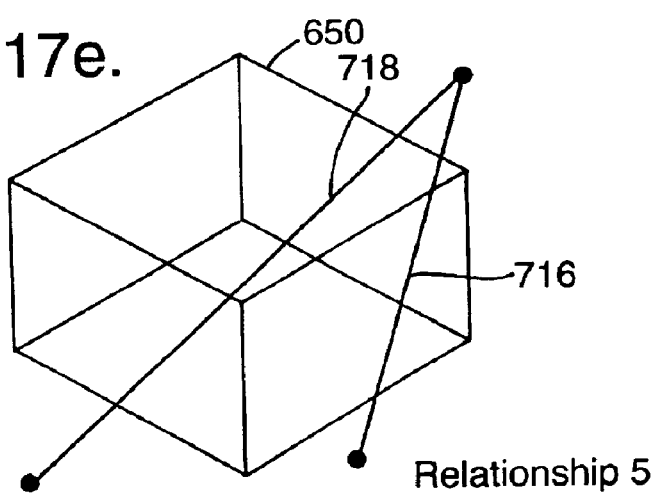

Referring to FIG. 17e, in a fifth relationship, the two-dimensional projected volume 650 contains at least two straight line segments 716, 718 of the silhouette which do not have a vertex lying in the two-dimensional projected volume 650.

Figure 17F:
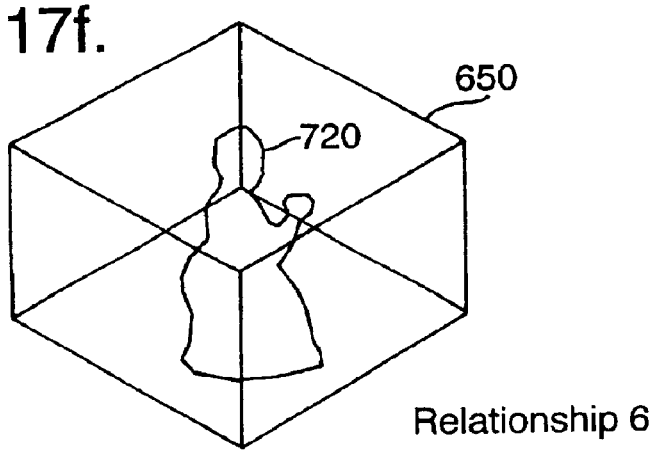

Referring to FIG. 17f, in a sixth relationship, the silhouette 720 lies wholly inside the boundary of the two-dimensional projected volume 650. This sixth relationship is a special case of relationship 3 described above with reference to FIG. 17c (the 2D projected volume 650 contains at least one silhouette vertex), and both relationship 3 and relationship 6 influence the decision about how to process the volume popped off the stack at step S13-6 in the same way. Accordingly, in this embodiment, relationship 6 is not explicitly identified by 3D point calculator 84, and instead only relationship 3 is detected. This has the effect that processing is reduced because every vertex of the silhouette is not tested to determine if it is in the 2D projected volume 650 (which would be necessary if relationship 6 was to be explicitly identified).

Figure 17G:
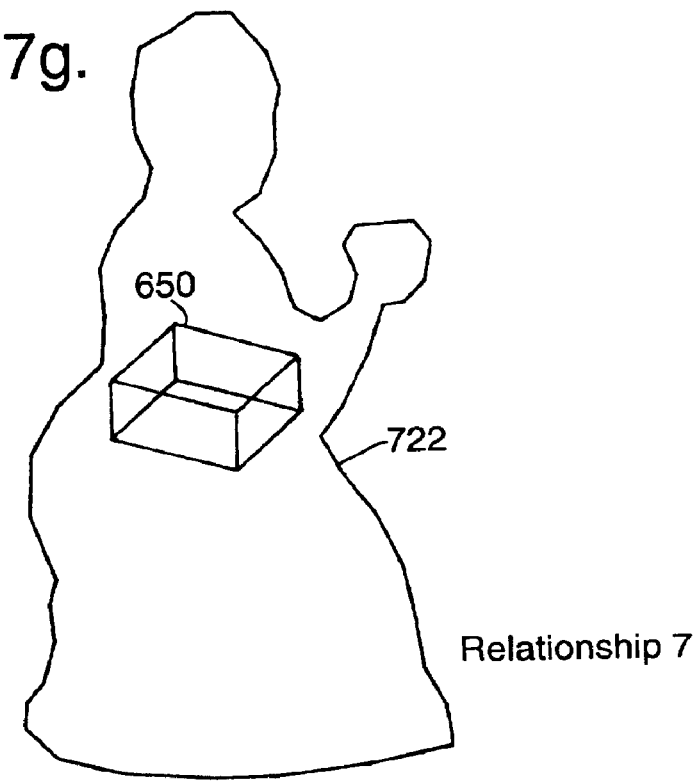

Referring to FIG. 17g, in a seventh relationship, the two-dimensional projected volume 650 lies wholly within the silhouette 722.

Figure 17H:
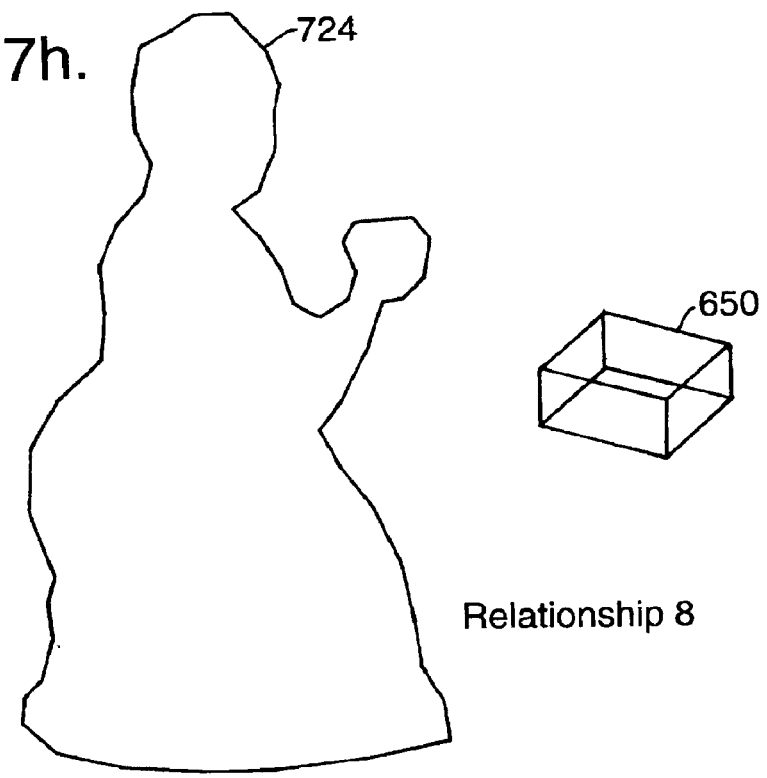

Referring to FIG. 17h, in an eighth relationship, the silhouette 724 and the two-dimensional projected volume 650 do not overlap.

Based on the relationship between the 2D projected volume 650 and the silhouette in each image, 3D point calculator 84 sets the state of the volume popped off the stack at step S13-6 (that is, determines how the volume is to be processed) as set out in the following eight cases, which are tested for by 3D point calculator 84. The eight cases are listed below in order of priority, such that any case higher in the list overrides any case lower in the list and the processing to be performed on the volume popped off the stack is determined based on the higher priority case.

VOLUME STATE CASE A: Set state to "discard the volume" if any image has relationship 8 (described above with reference to FIG. 17h) between the silhouette and the 2D projected volume 650. In relationship 8, the 2D projected volume 650 and the silhouette 724 do not overlap, and accordingly any 3D points in the volume popped off the stack at step S13-6 do not project to a point on or within the silhouette 724 and consequently cannot represent a vertex of the surface of subject object 210. Accordingly, the volume popped off the stack at step S13-6 is to be discarded.

VOLUME STATE CASE B: Set state to "calculate a 3D point" if 3, and only 3, images have relationship 4 (described above with reference to FIG. 17d) between the silhouette and the 2D projected volume 650, and the relationship in all of the other images is relationship 7 (described above with reference to FIG. 17g).

As described previously with reference to FIG. 10, a 3D vertex of the surface of subject object 210 is defined by the intersection of three planar triangles, each from a different silhouette, or by the intersection of two triangles from the same silhouette with one triangle from a further silhouette.

The case where three triangles from different silhouettes intersect at a 3D point is identified in this embodiment when three silhouettes having relationship 4 with the projected volume 650 described above with reference to FIG. 17d are found and the relationship between the silhouette in all other images and the projected volume 650 is relationship 7 described above with reference to FIG. 17g. More particularly, relationship 4 identifies that there is only a single edge of a given silhouette in the 2D projected volume 650 and accordingly three silhouettes having this relationship with the projected volume 650 identify three planar triangles (defined by the three respective edges which intersect the 2D projected volume 650) which may intersect at a 3D point in the volume popped off the stack at step S13-6. In addition, because the relationship between the silhouette and the projected volume 650 in every other image is relationship 7, the 3D point defined by the intersection of the three planar triangles projects to a point inside the silhouette in all of the images and accordingly represents a vertex of the surface of the subject object 210 (provided that the 3D point actually lies in the volume popped off the stack at step S13-6 and does not lie outside this volume).

VOLUME STATE CASE C: Set state to "calculate a 3D point" if 1 (and only 1) image has relationship 1 (described above with reference to FIG. 17a) between the silhouette and the 2D projected volume 650, 1 (and only 1) image has relationship 4 (described above with reference to FIG. 17d) and the relationship in all of the other images is relationship 7 (described above with reference to FIG. 17g).

This case C represents the case where two planar triangles from the same silhouette and a planar triangle from a different silhouette meet at a 3D point. More particularly, the relationship described above with reference to FIG. 17a, in which only a single silhouette vertex is present in the 2D projected volume 650, defines the two planar triangles from the same silhouette which meet at the 3D point (these planar triangles being defined by the silhouette edges which meet at the vertex 700 in the projected volume 650). The relationship described above with reference to FIG. 17d defines the planar triangle from the second silhouette which meets at the 3D point (that is, the planar triangle which passes through the end points of the straight line which intersects the 2D projected volume 650). As noted above, because the relationship between the silhouette and the projected volume 650 in all other images is relationship 7 described above with reference to FIG. 17g, the 3D point defined by the intersection of the two planar triangles from the first silhouette and the planar triangle from the second silhouette will project to a point within the silhouette in all other images, and accordingly will represent a vertex of the surface of subject object 210 (provided again that the 3D point actually lies within the volume popped off the stack at step S13-6).

VOLUME STATE CASE D: Set state to "discard the volume" if any of the following occur, all of which indicate that the volume popped off the stack at step S13-6 does not contain a sufficient number of planar triangles (that is, three) to intersect and define a 3D point which may lie on the surface of the subject object 210 (and consequently the volume is to be discarded):

(i) 1 (and only 1) image has relationship 1 (described above with reference to FIG. 17a) between the silhouette and 2D projected volume 650, and the relationship in all of the other images is relationship 7 (described above with reference to FIG. 17g);

(ii) 1 or 2 (but no more than 2) images have relationship 4 (described above with reference to FIG. 17d) between the silhouette and 2D projected volume 650, and the relationship in all of the other images is relationship 7 (described above with reference to FIG. 17g);

(iii) all of the images have relationship 7 (described above with reference to FIG. 17g) between the silhouette and the 2D projected volume 650.

VOLUME STATE CASE E: set state to "discard the volume" if 1 (and only 1) image has relationship 3 (described above with reference to FIG. 17c) or relationship 5 (described above with reference to FIG. 17e) between the silhouette and the 2D projected volume 650, and the relationship in all of the other images is relationship 7 (described above with reference to FIG. 17g). In this case, only one image contains a silhouette vertex or edge within the 2D projected volume 650. However, in order for volume state case B or volume state case C above to arise (which results in the calculation of a 3D point) at least two images must exist in which a vertex or edge of the silhouette lies within the projected 2D volume 650. Consequently, 3D point calculator 84 determines that the volume popped off the stack at step S13-6 is to be discarded because further processing of the volume by subdivision cannot lead to a case where part of the silhouette intersects the 2D projected volume 650 in any of the images other than the one in which this is already the case.

VOLUME STATE CASE F: Set state to "subdivide the volume" if 3 or more images have any of relationships 1, 2, 3, 4 or 5 (described above with reference to FIGS. 17a–e) between the silhouette and the 2D projected volume 650 (the relationships in the 3 or more images can be the same or different from each other). In this case, 3D point calculator 84 determines that the volume popped off the stack at step S13-6 should be processed further by subdivision because the subdivision may result in volume state case B or volume state case C above occurring in the 3 or more images having the relationships 1, 2, 3, 4 or 5.

VOLUME STATE CASE G: Set state to "discard the volume" if 1 (and only 1) image has relationship 5 (described above with reference to FIG. 17e) between the silhouette and the 2D projected volume 650, 1 (and only 1) image has either relationship 4 (described above with reference to FIG. 17d) or relationship 5 (described above with reference to FIG. 17e), and the relationship in all of the other images is relationship 7 (described above with reference to FIG. 17g). In this case, further processing of the volume popped off the stack at step S13-6 cannot lead to volume state case B above (which results in a 3D point being calculated) because the silhouette intersects the 2D projected volume 650 in only 2 images and not the necessary 3 images. In addition, further processing of the volume popped off the stack at step S13-6 cannot result in volume state case C above (the other case which results in a 3D point being calculated) because no vertex of a silhouette lies in the 2D projected volume 650 in either of the images having relationship 4 or relationship 5, and hence subdivision of the volume and processing of smaller volumes cannot lead to a case where a vertex of the silhouette is within the 2D projected volume 650. Consequently, in this case, 3D point calculator 84 determines that the volume popped off the stack at step S13-6 is to be discarded.

VOLUME STATE CASE H: Set state to "subdivide the volume" if 1 (and only 1) image has relationship 1, 2 or 3 (described above with reference to FIGS. 17a–c) between the silhouette and the 2D projected volume 650, 1 (and only 1) image has any of relationships 1, 2, 3, 4 or 5 (described above with reference to FIGS. 17a–e), and the relationship in all of the other images is relationship 7 (described above with reference to FIG. 17g). In this case, 3D point calculator 84 determines that the volume popped of the stack at step S13-6 is to be subdivided, because processing of the smaller parts of the volume may result in volume state case C above in which a 3D point is to be calculated.

A detailed description will now be given of the processing steps performed in this embodiment by 3D point calculator 84 to determine which type of relationship described above with reference to FIGS. 17a–h exists between each silhouette and the projected volume 650 and, based on the identified relationships, which of the volume state cases described above exists defining whether the volume popped off the stack at step S13-6 is to be subdivided, discarded or a 3D point is to be calculated.

Referring again to FIG. 15, at step S15-12, 3D point calculator 84 determines whether there is another camera image to be processed (that is, another image into which the corners of the volume were projected at step S15-2). The first time step S15-12 is performed, all of the camera images will remain to be processed, and accordingly processing will proceed to step S15-14. However, on subsequent iterations, when all of the camera images have been processed, processing proceeds to step S15-66, which will be described later.

At step S15-14, 3D point calculator 84 considers the next camera image to be processed.

In subsequent processing, 3D point calculator 84 tests the relationship between the silhouette in the image currently being considered and the 2D projection 650 of the volume into that image generated at step S15-2 to determine which of the eight different possible relationships described above with reference to FIGS. 17a–h the silhouette and the projected volume have. As explained above the relationship is then used, either alone or in conjunction with the relationships between the projected volume and the silhouettes in other images, to determine whether the volume should be discarded, subdivided or a 3D point should be calculated and tested to determine if it lies on the surface of the subject object 210.

More particularly, at step S15-16, 3D point calculator 84 determines which straight line segments of the silhouette in the image currently being considered may intersect the 2D projected volume 650 and labels the straight line segments as "candidate edges". This processing reduces the number of straight line edges on which subsequent tests need to be performed, and utilises the quad-tree data previously generated at step S8-4.

FIG. 18 shows the processing operations performed by 3D point calculator 84 at step S15-16.

Referring to FIG. 18, at step S18-2, 3D point calculator 84 defines a bounding box having sides parallel to the sides of the image around the 2D projected volume. This is illustrated by way of example in FIG. 19, in which the dotted lines represent a bounding box 800 defined around the 2D projected volume 650.

At steps S18-4 to S18-16, 3D point calculator 84 performs processing to consider nodes of the quad-tree generated at step S8-4, to discard silhouette line segments which are in a node which does not intersect the bounding box of the projected volume generated at step S18-2, and to label as "candidate edges" the silhouette line segments in remaining nodes of the quad-tree.

More particularly, at step S18-4, 3D point calculator 84 considers the next node of the quad-tree generated at step S8-4 which stores the silhouette edge bounding box data for the image currently being considered (this being the root node the first time step S18-4 is performed).

At step S18-6, 3D point calculator 84 determines whether the region of the image defined by the node currently being considered overlaps the bounding box 800 of the projected volume generated at step S18-2. That is, 3D point calculator 84 tests whether any part of the bounding box 800 of the projected volume lies within the region defined by the node.

Referring to FIG. 19 by way of example, three regions 810, 812, 814 of the image are shown. The root node of the quad-tree comprises the whole of the image (that is, regions 810, 812 and 814) and therefore there is an overlap between the root node and the bounding box 800.

A first child node of the root node comprises region 810 and a second child node of the root node comprises region 812 plus region 814. In both cases, there is an overlap between the child node and the bounding box 800. However, when the child nodes of the second child node are considered (that is, region 812 and region 814), there is an overlap between the bounding box 800 of the projected volume and node 814, but there is no overlap between the bounding box 800 and node 812.

If it is determined at step S18-6 that the node currently being considered does not intersect the bounding box of the projected volume, then at step S18-8, 3D point calculator 84 removes any nodes which are children or further descendants of the node currently being considered from the list of nodes remaining to be processed (because the children and further descendants all lie within the parent and hence cannot intersect the bounding box of the projected volume if the parent does not intersect it). Thus, referring to the example in FIG. 19, when node 812 is considered at step S18-4 and it is found at step S18-6 that the node does not overlap the bounding box 800 of the projected volume, then at step S18-8, any children and further descendants of the node 812 are removed from the nodes remaining to be processed, thereby reducing the amount of processing to be carried out.

On the other hand, if it is determined at step S18-6 that the node currently being considered does overlap the bounding box 800 of the projected volume, then, at step S18-10, 3D point calculator 84 determines whether the node has any children.

If it is determined at step S18-10 that the node does have children, then at step S18-12, the next child node is considered and processing returns to step S18-6 to determine whether the child node overlaps the bounding box of the projected volume. Steps S18-6, S18-10 and S18-12 are recursively performed until a node in the quad-tree is reached which overlaps the bounding box 800 of the projected volume and which does not have any child nodes. When such a node is reached, processing proceeds to step S18-14, at which 3D point calculator 84 tests the bounding box of each edge in the node to determine whether it intersects the bounding box 800 of the 2D projected volume 650. 3D point calculator 84 then labels as a "candidate edge" each edge in the node having a bounding box which does intersect the bounding box 800 of the projected volume 650.

At step S18-16, 3D point calculator 84 determines whether there are any more nodes in the quad-tree, and steps S18-4 to S18-16 are repeated until each node has been processed in the manner described above.

In this way, 3D point calculator 84 discards every node in the quad-tree which does not intersect the bounding box of the projected volume and labels the silhouette straight line segments in the remaining nodes as "candidate edges" (that is, edges which may intersect the 2D projected volume 650 itself).

Referring again to FIG. 15, at step S15-18, 3D point calculator 84 determines which candidate edge end points (that is, the point at which a first candidate edge identified at step S15-16 meets a second candidate edge in the silhouette) lie within the 2D projected volume 650, and labels such end points as "verified vertices". The processing at step S15-18, therefore, determines whether there are any points such as the points 700, 702, 706, 708, 710 and 712 in FIGS. 17*a*, 17*b* and 17*c* within the projected volume 650 (these points being labelled as "verified vertices").

FIG. 20 shows the processing operations performed by 3D point calculator 84 at step S15-18.

Referring to FIG. 20, at step S20-2, 3D point calculator 84 sets a counter "nvv" representing the number of verified vertices to be equal to 0.

At step S20-4, 3D point calculator 84 considers the second end point of the next candidate edge (this being the first candidate edge the first time step S20-4 is performed). In subsequent processing, the end point is tested to determine whether it lies within the 2D projected volume 650. It is only necessary to consider and test each second end point because the end points are ordered such that each silhouette (which is closed) consists of the edges (p1, p2), (p2, p3) . . . , (pn, p1), where p1 to pn are the end points. Thus, if a line segment between the end points (p, q) is a candidate edge, then there will be an edge between the end points (x, p) which is also a candidate edge, for some x, because the bounding boxes of these straight line segments in the silhouette intersect at the point p, and accordingly it is not necessary to test the first end points.

At step S20-6, 3D point calculator 84 determines whether the end point currently being considered is within the 2D projected volume 650. In this embodiment, this is carried out by determining whether the end point is within any of the six projected faces of the volume by testing the end point against each projected face using a conventional method, such as one of the methods described in "Graphics Gems" IV pages 16–46, ISBN 0-12-336155-9.

If it is determined at step S20-6 that the end point is within the 2D projected volume, then at step S20-8, 3D point calculator 84 labels the end point as a "verified vertex", and at step S20-10 increments the value of the counter nvv by 1.

On the other hand, if it is determined at step S20-6 that the end point is not within the 2D projected volume, then steps S20-8 and S20-10 are omitted.

At step S20-12, 3D point calculator 84 determines whether the value of the counter nvv is greater than 1.

If it is determined at step S20-12 that the value of the counter nvv is greater than 1, then the projected volume contains more than one line segment vertex, and accordingly relationship 3 described above with reference to FIG. 17*c* (or relationship 6 described above with reference to FIG. 17*f*) has been identified and no further processing to determine whether any further line segment vertices in the volume is necessary. The processing therefore proceeds to step S20-14 in which a flag is set to indicate that more than one verified vertex has been identified.

On the other hand, if it is determined at step S20-12 that the value of the counter nvv is not greater than 1, processing proceeds to step S20-16, at which 3D point calculator 84 determines whether there is another candidate edge to be processed.

Steps S20-4 to S20-16 are repeated until it is determined at step S20-12 that the value of the counter nvv is greater than 1 or until it is determined at step S20-16 that all candidate edges have been processed.

When it is determined at step S20-16 that all of the candidate edges have been processed, processing proceeds to step S20-18, at which 3D point calculator 84 reads the value of counter nvv and sets a flag to indicate that the number of identified verified vertices is 0 or 1, depending upon the number of verified vertices defined by counter nvv.

If there is one verified vertex, then the relationship between the silhouette and the projected volume is either relationship 1 described above with reference to FIG. 17a or relationship 2 described above with reference to FIG. 17b and, as will be explained below, further tests are carried out to determine which of these relationships actually exists.

If the number of verified vertices is 0, then tests are carried out to determine which of the relationships 4, 5, 7 or 8 described above with reference to FIGS. 17d, 17e, 17g and 17h is the relationship between the 2D projected volume 650 and the silhouette currently being considered.

Referring again to FIG. 15, at step S15-20, 3D point calculator 84 reads the value of the flag set as step S20-14 or step S20-18 to determine the number of verified vertices.

If it is determined at step S15-20 that there is more than one verified vertex, then at step S15-22, 3D point calculator 84 increments the value of the counter nv defining the number of active cameras in which at least one verified vertex has been found by one, and at step S15-24 sets the value of the flag eitherSubdivideOrDiscard to "true". The flag eitherSubdivideOrDiscard is set to "true" because as explained above, when there is more than one verified vertex in the 2D projected volume 650, the relationship between the projected volume and the silhouette is relationship 3 described above with reference to FIG. 17c or relationship 6 described above with reference to FIG. 17f. In this case, the volume popped off the stack at step S13-6 will, in subsequent processing, either be subdivided or discarded depending upon the relationships between the 2D projected volume 650 and the silhouettes in the other images.

At step S15-26, 3D point calculator 84 increments the value of the counter np which defines the number of planar triangles which intersect the volume popped off the stack at step S13-6 by 4 so as to cause the value of the counter np to increase above the threshold value of 3 which is used in later tests.

Processing then returns to step S15-12 to process any remaining silhouettes, and hence determine whether the volume popped off the stack at step S13-6 is to be subdivided or discarded.

Returning again to step S15-20, if it is determined that there is one verified vertex, processing proceeds to step S15-28, at which 3D point calculator 84 stores data identifying the camera in which the silhouette currently being processed lies.

At step S15-30, 3D point calculator 84 increments the value of the counter nv defining the number of active cameras in which at least one verified vertex has been detected by 1, and at step S15-32 increments the value of the counter np defining the number of planes that intersect the volume popped of the stack at step S13-6 by 2 (because the two line segments which meet at the verified vertex define planar triangles which intersect the volume).

At step S15-34, 3D point calculator 84 determines whether the value of counter np is less than or equal to 3.

If it is determined at step S15-34 that the value of counter np is less than or equal to 3, then, at step S15-36, 3D point calculator 84 stores data defining the two candidate edges which meet at the verified vertex.

On the other hand, if it is determined at step S15-34 that the value of the counter np is greater than 3, step S15-36 is omitted. This is because a value of the np counter greater than 3 indicates that there are at least 4 planar triangles within the volume popped off the stack, and accordingly volume state case B or volume state case C described above cannot arise and hence it is unnecessary to store data defining the candidate edges since they will not be used to calculate a 3D point.

After step S15-36, or when it is determined at step S15-34 that the value of the counter np is greater than 3, processing returns to step S15-12 to consider the next image.

Returning again to step S15-20, if it is determined that there are no verified vertices in the image currently being processed, processing proceeds to step S15-38, at which 3D point calculator 84 determines which, if any, candidate edges intersect the 2D projected volume 650, and labels any candidate edge which does intersect the projected volume as a "verified edge".

FIG. 21 shows the processing operations performed by 3D point calculator 84 at step S15-38.

Referring to FIG. 21, at step S21-2, 3D point calculator 84 sets a counter "nve" representing the number of verified edges to be equal to 0.

At step S21-4, 3D point calculator 84 considers the next candidate edge previously identified at step S15-16 (this being the first candidate edge the first time step S21-4 is performed).

At step S21-6, 3D point calculator 84 determines whether any part of the candidate edge selected at step S21-4 intersects the 2D projected volume 650.

More particularly, in this embodiment, at step S21-6, 3D point calculator 84 tests the candidate edge against each of the twelve edges of the 2D projected volume 650 using a conventional intersection test method, such as the one described in "Graphics Gems" II pages 7–9, ISBN 0-12-064481-9.

If it is determined at step S21-6 that the candidate edge intersects the 2D projected volume 650, then at step S21-8, 3D point calculator 84 labels the candidate edge as a "verified edge", and at step S21-10 increments the value of the counter nve by 1.

On the other hand, if it is determined at step S21-6 that the candidate edge does not intersect the 2D projected volume 650, then steps S21-8 and S21-10 are omitted.

At step S21-12, 3D point calculator 84 determines whether the value of the counter nve is greater than 1.

If it is determined at step S21-12 that the value of counter nve is greater than 1, then the processing proceeds to step S21-14, at which a flag is set to indicate that more than one verified edge has been identified.

On the other hand, if it is determined at step S21-12 that the value of the counter nve is not greater than 1, processing proceeds to step S21-16, at which 3D point calculator 84 determines whether there is another candidate edge to be processed.

Steps S21-4 to S21-16 are repeated until it is determined at step S21-12 that the value of the counter nve is greater than 1 or until it is determined at step S21-16 that all candidate edges have been processed.

When it is determined at step S21-16 that all of the candidate edges have been processed, processing proceeds to step S21-18, at which 3D point calculator 84 reads the value of the counter nve and sets a flag to indicate that the number of identified verified edges is 0 or 1, depending upon the number of verified edges defined by counter nve.

Referring again to FIG. 15, step S15-40, 3D point calculator 84 reads the value of the flag set at step S21-14 or step S21-18 to determine the number of verified edges.

If there is more than one verified edge, the relationship between the silhouette and the 2D projected volume 650 is relationship 5 described above with reference to FIG. 17e (it having previously been established at step S15-20 that there are no silhouette edge vertices in the 2D projected volume so that the relationship cannot be relationship 2 described above with reference to FIG. 17b, relationship 3 described above with reference to FIG. 17c or relationship 6 described above with reference to FIG. 17f). In this case, processing proceeds to step S15-42, at which 3D point calculator 84 increments the value of counter ne defining the number of active cameras in which at least one verified edge has been detected by 1.

At step S15-44, 3D point calculator 84 sets the flag eitherSubdivideOrDiscard to "true". This is because volume state case B or volume state case C described above (which result in a 3D point being calculated) cannot arise if the relationship between any silhouette and the 2D projected volume 650 is relationship 5 described above with reference to FIG. 17e. Accordingly, the volume popped off the stack at step S13-6 is either to be subdivided or discarded depending on the relationships between the 2D projected volume 650 and the silhouettes in the other images.

At step S15-46, 3D point calculator 84 increments the value of counter np defining the number of planes intersecting the volume popped off the stack at step S13-6 by 4 so as to increase the value of the counter beyond the threshold value of 3 which will be used in subsequent processing.

Returning again to step S15-40, if it is determined that the number of verified edges is 1, the relationship between the silhouette currently being processed and the 2D projected volume 650 is relationship 4 described above with reference to FIG. 17d. In this case, processing proceeds to step S15-48, at which 3D point calculator 84 stores data defining the current silhouette.

At step S15-50, 3D point calculator 84 increments the value of counter ne defining the number of active cameras in which at least one verified edge has been detected by 1, and at step S15-52 increments the value of counter np defining the number of planes intersecting the volume popped off the stack at step S13-6 by 1.

At step S15-54, 3D point calculator 84 determines whether the value of counter np is less than or equal to 3.

If it is determined at step S15-54 that the value of counter np is less than or equal to 3, then it is still possible that volume state case B or volume state case C described above (which result in the calculation of a 3D point) can arise and accordingly at step S15-56, 3D point calculator 84 stores data defining the verified edge.

On the other hand, if it is determined at step S15-54 that the value of counter np is greater than 3, neither volume state case B nor volume state case C described above can arise, and accordingly step S15-56 is omitted.

After step S15-56, or when it is determined at step S15-54 that the value of counter np is greater than 3, processing returns to step S15-12 to consider the next silhouette, if any.

Returning again to step S15-40, if the number of verified edges is 0, the relationship between the silhouette 310 currently being processed and the 2D projected volume 650 is either relationship 7 described above with reference to FIG. 17g or relationship 8 described above with reference to FIG. 17h. In this case, processing proceeds to step S15-58, at which 3D point calculator 84 selects an arbitrary point on the 2D projected volume 650. More particularly, in this embodiment, 3D point calculator 84 selects a point corresponding to one of the projected volume corners.

At step S15-60, 3D point calculator 84 determines whether the point on the 2D projected volume 650 selected at step S15-58 is inside or outside the silhouette currently being considered.

If it is determined at step S15-60 that the point on the 2D projected volume 650 is inside the silhouette, then the relationship between the 2D projected volume 650 and the silhouette is relationship 7 described above with reference to FIG. 17g. In this case, processing proceeds to step S15-62, at which 3D point calculator 84 removes the camera in which the current silhouette lies from the list of active cameras (because the silhouette encloses the 2D projected region 650 and will therefore enclose all projected child volumes, so there is no need to generate and test the child volumes).

On the other hand, if it is determined at step S15-60 that the selected point on the 2D projected volume 650 is outside the silhouette, then the relationship between the silhouette and the 2D projected volume 650 is relationship 8 described above with reference to FIG. 17h. In this case, processing proceeds to step S15-64, at which 3D point calculator 84 sets a flag to indicate that the state of the volume popped off the stack at step S13-6 has been determined to be "discard" because case A described above has been found to exist.

After step S15-64 has been performed, processing returns to step S13-10 in FIG. 13. This is because it is not necessary to determine the relationship between the 2D projected volume 650 and the silhouettes in any further images because only one silhouette having relationship 8 with the 2D projected volume 650 needs to be identified for 3D point calculator 84 to determine that volume state case A described above exists.

Volume state case A is the only case in which processing returns to step S13-10 before all silhouettes have been tested against the 2D projected volume 650. In all other cases, processing returns to step S15-12 so that the next silhouette, if any, can be tested against the 2D projected volume 650 in the way described above.

More particularly, the processing is arranged to return to step S15-12 to consider further silhouettes in all cases where the relationship between the current silhouette and the 2D projected volume 650 has not been found to be relationship 8 because, if a subsequent silhouette is found to have relationship 8 with the 2D projected volume 650, this has a priority which overrides all previously determined relationships and the volume popped off the stack at step S13-6 is to be discarded.

When it is determined at step S15-12 that all of the silhouettes have been tested against the 2D projection 650 of the current volume, processing proceeds to step S15-66.

At step S15-66, 3D point calculator 84 reads the value of the counter np defining the number of planes which intersect the volume popped off the stack at step S13-6 and determines whether the value is less than 3.

If it is determined at step S15-66 that the value of counter np is less than 3, then volume state case D described above has been identified. It is noted that the volume state cannot be any case other than case D because, firstly, processing would not reach step S15-66 if volume state case A was detected at step S15-64, secondly, the value of counter np will be equal to 3 if volume state case B or C exists, and thirdly, the value of counter np will be greater than 3 if any of volume state cases D to H exists because of the processing performed at step S15-26 and S15-46 to increment the value of counter np by 4 when more than one verified vertex or more than one verified edge is detected in an image. Accordingly, when it is determined at step S15-66 that the value of counter np is less than 3, processing proceeds to step S15-68 at which 3D point calculator 84 sets a flag to indicate that the volume is to be discarded.

On the other hand, if it is determined at step S15-66 that the value of counter np is greater than or equal to 3, processing proceeds to step S15-70, at which 3D point calculator 84 determines whether the value of counter np is equal to 3 and in addition the flag eitherSubdivideOrDiscard is set to "false".

If it is determined at step S15-70 that the value of counter np is equal to 3 and flag eitherSubdivideOrDiscard is set to "false" then volume state case B or volume state case C has been identified and processing proceeds to step S15-72, at which 3D point calculator 84 sets a flag to indicate that a 3D point is to be calculated.

On the other hand, if it is determined at step S15-70 that the value of counter np is greater than 3 and/or the flag eitherSubdivideOrDiscard is set to "true", then 3D point calculator 84 has determined that the state of the volume popped off the stack at step S13-6 is one of the volume state cases E, F, G or H described above. Subsequent processing performed by 3D point calculator 84 determines which one of these is the actual volume state case based on the values of the counters nv and ne (defining respectively the number of active cameras in which at least one verified vertex has been detected and the number of active cameras in which at least one verified edge has been detected) and the following rules:
   (a) the value of nv+ne can never increase from a parent to a child volume;
   (b) the value of nv can never increase from a parent to a child volume; and
   (c) a volume containing a single candidate vertex must have counter values (nv=0, ne=3) or (nv=1, ne=1).

More particularly, at step S15-74, 3D point calculator 84 determines whether the sum of the value of counter nv defining the number of active cameras in which at least one verified vertex has been detected and the value of counter ne defining the number of active cameras in which at least one verified edge has been detected is less than 2.

If it is determined at step S15-74 that the sum nv+ne is less than 2, then volume state case E has been identified, and processing proceeds to step S15-76 at which 3D point calculator 84 sets a flag to indicate that the volume popped off the stack at step S13-6 is to be discarded.

On the other hand, if it is determined at step S15-74 that the sum nv+ne is greater than or equal to 2, processing proceeds to step S15-78, at which 3D point calculator 84 determines whether the sum nv+ne is greater than 2.

If it is determined at step S15-78 that the value of the sum nv+ne is greater than 2, then volume state case F described above has been identified, and processing proceeds to step S15-80, at which 3D point calculator 84 sets a flag to indicate that the volume popped off the stack at step S13-6 is to be subdivided and the subdivided volumes processed further.

On the other hand, if it is determined at step S15-78 that the sum nv+ne is equal to 2, processing proceeds to step S15-82, at which 3D point calculator 84 determines whether the value of counter nv defining the number of active cameras in which at least one verified vertex has been detected is equal to 0.

If it is determined at step S15-82 that the value of counter nv is equal to 0, then volume state case G has been identified, and processing proceeds to step S15-84, at which 3D point calculator 84 sets a flag to indicate that the volume popped off the stack at step S13-6 is to be discarded.

On the other hand, if it is determined at step S15-82 that the value of counter nv is not equal to 0, then volume state case H has been identified, and processing proceeds to step S15-86, at which 3D point calculator 84 sets a flag to indicate that the volume popped off the stack at step S13-6 is to be subdivided and the resulting smaller volumes processed further.

As a result of the processing described above with reference to FIG. 15, 3D point calculator 84 has determined the volume state case which exists for the volume popped off the stack at step S13-6 and has set a flag in dependence upon the determined volume state case indicating what subsequent processing is to be performed on the volume.

Referring again to FIG. 13, after performing processing as described above to determine the state of the volume, at step S13-10, 3D point calculator 84 determines whether the state is "calculate vertex".

If it is determined at step S13-10 that a vertex is to be calculated, processing proceeds to step S13-12 to calculate the vertex, otherwise step S13-12 is omitted.

FIG. 22 shows the processing operations performed by 3D point calculator 84 at step S13-12 to calculate a vertex.

Referring to FIG. 22, at step S22-2, 3D point calculator 84 considers the three silhouette edges which intersect the current volume (that is, the edges identified in the data stored at steps S15-36 and/or S15-56), and calculates the 3D point of intersection of the three planes each of which contains a respective one of the edges and the focal point of the camera 230 when the image containing the edge was recorded. In other words, 3D point calculator 84 calculates the 3D point of intersection of the planes which contain the planar faces defined by projecting rays from the camera focal points through the end points of the stored silhouette edges.

Thus, referring to the example in FIG. 10, the 3D point of intersection 528 of the three planes containing the planar faces 522, 524 and 526 is calculated. This processing is performed using a conventional plane intersection algorithm.

At step S22-4, 3D point calculator 84 tests whether the 3D point calculated at step S22-2 is inside the volume popped off the stack at step S13-6. This test is necessary because the planes intersecting the volume need not necessarily intersect each other at a 3D point in the volume.

If it is determined at step S22-4 that the calculated 3D point is inside the volume, then processing proceeds to step S22-6, at which 3D point calculator 84 adds the calculated 3D point to the list of 3D points representing vertices of the surface of the subject object 210.

On the other hand, if it is determined at step S22-4 that the calculated 3D point is outside the volume, then step S22-6 is omitted.

At step S22-8, 3D point calculator 84 sets a flag to indicate that the volume popped off the stack at step S13-6 is now to be discarded because processing of it is complete.

Referring again to FIG. 13, at step S13-14, 3D point calculator 84 determines whether the state of the volume popped off the stack at step S13-6 is set to "discard" or "subdivide".

If the state is set to "discard" (which can result from processing at step S13-8 or as a result of step S22-8 at step S13-12), then, at step S13-16, 3D point calculator 84 discards the volume.

On the other hand, if the state of the volume is set to "subdivide", at step S13-18, 3D point calculator 84 subdivides the volume and adds the child volumes to the top of the stack created at step S13-4. In this embodiment, the subdivision of the volume at step S13-18 comprises the binary subdivision of the volume to generate eight new child volumes.

Following step S13-16 or step S13-18, processing proceeds to step S13-20, at which 3D point calculator 84 determines whether there is another volume on the stack (including any child volumes added at step S13-18).

Steps S13-6 to S13-20 are repeated until each volume on the stack has been processed in the way described above.

As a result of performing processing in this way, 3D point calculator 84 has generated a set of points in 3D space representing vertices of the surface of subject object 210.

Referring again to FIG. 8, at step S8-8, polygon generator 86 connects the 3D points generated by the 3D point calculator 84 to generate a polygon mesh representing the surface of subject object 210.

FIG. 23 shows the processing operations performed by polygon generator 86 at step S8-8.

Referring to FIG. 23, at step S23-2, polygon generator 86 generates plane data for the polygons in the polygon mesh to be generated, and determines a so-called "signature" for each 3D point generated by 3D point calculator 84.

By way of explanation, referring to FIG. 24, each polygon to be generated by polygon generator 86 to approximate the surface of subject object 210 lies in the plane of a triangle defined by lines passing through the end points of a line segment in a silhouette and the focal point of the camera 230 (as described above with reference to FIG. 10). Thus, for example, polygon 900 lies in the plane of triangle 910 defined by lines passing through the end points 920 and 930 of a straight line segment in an object silhouette and the position 940 of the camera focal point calculated by camera calculator 50 at step S4-6.

At step S23-2, polygon generator 86 performs processing to assign a unique ID to each polygon plane and to calculate the normal vector n for each polygon plane.

As described above, each 3D point calculated by 3D point calculator 84 at step S8-6, such as point 950 in FIG. 24, is defined by the intersection of three polygon planes. Accordingly, at step S23-2, polygon generator 86 defines a "signature" for each 3D point calculated by 3D point calculator 84 comprising the plane IDs of the three planes that intersect at the 3D point. For example, in FIG. 24, the signature of 3D point 950 would comprise the IDs of the planes 900, 960 and 970.

FIG. 25 shows the processing operations performed by polygon generator 86 at step S23-2.

Referring to FIG. 25, at step S25-2, polygon generator 86 considers the next silhouette edge (that is, a straight line segment in a silhouette generated at step S8-2) from which a 3D vertex of the subject object 210 was calculated by 3D point calculator 84 at step S8-6 (this being the first such silhouette edge the first time step S25-2 is performed).

At step S25-4, polygon generator 86 assigns the ID of the edge selected at step S25-2 to the plane defined by the edge (that is, the plane defined by lines passing through the end points of the edge and the position of the focal point previously calculated for the image in which the edge lies by camera calculator 50 at step S4-6). In this embodiment, the silhouette edge ID assigned at step S25-4 comprises the unique label previously assigned to the edge at step S8-2.

At step S25-6, polygon generator 86 calculates the direction of a unit normal vector to the plane defined by the silhouette edge currently being considered. In this embodiment, the unit normal vector is calculated in a conventional manner using the imaging parameters calculated by camera calculator 50 at step S4-6 which define the plane.

At step S25-8, polygon generator 86 determines whether there is another silhouette edge from which a 3D vertex of the subject object 210 was calculated by 3D point calculator 84 at step S8-6. Steps S25-2 to S25-8 are repeated until each such silhouette edge has been processed in the way described above.

At step S25-10, polygon generator 86 considers the next 3D point calculated by 3D point calculator 84 at step S8-6 (this being the first 3D point the first time step S25-10 is performed), and at step S25-12 defines a signature for the 3D point comprising the three IDs of the planes which meet at the 3D point (these being the IDs assigned to the planes at step S25-4).

At step S25-14, polygon generator 86 determines whether there is another calculated 3D point, and steps S25-10 to S25-14 are repeated until each such 3D point has been processed in the way described above.

Referring again to FIG. 23, at step S23-4, polygon generator 86 organises the 3D points previously calculated by 3D point calculator 84 into sets in dependence upon the signatures defined at step S23-2.

FIG. 26 shows the processing operations performed by polygon generator 86 at step S23-4.

Referring to FIG. 26, at step S26-2, polygon generator 86 considers the next 3D point previously calculated by 3D point calculator 84 at step S8-6 (this being the first 3D point the first time step S26-2 is performed).

At step S26-4, polygon generator 86 reads the signature of the point selected at step S26-2 (this being the signature previously allocated at step S25-12), and at step S26-6 allocates the 3D point to the set of points for each plane defined in the signature. That is, the 3D point is allocated to three different sets, one set for each plane defined in the signature of the 3D point.

At step S26-8, polygon generator 86 determines whether there is another 3D point calculated by 3D point calculator 84 to be processed, and steps S26-2 to S26-8 are repeated until each such 3D point has been processed in the way described above.

As a result of the processing described above with reference to FIG. 26, a set of points is generated for each plane in the surface model of the subject object 210. The points in each group define one or more polygons that lie on a given plane of the surface of the subject object 210.

Referring again to FIG. 23, at step S23-6, polygon generator 86 determines the order in which the 3D points in each set are to be connected to generate a polygon representing part of the surface of the subject object 210.

Before describing the detailed processing steps performed by polygon generator 86 at step S23-6, the principles of the processing will be described.

Referring to FIG. 27, the four 3D points and five planes from the example of FIG. 24 are shown in an enlarged format. The four 3D points calculated by 3D point calculator 84 at step S8-6 are labelled V1, V2, V3 and V4 (V3 corresponding to point 950 in FIG. 24), and the five planes are labelled a, b, c, d, e (planes a, c and d corresponding to planes 900, 960 and 970 respectively in the example of FIG. 24).

Each edge (connection) to be calculated by polygon generator 86 at step S23-6 connects two 3D points. To determine which 3D points are to be connected, in this embodiment, polygon generator 86 makes use of the signatures of the 3D points. More particularly, two 3D points which are to be connected have in their signatures assigned at step S25-12 two plane IDs which are common to both signatures. For example, the signature of 3D point V1 in FIG. 27 is {a, b, e} and the signature of 3D point V2 is {a, b, c}. The plane IDs a and b are therefore common to the signatures and identify a connection between the 3D points V1 and V2 because they define planes which meet at an edge between the 3D points V1 and V2 as shown in FIG. 27.

As will be explained below, in the processing at step S23-6, polygon generator 86 determines connections between the 3D points in each individual polygon by following edges around the polygon determined using the signatures of the 3D points in the way described above until the connections return to the start 3D point. In the case of a convex subject object, this is the only processing which needs to be performed to connect the 3D points because in each set of 3D points generated at step S23-4 (comprising 3D points lying on the same plane), there will be only two 3D points having in their signatures two plane IDs which are the same. By way of example, referring to FIG. 27, the set of 3D points for plane A comprises the points V1, V2, V3 and V4 but only the points V1 and V2 have the plane IDs a and b in their signatures.

However, for parts of a subject object surface which are not convex, there may be more than two 3D points which have the same two plane IDs in their signatures, and hence the connections between the 3D points cannot be determined based on the signatures alone.

By way of example, FIG. 28 shows an example in which four 3D points 1000, 1010, 1020, 1030 lie on the intersection of two planes 910, 1040. Accordingly, in this example, the signature of each of the four 3D points 1000, 1010, 1020, 1030 contains the plane IDs of the planes 910 and 1040.

To address this problem, in this embodiment, polygon generator 86 performs processing to determine the connections between the 3D points by connecting the points in pairs based in the order that they occur along the edge defined by the intersection of the planes 910 and 1040. This processing will be described in detail below.

As will also be explained below, in this embodiment, polygon generator 86 also performs processing to address a further problem that can occur with parts of a subject object surface which are not convex, namely the problem that more than one polygon representing the object surface may lie in the same plane.

A first way in which this can occur is shown in the example of FIG. 28, in which the polygons 1050 and 1060 representing separate parts of the subject object surface both lie in the plane 910.

A second way in which more than one polygon may lie in the same plane is illustrated in FIG. 29. In this example, polygon 1100 represents part of the object surface and polygon 1110 represents a hole in the subject object surface.

The processing performed by polygon generator 86 at step S23-6 will now be described in detail.

FIG. 30 shows the processing operations performed by polygon generator 86 at step S23-6.

Referring to FIG. 30, at step S30-2, polygon generator 86 creates an empty polygon set "S" for the 3D computer model of the subject object 210, to which polygons representing parts of the surface of the subject object 210 will be added as they are calculated.

At step S30-4, polygon generator 86 considers the next plane "p" defined at step S23-2, and reads the 3D points in the set Vp generated at step S23-4 for the plane.

At step S30-6, polygon generator 86 determines whether there are any 3D points in the set Vp read at step S30-4. On the first iteration of the processing, 3D points will exist in the set Vp, and processing proceeds to step S30-8. However, in subsequent processing, 3D points are deleted from the set Vp after connections for the point have been calculated. Accordingly, on subsequent iterations, it may be determined at step S30-6 that no more 3D points remain in the set Vp, and in this case, processing proceeds to step S30-50, which will be described later.

At step S30-8, polygon generator 86 adds a new polygon data structure "s" to the polygon set "S" created at step S30-2, into which data defining a polygon will be input as it is generated. Also at step S30-8, polygon generator 86 stores data defining the normal vector previously calculated at step S25-6 for the plane currently being considered in the polygon data structure "s" to define a normal for the polygon.

At step S30-10, polygon generator 86 selects a 3D point from the set Vp as a start vertex "u" for the polygon (any of the 3D points may be selected as the start vertex "u").

At step S30-12, polygon generator 86 sets a current vertex pointer "w" to the vertex "u" to indicate that this is the vertex currently being processed, and at step S30-14, reads the signature of the start vertex "u".

At step S30-16, polygon generator 86 selects a plane "q" defined in the signature read at step S30-14 which is not the same as the plane "p" currently being considered (selected at step S30-4).

To assist understanding of the processing performed by polygon generator 86, reference will be made to the example shown in FIG. 27. Referring to FIG. 27 by way of example, assume that the plane "p" selected at step S30-4 is plane "a". Accordingly, the 3D points in the set Vp are the 3D points V1, V2, V3 and V4.

Assume also that the 3D point V2 was selected as the start vertex (u) at step S30-10. Accordingly, at step S30-16, polygon generator 86 selects either plane b or plane c since both of these planes are defined in the signature of the 3D point V2 together with the plane a. Assume that plane c is selected at step S30-16.

Referring again to FIG. 30, at step S30-18, polygon generator 86 removes the current vertex "w" (that is, 3D point V2 in the example being considered) from the set Vp, and at step S30-20 adds the vertex to the polygon data structure "s" generated at step S30-8 to define a vertex of the polygon "s".

At step S30-22, polygon generator 86 determines the set "Vpq" of 3D points which remain in the set Vp and have the ID of plane "q" selected at step S30-16 in their signature.

Referring again to the example in FIG. 27, 3D point V3 has the signature {a, c, d} and is the only point in the set Vp having plane c (selected at step S30-16) in its signature.

At step S30-24, polygon generator 86 determines whether there are any 3D points in the set Vpq determined at step S30-22.

On the first iteration of processing, 3D points will exist in the set Vpq. However, as described above, at step S30-18, each 3D point is removed from the set Vp after processing. Accordingly, when all the vertices of a polygon have been processed, no 3D points will exist in the set Vpq. In this case, processing returns to step S30-6, at which polygon generator 86 determines whether there are any 3D points remaining in the set Vp.

Points may remain in the set Vp if there are more than two polygons lying in the plane "p", for example as shown in FIGS. 28 and 29 described above. In a situation where more than one polygon lies in the plane "p", the test at step S30-24 will determine that there are no points in the set Vpq when one polygon has been processed and the processing performed at step S30-6 will determine that there are 3D points remaining in the set Vp when the connections for a further polygon lying in the plane "p" remain to be calculated. In this case, when processing proceeds from step S30-6 to S30-8, a new polygon data structure is generated for the further polygon lying in the plane "p".

When it is determined at step S30-24, that points exist in the set Vpq, processing proceeds to step S30-26, at which polygon generator 86 determines whether the number of points in the set Vpq is equal to 1. Each 3D point in the set Vpq represents a 3D point which may be connected to the current vertex "we". Thus, if there is one, and only one, point in the set Vpq, then a case exists such as the example shown in FIG. 27. However, if there is more than one point in the set Vpq, then a case exists such as the example in FIG. 28 for the 3D points 1000, 1010, 1020 and 1030 described above.

When it is determined at step S30-26 that there is one, and only one, 3D point in the set Vpq, processing proceeds to step S30-28, at which polygon generator 86 sets the next vertex "x" of the polygon "s" (that is, the vertex connected to the current vertex) to be the 3D point in the set Vpq.

Thus, in the example of FIG. 27, assuming plane c to be the plane selected at step S30-16, the next vertex "x" set at step S30-28 is the 3D point V3.

Processing then proceeds to step S30-44, at which polygon generator 86 sets the current vertex pointer "w" to vertex "x".

At step S30-46, polygon generator 86 reads the signature of the current vertex, and at step S30-48, selects the plane "r" defined in the signature which is not plane "p" selected at step S30-4 and is not plane "q" selected at step S30-16. Thus, in the example of FIG. 27, the signature of 3D point V3 is {a, c, d} and therefore plane d is selected at step S30-48.

Processing then returns to step S30-18, at which the current vertex is removed from the set Vp.

In this way, polygon generator 86 traverses the 3D points in the polygon, determining for each vertex the connected vertex and deleting a vertex when it has been processed. Processing for a polygon is complete when it is determined at step S30-24 that there are no points in the set Vpq and that accordingly all of the vertices of the polygon have been connected.

Returning to step S30-26, if it is determined that there is more than one 3D point in the set Vpq, a situation has arisen such as that shown in the example of FIG. 28 in which a number of 3D points 1000, 1010, 1020, 1030 lie in a line defined by the intersection of two planes. In this case, polygon generator 86 performs processing to determine which 3D point in the set Vpq is to be connected to the 3D point currently being considered based on the relative positions of the 3D point currently being considered and the 3D points in the set Vpq along the straight line on which they all lie.

More particularly, at step S30-30, polygon generator 86 determines whether there are an odd number or even number of 3D points in the set Vpq.

The number of 3D points lying on an edge defined by the intersection of two planes must be even. This is because the 3D points must be connected in pairs—first to second, third to fourth, etc. Thus, referring to the example in FIG. 28, 3D point 1000 is connected to 3D point 1010 and 3D point 1020 is connected to 3D point 1030.

However, the number of 3D points in the set Vpq tested at step S30-30 may be odd because a case can occur in which one of the 3D points lying on the edge defined by the intersection of the two planes was removed from the set Vp at step S30-18 because it was the current vertex "w" being processed.

On the other hand, if the start vertex "u" selected at step S30-10 comprises one of the vertices lying on the edge on which there are more than two vertices, and the next vertex processed is not a vertex lying on the edge having more than two vertices (that is, the start vertex was one of the end vertices on the edge having more than two vertices and the polygon is traversed in a direction which has not yet passed along the edge having more than two vertices), then the number of 3D points in the set Vpq tested at step S30-30 will be even because the start vertex will have been removed from the set Vp at step S30-18 and the current vertex w which is also a vertex lying on the edge having more than two vertices will also have been removed from the set Vp at step S30-18.

Thus, referring to FIG. 28 by way of example, assume that plane 910 is the plane selected at step S30-4, and that the 3D point 1000 is selected as the start vertex "u" at step S30-10. If plane 1040 is selected at step S30-16, then at step S30-18, the 3D point 1000 is removed from the set Vp and at steps S30-22 and S30-24 the set Vpq is determined to contain three 3D points being the points 1010, 1020 and 1030. On the other hand, if plane 1080 was selected at step S30-16 instead of plane 1040, then the 3D point 1000 would be removed from the set Vp at step S30-18 and the 3D point 1070 would be processed at steps S30-28 and subsequent steps. In subsequent processing, one of the 3D points 1010, 1020 or 1030 will become the current vertex"w". When the first of these points becomes the current vertex"w" it will be removed from the set Vp at step S30-18, resulting in two points lying on the intersection of planes 910 and 1040 remaining in the set Vpq tested at steps S30-24 and S30-26 (that is, an even number of points).

Consequently, if it is determined at step S30-30 that the number of points in the set Vpq is odd, polygon generator 86 defines a set "Vline" of the 3D points lying on the intersection of planes "p" and "q" such that the set comprises the current vertex "w" and the 3D points in the set Vpq.

On the other hand, if it is determined at step S30-30 that the number of points in the set Vpq is even, then at step S30-32, polygon generator 86 defines a set "Vline" of 3D points lying on the intersection of planes p and q such that the set comprises the current vertex "w", the start vertex "u" and the 3D points in the set Vpq.

Following step S30-32 or step S30-34, processing proceeds to step S30-36, at which polygon generator 86 assigns a rank to each 3D point in the set Vline from rank 0 to rank n−1 (where n is the number of points in the set Vline) in dependence upon their relative positions along the line defined by the intersection of planes "p" and "q". More particularly, one of the end points on the intersection (it does not matter which) is assigned rank 0 and the remaining points in the set Vline are assigned rank 1, 2, etc as their distance from the point of rank 0 increases. Thus, referring to the example shown in FIG. 28, if 3D point 1000 is assigned rank 0, then 3D point 1010 is assigned rank 1, 3D point 1020 is assigned rank 2 and 3D point 1030 is assigned rank 3.

At step S30-38, polygon generator 86 determines whether the rank of the current vertex "w" is even or odd.

If it is determined at step S30-38 that the rank of the current vertex "w" is even, then at step S30-40, polygon generator 86 sets the next vertex "x" of the polygon "s" (that is the vertex connected to the current vertex) to be the vertex "v" in the set Vpq such that:

$$\text{rank}(v) = \text{rank}(w) + 1 \qquad (3)$$

On the other hand, if it is determined at step S30-38 that the rank of the current vertex "w" is odd, then at step S30-42, polygon generator 86 sets the next vertex "x" and the polygon "s" to be vertex "v" in the set Vpq such that:

$$\text{rank}(v) = \text{rank}(w) - 1 \qquad (4)$$

Processing then proceeds to step S30-44.

As described above, at step S30-44, polygon generator 86 sets the current vertex pointer "w" to vertex "x" and at step S30-46 reads the signature of the new current vertex.

At step S30-48, polygon generator 86 selects the plane "r" defined in the signature read at step S30-46 which is not plane "p" selected at step S30-4 and is not plane "q" selected at step S30-16.

After step S30-48, processing returns to step S30-18.

Returning again to step S30-6, when it is determined that there are no more 3D points in the set Vp (because all of the 3D points have been removed on previous iterations of processing at step S30-18), then connections have been determined for all of the 3D points lying on the plane "p" selected at step S30-4 and processing proceeds to step S30-50.

At step S30-50, polygon generator 86 determines whether there is more than one polygon lying in the plane "p". More particularly, in this embodiment, polygon generator 86 determines whether more than one polygon data structure "s" has been generated for the plane "p" (a new polygon data structure "s" being generated for each polygon lying in the plane "p" at step S30-8).

If it is determined at step S30-50 that there is more than one polygon lying in the plane "p" processing proceeds to step S30-52, at which polygon generator 86 tests each polygon lying in the plane "p" to determine whether it contains any of the other polygons lying in the plane "p".

At step S30-54, polygon generator 86 determines whether each polygon lying in the plane "p" represents part of the surface of the subject object 210 or a hole therein. More particularly, if a polygon is not contained with any other polygons, then it represents a surface of the subject object 210. For a case in which one, and only one, polygon lies inside another polygon, then the larger polygon represents the surface of the subject object 210 and the smaller polygon which is contained in the larger polygon represents a hole in the surface. For cases in which there is more than one polygon contained in a polygon, polygon generator 86 creates a hierarchy such that each parent polygon contains its children polygons. Polygon generator 86 then identifies as surface of the subject object 210 each polygon in the odd generations in the hierarchy and identifies as holes those polygons in the even generations.

On the other hand, if it is determined at step S30-50 that there is only one polygon in plane "p", steps S30-52 and S30-54 are omitted.

At step S30-56, polygon generator 86 determines whether there is another plane identified at step S23-2 to be processed.

If it is determined at step S30-56 that another plane remains to be processed, then processing returns to step S30-4.

Steps S30-4 to S30-56 are repeated until each plane has been processed in the way described above.

As a result of this processing, polygon generator 86 calculates a polygon mesh representing the surface of subject object 210.

Referring again to FIG. 23, at step S23-8, polygon generator 86 connects the 3D points in the polygons generated at step S23-6 to generate a mesh of connected planar triangles. In this embodiment, polygon generator 86 performs processing at step S23-8 using a conventional method, for example from the Open GL Utility library "glutess", as described in Chapter 11 of the Open GL Programming Guide 2nd edition, ISBN 0-201-46138-2.

Referring again to FIG. 4, at step S4-18, surface texturer 90 processes the input image data to generate texture data for each surface triangle in the surface model generated by surface modeller 80 at step S4-16.

More particularly, in this embodiment, surface texturer 90 performs processing in a conventional manner to select each triangle in the surface mesh generated at step S4-16 and to find the input image "i" which is most front-facing to a selected triangle. That is, the input image is found for which the value n̂t · v̂i is largest, where nt is the triangle normal assigned at step S30-10 for the polygon in which the triangles lie, and v̂i is the viewing direction for the "i"th image. This identifies the input image in which the selected surface triangle has the largest projected area.

The selected surface triangle is then projected into the identified input image, and the vertices of the projected triangle are used as texture coordinates to define an image texture map.

Other techniques that may be used by surface texturer 90 to generate texture data at step S4-18 are described in co-pending U.S. patent application Ser. No. 09/981,844, the full contents of which are incorporated herein by cross-reference.

The result of performing the processing described above is a VRML (or similar format) model of the surface of object 210, complete with texture coordinates defining image data to be rendered onto the model.

At step S4-20, central controller 20 outputs the data defining the 3D computer model of the object 210 from output data store 120, for example as data stored on a storage device such as disk 122 or as a signal 124 (FIG. 1). In addition, or instead, central controller 20 causes display processor 110 to display on display device 4 an image of the 3D computer model of the object 210 rendered with texture data in accordance with a viewpoint input by a user, for example using a user input device 6.

Second Embodiment

In the first embodiment described above, processing is performed to generate a 3D computer model by processing data defining conical polyhedra, each defined by the silhouette of the subject object 210 in a respective input image and the focal point of the camera 230. The processing is performed so as to calculate 3D points at which a predetermined number of the triangular planes making up the polyhedra intersect, such that each 3D point is within each of the polyhedra not containing one of the planes which intersect at the 3D point. Accordingly, in the first embodiment, the 3D computer model is generated based on images of the subject object and data defining the positions and orientations at which the images were recorded.

However, the processing is also applicable to the generation of 3D computer models from polyhedra made up of planar faces in other situations.

For example, a second embodiment will now be described in which a 3D computer model of a compound object made up from a number of component 3D objects is generated, each component 3D object comprising a polyhedron defined by a plurality of planar faces.

Referring to FIG. 31, the second embodiment comprises a processing apparatus 2002, such as a personal computer, containing, in a conventional manner, one or more processors, memories, graphics cards etc, together with a display device 2004, such as a conventional personal computer monitor, and user input devices 2006, such as a keyboard, mouse, etc.

The processing apparatus 2002 is programmed to operate in accordance with programming instructions input, for example, as data stored on a data storage medium, such as disk 2012, and/or as a signal 2014 input to the processing apparatus 2002, for example from a remote database, by transmission over a communication network (not shown) such as the Internet or by transmission through the atmosphere, and/or entered by a user via a user input device 2006 such as a keyboard.

As will be described in more detail below, the programming instructions comprise instructions to cause the processing apparatus 2002 to become configured to generate data defining 3D computer models, each comprising a plurality of planar polygons, and/or to receive data defining such 3D computer models as input data, to position the 3D computer models relative to each other in accordance with user input instructions, and to generate a 3D computer model of a compound object using the original computer models as components and the relative positions defined by the user. The 3D computer model of the compound object is generated using a novel and inventive technique in which processing is performed to calculate 3D points representing vertices of the compound object by determining the intersections of the planar polygons defining the component 3D computer models. As will be described below, this processing is performed in a particularly efficient way, in particular because it avoids calculating intersections of polygons which cannot result in 3D points which are vertices of the compound object.

When programmed by the programming instructions, processing apparatus 2002 can be thought of as being configured as a number of functional units for performing processing operations. Examples of such functional units and their interconnections are shown in FIG. 31. The units and interconnections illustrated in FIG. 31 are, however, notional and are shown for illustration purposes only to assist understanding; they do not necessarily represent units and connections into which the processor, memory etc of the processing apparatus 2002 become configured.

Referring to the functional units shown in FIG. 31, a central controller 2020 processes inputs from the user input devices 2006, and also provides control and processing for the other functional units.

Memory 2030 is provided for use by central controller 2020 and the other functional units.

Input data store 2040 stores input data input to the processing apparatus 2002, for example as data stored on a storage device, such as disk 2042, as a signal 2044 transmitted to the processing apparatus 2002, or using a user input device 2006. The input data defines one or more 3D computer models, each made up of planar polygons in a conventional manner.

Component object modeller 2050 is arranged to process the input data stored in input data store 2040 to amend the input 3D computer models to change their shape, appearance etc in accordance with user instructions. In addition, component object modeller 2050 is also arranged to generate data defining new 3D computer models made up of planar polygons in accordance with instructions input by a user.

Model positioner 2060 is arranged to process instructions input by a user using a user input device 2006 to position the objects defined in the input data stored in input data store 2040 and/or defined by the data generated by component object modeller 2050 relative to each other in a common coordinate space, so as to define components of a compound object.

Compound object modeller 2070 comprises a 3D point calculator 2080 and a polygon generator 2090.

3D point calculator 2080 is arranged to process the data defining the component 3D computer models and their relative positions to calculate the 3D positions of the intersections of planar polygons making up the component models (which intersections define potential vertices of the compound object) and to test the intersections to determine which ones represent actual values of the compound object.

Polygon generator 2090 is arranged to connect the 3D points generated by 3D point calculator 2080 to form a polygon mesh representing the surface of the compound object.

Display processor 2100, under the control of central controller 2020, is arranged to display images and instructions to a user via display device 2004 during the processing by component object modeller 2050, model positioner 2060 and compound object modeller 2070. In particular, display processor 2100 is arranged to display images of the component and compound computer models from user-selected viewpoints.

Output data store 2110 is arranged to store the data defining the compound object generated by compound object modeller 2070. Central controller 2020 is arranged to control the output of data from output data store 2110, for example as data on a storage device, such as disk 2120 and/or as a signal 2130.

FIG. 32 shows the processing operations performed by processing apparatus 2002 in this embodiment.

Referring to FIG. 32, at step S32-2, component object modeller 2050 acts on instructions input by a user via a user input device 2006 to generate data defining a respective 3D computer model for each of a plurality of component objects. This processing is performed in a conventional manner, for example as in a conventional computer-aided design (CAD) apparatus.

Also at step S32-2 display processor 2100 generates image data for display on display device 2004 to display the component objects to the user. In this embodiment, the 3D computer models of the component objects are generated in an interactive way, that is, the effect of the input of each instruction from the user on the formation of a 3D computer model is displayed on display device 2004 and the user inputs further instructions to complete the 3D computer model in response to the successive display of input effects.

An example of the result of the processing at step S32-2 is shown in FIG. 33a, in which three 3D component objects 2200, 2210, 2220 defined by data generated by component object modeller 2050 are illustrated.

Component object 2200 comprises a bottom face polygon 2230, a top face polygon 2240, and side face polygons 2250, 2260, 2270 and 2280.

Component object 2210 comprises a top face polygon 2290, a bottom face polygon 2300, and side face polygons 2310, 2320 and 2330.

Component object 2220 is made up of polygons 2340, 2350, 2360, 2370, 2380, 2390, 2400 and 2410.

The component objects shown in FIG. 33a will be referred to below to illustrate subsequent processing performed in this embodiment.

Instead of component object modeller 2050 generating data to define every component object at step S32-2, one or more of the component objects may be defined by data input to processing apparatus 2002 and stored in input data store 2040. Such input data may be generated, for example, using the processing described in the first embodiment, or by laser-scanning one or more objects etc.

In addition or instead, the data stored in input store 2040 for one or more of the 3D computer models may be amended by component object modeller 2050 in accordance with instructions input by a user via a user input device 2006 to edit the 3D computer model and hence change the shape, appearance etc of the component object.

Referring again to FIG. 32, at step S32-4, model positioner 2060 acts on instructions input by a user via a user input device 2006 to position the component objects generated at step S32-2 (or defined in the data stored in input data store 2040) in a common coordinate space as parts of a compound object. In addition, display processor 2100, under control of central controller 2020, generates image data for display on display device 2004 to display images of the component objects as they are positioned in the common coordinate space.

FIG. 33b shows an example of the result of the processing at step S32-4, in which the component objects 2200, 2210 and 2220 of FIG. 33a are positioned relative to each other as parts of a compound object.

Referring to FIG. 33b, component object 2210 is positioned so that it penetrates component object 2200 through the polygon 2230 (that is, the vertices 2420, 2430 and 2440 defining the polygon 2290 of component object 2210 are inside component object 2200).

Component object 2220 is positioned so that it intersects 210 polygons 2310 and 2330 of component object 2210.

Referring again to FIG. 32, at step S32-6 3D point calculator 2080 calculates 3D points representing the vertices of the compound object.

At this stage in the processing, a plurality of 3D component objects exist, each comprising a polyhedron made up of planar polygons, and the relative positions and orientations of the component objects (and hence the planar polygons) are known.

Consequently, a three-dimensional computer model of the compound object can be generated by calculating the union of the component objects, that is the union of the volumes in 3D space occupied by the component objects.

In this embodiment, the union of the component objects is calculated by calculating the intersections of the planar polygons making up each component object. Any 3D point at which three of the polygons meet (irrespective of whether the polygons are from the same component object, two different component objects or three different component objects) defines a point which is potentially on the surface of the compound object. Each potential point is tested to determine which it actually represents a point on the compound object.

To ensure that the generated 3D computer model of the compound object is accurate, each intersection of polygons from the component objects which results in a vertex of the compound object needs to be calculated. This could be achieved by testing each polygon against every other polygon to generate a complete set of 3D points at which three polygons meet. However, the number of computations necessary to calculate 3D points on the compound object in this way is extremely large. More particularly, if the total number of polygons in all component objects is "n" then O(n3) computations would be required. In addition, much of the computation will be unnecessary because many of the polygons tested will not intersect (and hence will not lead to the generation of a 3D point), and because the most computationally efficient way to calculate the intersection of three polygons is to calculate the intersection of the three planes in which the polygons lie, which results in the calculation of 3D points which do not lie on the surface of the compound object and which therefore need to be processed to determine which ones actually represent vertices of the compound object.

In the case of the example shown in FIG. 33a and FIG. 33b, the number of computations would be manageable because each of the component objects 2200, 2210, 2220 is made up of only a small number of polygons. However, in more complex cases, each component object may be made up of thousands of polygons, and the time required to perform the computations would become extremely large.

Consequently, in this embodiment, processing is performed in a way which reduces the number of computations necessary to calculate 3D points representing points on the compound object.

Before describing this processing in detail, the principles of the processing will be described.

More particularly, in this embodiment, processing is performed to consider a volume of the 3D space in which the component objects were positioned at step S32-4, and to test the volume to determine whether:

(1) the volume can be discarded, either because there are not enough polygons in the volume (that is, three in this embodiment) to intersect to generate a 3D point, or because the polygons in the volume cannot intersect at a 3D point which represents a vertex of the compound object (as will be explained in more detail below);

(2) the volume is to be subdivided to consider smaller volumes, because the volume contains enough polygons to intersect and generate more than a predetermined number of 3D points (in this embodiment one 3D point) which may represent vertices of the compound object; or (3) the volume contains the correct number of polygons (three in this embodiment) to intersect and generate a sufficiently small predetermined number (one in this embodiment) of 3D points which may represent vertices of the compound object, in which case the 3D positions of these points are calculated and tested to determined whether they actually represent vertices of the compound object.

In this way, the processing ensures that all of the 3D points representing vertices of the compound object are calculated, while avoiding unnecessary processing which does not lead to the calculation of such a point. In particular, large volumes of 3D space can be discarded without further calculation.

To determine whether a volume can be discarded because the polygons therein cannot intersect at a 3D point which represents a vertex of the compound object, processing is performed in this embodiment to determine whether the 3D point will lie inside one of the component objects and hence cannot represent a vertex of the compound object. More particularly, referring to FIG. 33b by way of example, each of the 3D points 2420, 2430 and 2440 lies inside the component object 2200 and hence cannot represent a vertex of the compound object. Accordingly, the processing in this embodiment does not calculate and test these points, thereby reducing the amount of processing carried out.

As will be described in detail below, in this embodiment, the test to determine whether a 3D point will lie within a component object is actually carried out by considering each component object to be a hole in a suitably large polyhedron and performing processing to test whether the 3D point will lie within all of the polyhedra for all of the component objects (this being equivalent to testing whether the 3D point will lie inside at least one of the original 3D objects).

In this embodiment, when a 3D point is calculated, it is subsequently tested to determine whether it represents a vertex of the compound object. This is because a 3D point is calculated when a 3D volume is identified which contains three planar polygons. However, the polygons may not actually intersect at a 3D point within the volume. In addition, the 3D point is calculated by calculating the intersection of the three respective planes in which the polygons lie, with the result that the calculated 3D point mat not lie within one or more of the polygons. Accordingly, in this embodiment, a test is carried out to determine whether the calculated 3D point is within the identified volume and is within all three of the polygons.

The processing performed in this embodiment to calculate 3D points representing vertices of the compound object will now be described in detail.

FIG. 34 shows the processing operations performed by 3D point calculator 2080 at step S32-6 to calculate 3D points defining vertices of the compound object.

Referring to FIG. 34, at step S34-2, 3D point calculator 2080 defines a volume in 3D space in which all 3D points representing vertices of the compound object will lie.

More particularly, referring to FIG. 35, in this embodiment, 3D point calculator 2080 defines an axis-aligned bounding cuboid 2500 around the component objects 2200, 2210 and 2220 as the volume containing the compound object vertices at step S34-2. The bounding cuboid is defined in a conventional manner, and accordingly the processing will not be described here.

Referring again to FIG. 34, at step S34-4, 3D point calculator 2080 subdivides the 3D volume defined at step S34-2 into a plurality of smaller, child volumes, and adds the child volumes to the top of a storage stack defined in memory.

More particularly, referring to FIG. 36, in this embodiment the subdivision of the volume at step S34-4 comprises the binary subdivision of the bounding cuboid 2500 to generate eight new child volumes 2510, 2520, 2530, 2540, 2550, 2560, 2570 and 2580.

Referring again to FIG. 34, at step S34-6, 3D point calculator 2080 defines a respective polyhedron for each component object which contains the component object as a hole.

This processing and its effect will be described for subject object 2200 with reference to FIG. 37 (the processing and its effect being the same for each of the other component objects).

Referring to FIG. 37, the processing at step S34-6 defines a polyhedron 2600 having the form of a cuboid with a hole 2610 therein having the same coordinates as the original component object 2200 (referred to hereinafter as a "component object hole").

Thus, the polygons of the original component object now define a component object hole in the polyhedron 2600.

More particularly, 3D point calculator 2080 performs the processing at step S34-6 by defining cuboid 2600 to have faces each of which lies a small distance outside the corresponding face of the bounding cuboid 2500 previously defined at step S34-2. Thus, cuboid 2600 has the same shape as bounding cuboid 2500 but is slightly larger in size. In this way, cuboid 2600 encloses all points on the compound object to be generated.

As a result of performing step S34-6, processing to calculate the union of the volumes occupied by the component objects 2200, 2210, 2220 now becomes processing to calculate the union of the component object holes in the polyhedra.

Referring again to FIG. 34, at step S34-8, 3D point calculator 2080 pops the next volume off the top of the stack created at step S34-4 (this being the first volume the first time step S34-8 is performed), and at step S34-10, determines the state of the volume popped off the stack.

In the processing at step S34-10, 3D point calculator 2080 determines whether the volume popped off the stack at step S34-8 cannot contain any 3D point representing a vertex of the compound object (and hence can be discarded), whether the volume needs to be subdivided because it contains a sufficient number of polygons to define more than one 3D point which may represent a vertex of the compound object, or whether the volume contains only enough polygons to define just a single 3D point which may represent a vertex of the compound object, in which case the position of the 3D point can be calculated and tested.

FIG. 38 shows the processing operations performed by 3D point calculator 2080 at step S34-10.

Referring to FIG. 38, at steps S38-2 to S38-10, 3D point calculator 2080 performs processing to determine which polygons defining the component object holes intersect the volume popped off the stack at step S34-8. This processing is performed in a computationally efficient way by testing only the polygons which intersect the parent volume (that is, the volume divided to create the volume currently being processed) for intersections with the current volume, and storing a list of the polygons which do intersect the current volume for use when a child volume of the current volume is processed.

More particularly, at step S38-2, 3D point calculator 2080 considers the list of polygons which intersect the parent volume (this being all of the polygons defining the component object holes when the parent volume is the bounding cuboid 2500 defined at step S34-2).

At step S38-4, 3D point calculator 2080 considers the next polygon on the list read at step S38-2 (this being the first polygon the first time step S38-4 is performed), and at step S38-6 determines whether the polygon intersects the current volume. The processing performed in this embodiment to test whether a polygon intersects the current volume is carried out in a conventional way, for example as described in Graphics Gems V pages 375–379, edited by Alan W. Paeth and published by Morgan Kaufmann, ISBN 0-12-543455-3.

If it is determined at step S38-6 that the polygon does intersect the current volume, then, at step S38-8, 3D point calculator 2080 adds the polygon to the list of polygons which intersect the current volume.

On the other hand, if it is determined at step S38-6 that the polygon does not intersect the current volume, then step S38-8 is omitted.

At step S38-10, 3D point calculator 2080 determines whether there is another polygon on the list read at step S38-2. Steps S38-4 to S38-10 are repeated until each polygon on the list read at step S38-2 has been processed in the way described above.

At steps S38-12 to S38-26, 3D point calculator 2080 performs processing to determine whether the volume popped off the stack at step S34-8 can be discarded because it is wholly within one or more of the component object holes (and hence any 3D point lying in the volume cannot represent a vertex of the compound object). In this embodiment, this processing comprises testing the volume to determine whether it is enclosed by all of the polyhedra generated at step S34-6. In addition, the processing is performed in a particularly computationally efficient way. More particularly, if a volume is enclosed by a polyhedron, then all of its children volumes are also enclosed by the polyhedron. Accordingly, in this embodiment, 3D point calculator 2080 tests only the polyhedra that have not been verified as enclosing the parent volume (referred to hereinafter as "active polyhedra") to determine whether they enclose the current volume. When a polyhedron is verified as enclosing the current volume, this polyhedron is removed from the list of active polyhedra which is passed to each child volume of the current volume. (Thus, the list of active polyhedra is equivalent to the list of "active cameras" in the first embodiment.)

More particularly, at step S38-12, 3D point calculator 2080 copies the list of active polyhedra for the parent volume (that is, as described above, the list of polyhedra that have not been verified as enclosing the parent volume) as a list for the current volume. In the case where the parent volume is the bounding cuboid 2500 defined at step S34-2, the list of active polyhedra comprises all of the polyhedra generated at step S34-6.

At step S38-14, 3D point calculator 2080 determines whether there are any polyhedra on the list copied at step S38-12 which do not contain at least one polygon intersecting the current volume. More particularly, 3D point calculator 2080 reads the list of polygons which intersect the current volume generated at step S38-8 to identify any polyhedron on the list copied at step S38-12 which does not have at least one polygon defining the subject object hole therein which intersects the current volume.

If a polyhedron has a polygon which does intersect the current volume, then the current volume lies partly inside and partly outside the subject object hole in the polyhedron. Further, if all of the polyhedra contain a polygon which intersects the current volume, then the current volume is partly inside and partly outside every polyhedron and accordingly the volume cannot be discarded because it does not lie wholly inside at least one subject object hole. Therefore, if it is determined at step S38-14 that all of the polyhedra contain at least one polygon which intersects the current volume, processing proceeds to step S38-28 which will be described later.

On the other hand, if it is determined at step S38-14 that a polyhedron contains no polygons which intersect the current volume, then the current volume either lies wholly inside the polyhedron (that is, the volume is enclosed by the polyhedron) or the volume lies wholly inside the subject object hole in the polyhedron (that is, the volume is "disjoint" from the polyhedron). In this case, 3D point calculator 2080 performs processing at steps S38-16 to S38-26 to determine whether the current volume is enclosed by, or is disjoint from, each polyhedron having no polygons which intersect the current volume.

More particularly, at step S38-16, 3D point calculator 2080 considers the next polyhedron on the list having no polygons which intersect the current volume (this being the first such polyhedron the first time step S38-16 is performed).

At step S38-18, 3D point calculator 2080 determines whether the polyhedron encloses, or is disjoint from, the current volume.

FIG. 39 shows the processing operations performed by 3D point calculator 2080 at step S38-18.

Referring to FIG. 39, at step S39-2, 3D point calculator 2080 selects a point on the surface of the volume popped off the stack at step S34-8. Any point on the surface of the volume will do, and in this embodiment, 3D point calculator 2080 selects the first vertex of the first face of the volume.

At step S39-4, 3D point calculator 2080 projects a ray from the point selected at step S39-2 in the direction of the x-axis (although any direction will do) to a distance sufficiently large to ensure that the ray exits the polyhedron under consideration (set in this embodiment to a distance of twice the dimension of the polygon in the x-direction). In addition, 3D point calculator 2080 counts the number of intersections of the ray with the polyhedron, and at step S39-6, determines whether the number of intersections of the ray with the polyhedron is odd or even.

The reason for this test will be described with reference to FIGS. 40a, 40b, 41a and 41b.

Referring to FIG. 40a and FIG. 40b, in the case where a volume 2650 popped off the stack at step S34-8 is outside the subject object hole 2610, then the ray 2660 projected at step S39-4 will intersect the polyhedron 2600 having the subject object hole 2610 therein an odd number of times. In the example shown in FIG. 40b, the ray 2660 intersects the polyhedron 2600 once at point 2670. However, the ray 2660 may intersect the polyhedron 2600 at 3, 5 or a higher odd number of points if the ray passes through the hole 2610 and depending on the shape of the hole 2610. However, in all cases where the volume 2650 is outside the hole 2610 (and therefore enclosed by the polyhedron 2600), the number of intersections of the ray 2660 with the polyhedron 2600 will be odd.

On the other hand, referring to FIG. 41a and FIG. 41b, in the case of a volume 2680 popped off the stack at step S34-8 lying wholly inside a subject object hole 2610, a ray 2690 projected at step S39-4 will intersect the polyhedron 2600 at an even number of places. In the example of FIG. 41b, the ray 2690 intersects the polyhedron 2600 at two places, namely points 2700 and 2710. However, the ray 2690 may intersect the polyhedron 2600 at a higher even number of places depending upon the shape of the subject object hole 2610.

Referring again to FIG. 39, if it is determined at step S39-6 that the number of intersections of the ray projected at step S39-4 with the polyhedron is odd, then at step S39-8, 3D point calculator 2080 sets a flag to indicate that the volume popped off the stack at step S34-8 is enclosed by the polyhedron.

On the other hand, if it is determined at step S39-6 that the number of intersections of the ray projected at step S39-4 with the polyhedron is even, then at step S39-10, 3D point calculator 2080 sets a flag to indicate that the volume popped off the stack at step S39-8 is disjoint from the polyhedron (that is, the volume is wholly inside the subject object hole of the polyhedron).

Referring again to FIG. 38, at step S38-20, 3D point calculator 2080 reads the flag set at step S39-8 or step S39-10 to determine whether the current volume is enclosed by, or is disjoint from, the polyhedron.

If it is determined at step S38-20 that the volume popped off the stack at step S34-8 is disjoint from the polyhedron, then at step S38-22, 3D point calculator 2080 sets a flag to indicate that the state of the volume popped off the stack at step S34-8 has been determined to be "discard" because the volume lies completely inside one of the component object holes (and therefore completely inside one of the original 3D component objects) and hence cannot contain a 3D point representing a vertex of the compound object.

After step S38-22 has been performed, processing returns to step S34-12 in FIG. 34. This is because it is not necessary to determine the relationship between the current volume and any further polyhedra because only one polyhedron which is disjoint from the current volume needs to be identified for 3D point calculator 2080 to determine that the current volume cannot contain a 3D point representing a vertex of the compound object.

On the other hand, if it is determined at step S38-20 that the volume popped off the stack at step S34-8 is enclosed by the polyhedron, then at step S38-24, 3D point calculator 2080 deletes the polyhedron from the list of active polyhedra for the current volume, so that the polyhedron is not tested to determine whether it encloses any child volumes of the current volume.

Processing then proceeds to step S38-26, at which 3D point calculator 2080 determines whether there is another polyhedron on the list copied at step S38-12 containing no polygons which intersect the current volume. Steps S38-16 to S38-26 are repeated until each such polyhedron has been processed in the way described above, or until it is determined at step S38-20 that the current volume is disjoint from one of the polyhedra (in which case the state of the volume is determined to be "discard" at step S38-22 and processing returns to step S34-12).

When it is determined at step S38-14 that there are no polyhedra on the list copied at step S38-12 having no polygons which intersect the current volume, or when it is determined at step S38-26 that all such polygons have been processed and found to enclose the current volume, processing proceeds to step S38-28.

At step S38-28, 3D point calculator 2080 reads the list generated at step S38-8 defining the polygons which intersect the current volume.

At step S38-30, 3D point calculator 2080 determines whether the number of polygons on the list read at step S38-28 is 3, more than 3 or less than 3.

If it is determined at step S38-30 that the number of polygons which intersect the current volume is less than 3, then, at step S38-32, 3D point calculator 2080 sets a flag to indicate that the state of the volume popped off the stack at step S34-8 has been determined to be "discard" because the volume does not contain a sufficient number of polygons to intersect and generate a 3D point representing a vertex of the compound object. Processing then returns to step S34-12 in FIG. 34.

If it is determined at step S38-30 that the number of polygons which intersect the current volume is 3, then, at step S38-34, 3D point calculator 2080 sets a flag to indicate that the state of the volume popped off the stack at step S34-8 has been determined to be "calculate vertex" because the volume contains the correct number of polygons to intersect and define a single 3D point which may represent a vertex of the compound object. Processing then returns to step S34-12 in FIG. 34.

If it is determined at step S38-30 that the number of polygons which intersect the current volume is greater than 3, then, at step S38-36, 3D point calculator 2080 sets a flag to indicate that the state of the volume popped off the stack at step S34-8 has been determined to be "subdivide" because it contains more than the required number of polygons (that is 3) to intersect and generate a single 3D point which may represent a vertex of the compound object. Processing then returns to step S34-12 in FIG. 34.

As a result of the processing described above with reference to FIG. 38, 3D point calculator 2080 has determined the state of the volume popped off the stack at step S34-8 and has set a flag in dependence upon the determined state indicating what subsequent processing is to be performed on the volume.

Referring again to FIG. 34, after performing processing as described above to determine the state of the volume, at step S34-12, 3D point calculator 2080 determines whether the state is "calculate vertex".

If it is determined at step S34-12 that a vertex is to be calculated, processing proceeds to step S34-14 to calculate the vertex, otherwise step S34-14 is omitted.

FIG. 42 shows the processing operations performed by 3D point calculator 2080 at step S34-14 to calculate a vertex.

Referring to FIG. 42, at step S42-2, 3D point calculator 2080 calculates the 3D position of the point at which the three planes containing the three respective polygons intersect (this processing being performed using a conventional plane intersection technique).

At step S42-4, 3D point calculator 2080 determines whether the 3D point calculated at step S42-2 is both within the 3D volume popped off the stack at step S34-8 and also within all three of the 2D polygons. This test is necessary because the 3D point is calculated as the intersection of the planes containing the polygons, and accordingly the planes will not necessarily intersect each other at a point in the volume or at a point which is actually part of (that is, within) the polygons. Because the volume popped off the stack at step S34-8 is an axis-aligned cuboid, the test to determine whether the 3D point is inside the volume is performed using conventional inequality tests between the coordinates of the 3D point and the minimum and maximum x, y and z coordinates of the volume. The processing to determine whether the 3D point is within each 2D polygon is also carried out in a conventional manner, for example as described in Graphics Gems IV pages 16–46, edited by P. Heckbert and published by Morgan Kaufmann, ISBN 0-12-336155-9.

If it is determined at step S42-4 that the calculated 3D point is inside the volume and is also within all three of the polygons, then processing proceeds to step S42-6, at which 3D point calculator 2080 adds the calculated 3D point to the list of 3D points representing vertices of the compound object.

On the other hand, if it is determined at step S42-4 that the calculated 3D point is outside the volume or is outside at least one of the three polygons, then step S42-6 is omitted.

At step S42-8, 3D point calculator 2080 sets a flag to indicate that the volume popped off the stack at step S34-8 is now to be discarded because processing of it is complete.

Referring again to FIG. 34, at step S34-16, 3D point calculator 2080 determines whether the state of the volume popped off the stack at step S34-8 is set to "discard" or "subdivide".

If the state is set to "discard" (which can result from processing at step S34-10 or as a result of step S42-8 at step S34-14), then, at step S34-18, 3D point calculator 2080 discards the volume.

On the other hand, if the state of the volume is set to "subdivide", then, at step S34-20, 3D point calculator 2080 subdivides the volume and adds the child volumes to the top of the stack created at step S34-4. In this embodiment, the subdivision of the volume at step S34-20 is performed in the same way as the subdivision at step S34-4—that is, it comprises binary subdivision of the volume to generate eight new child volumes.

Following step S34-18 or step S34-20, processing proceeds to step S34-22, at which 3D point calculator 2080 determines whether there is another volume on the stack (including any child volumes added at step S34-20).

Steps S34-8 to S34-22 are repeated until each volume on the stack has been processed in the way described above.

Referring to FIG. 43, as a result of performing processing in this way, 3D point calculator 2080 has generated a set of points in 3D space (designated by circles in FIG. 43) representing vertices of the compound object. Each vertex represents the position at which three polygons from the same, two or three component objects meet.

Referring again to FIG. 33b, the vertices 2420, 2430 and 2440 of the component object 2210 are inside the component object 2200. Accordingly, in the processing performed by 3D point calculator 2080, these vertices are not calculated and do not form part of the compound object (because they lie in a volume which is "disjoint" from the polyhedron 2600 generated at step S34-6 for the component object 2200). Consequently, referring again to FIG. 43, the vertices 2800, 2802 and 2804 of the compound object lie in the same plane as the vertices 2806, 2808, 2810 and 2812.

In FIG. 43, the connections between the vertices of the compound object are shown by dotted lines to assist understanding. However, at this stage in the processing, the connections between the vertices have not yet been calculated, and accordingly processing apparatus 2002 performs processing to calculate the connections, as will now be described.

Referring again to FIG. 32, at step S32-8, polygon generator 2090 connects the 3D points calculated by 3D point calculator 2080 to calculate the connections therebetween and therefore to generate a polygon mesh representing the surface of the compound object.

The processing performed by polygon generator 2090 at step S32-8 is the same as the processing performed by polygon generator 86 at step S8-8 in the first embodiment (described above with reference to FIG. 23), with the exception of the processing performed at step S23-2. Accordingly, only the differences in this processing will be described here.

FIG. 44 shows the processing operations performed by polygon generator 2090 at step S23-2 in the second embodiment to generate plane data and define a "signature" for each calculated 3D point representing a vertex of the compound object.

Referring to FIG. 44, at step S44-2, polygon generator 2090 considers the next polygon from which a 3D point was calculated by 3D point calculator 2090 at step S42-2 and subsequently added to the list of vertices of the compound object at step S42-6 (this being the first such polygon the first time this step is performed).

At step S44-4, polygon generator 2090 assigns a unique ID to the polygon selected at step S44-2 unless such an ID has been assigned on a previous iteration of this step.

At step S44-6, polygon generator 2090 determines whether there is another polygon used to calculate a vertex of the compound object, and steps S44-2 to S44-6 are repeated until each such polygon has been processed in the way described above.

At step S44-8, polygon generator 2090 considers the next calculated vertex of the compound object from the list generated by polygon generator 2080 at step S42-6, and at step S44-10 defines a signature for the vertex comprising the IDs of the polygons which meet at the 3D point (these being the IDs assigned to the polygons at step S44-4).

At step S44-12, polygon generator 2090 determines whether there is another calculated vertex of the compound object, and steps S44-8 to S44-12 are repeated until each vertex has been processed in the way described above.

As a result of performing the processing at step S32-8, polygon generator 2090 has generated a mesh of triangular polygons representing the surface of the compound object.

Referring again to FIG. 32, at step S32-10, central controller 2020 outputs the data defining the 3D computer model of the compound object from the output data store 2110, for example as data stored on a storage device, such as disk 2120, or as a signal 2130 (FIG. 31). In addition, or instead, central controller 2020 causes display processor 2100 to display an image of the 3D computer model of the compound object on display device 2004 in accordance with a viewpoint input by a user, for example using a user input device 2006.

Third Embodiment

A third embodiment of the present invention will now be described.

The components of the third embodiment and the processing operations performed thereby are the same as those in the first embodiment, with the exception of the processing operations performed by surface modeller 80 at step S4-16 in FIG. 4, which are different in the third embodiment.

These differences will now be described.

FIG. 45 shows the processing operations performed by surface modeller 80 in the third embodiment at step S4-16 in FIG. 4.

Referring to FIG. 45, at step S45-2, silhouette approximator 82 processes the segmented image data previously generated by image data segmenter 60 at step S4-8 and image segmentation editor 70 at step S4-12 in FIG. 4 to approximate the silhouette of the subject object in each input image with straight lines. This processing is the same as the processing performed by silhouette approximator 82 in the first embodiment at step S8-2 in FIG. 8, and results in each silhouette being approximated by connected straight lines as illustrated in the example of FIG. 9.

At step S45-4, 3D point calculator 84 projects each straight line of each silhouette into three-dimensional space to generate an infinite planar triangle having sides passing through the end points of the straight line and meeting at the position of the focal point of the camera 230 when the image containing the straight line was recorded (the focal point position of each image having previously been calculated by camera calculator 50 at step S4-6).

Referring back to FIG. 10, the processing performed at step S45-4 generates a polyhedron for each input image comprising an infinite cone 520 made up of triangular planar faces (one for each straight line segment of the silhouette) which touches the surface of the subject object 210 at (as yet unknown) points in the three-dimensional space and which has its appex at the focal point position of the camera 230. The cross-section of each cone is therefore the same shape as the silhouette from which it was generated.

3D point calculator 84 assigns a unique identification (ID) to each planar face in each polyhedron.

At steps S45-6 to S45-18, 3D point calculator 84 performs processing to calculate the points of intersection of the planar faces from the polyhedra generated at step S45-4 and to test the calculated points of intersection to determine whether they represent points on the surface of the subject object 210.

More particularly, at step S45-6, 3D point calculator 84 considers all of the planar faces from all of the polyhedra generated at step S45-4, and considers the next set of three of these planar faces which contains faces from at least two polyhedra (this being the first such set the first time step S45-6 is performed).

At step S45-8, 3D point calculator 84 calculates the point of intersection of the three planar faces considered at step S45-6. More particularly, in this embodiment, the point of intersection is calculated by calculating the point at which the three respective planes containing the three planar faces meet using a conventional plane intersection algorithm.

At step S45-10, 3D point calculator 84 determines whether the point of intersection calculated at step S45-8 is within all of the polyhedra generated at step S45-4.

If it is determined at step S45-10 that the point is outside at least one polyhedron, then at step S45-12, the point is discarded because it cannot represent a point on the surface of the subject object 210.

On the other hand, if it is determined at step S45-10 that the point is within all of the polyhedra, then at step S45-14, 3D point calculator 84 determines whether the point is within all of the three planar faces considered at step S45-6 (it being noted that the point may be outside one or more of these planar faces because the point was calculated by calculating the point of intersection of the planes containing the faces and not by calculating the point of intersection of the planar faces themselves).

If it is determined at step S45-14 that the point is outside at least one of the planar faces, then at step S45-12 the point is discarded because it cannot represent a point on the surface of the subject object 210.

On the other hand, if it is determined at step S45-14 that the point is within all three of the planar faces, then at step S45-16, the point is retained as a point on the surface of the subject object 210. In addition, the point is assigned a "signature" comprising a triple formed from the three respective identifications of the planar faces which meet at the point (these identifications being the identifications previously assigned to the planar faces at step S45-4).

At step S45-18, 3D point calculator 84 determines whether there is another set of three planar faces containing faces from at least two polyhedra. Steps S45-6 to S45-18 are repeated until each respective set of three planar faces from at least two polyhedra has been processed in the way described above.

As a result of performing this processing, 3D point calculator 84 has calculated and tested the point of intersection of every possible combination of three planar faces from at least two polyhedra, to generate a 3D computer model of the subject object 210 comprising points in 3D space representing points on the surface of the subject object 210.

At step S45-20, polygon generator 86 connects the 3D points retained at step S45-16 using the signatures assigned to the points to determine which points should be connected together, thereby generating a polygon mesh representing the surface of the subject object 210. Accordingly, the processing to connect the 3D points to generate a polygon mesh is performed after the 3D points resulting from the intersections of all of the polyhedra generated at step S45-4 have been calculated and tested.

The processing performed by polygon generator 86 at step S45-20 in the third embodiment is the same as that performed at step S8-8 in the first embodiment, with the exception that steps S25-10 to S25-14 in FIG. 25 are not performed in the third embodiment because this processing is instead performed at step S45-16 in FIG. 45.

Although more computationally expensive than the processing performed in the first embodiment, the processing performed in the third embodiment to generate a 3D computer model of the subject object 210 still requires less processing resources and/or time than the prior art methods of generating a 3D computer model.

Many modifications can be made to the embodiments described above within the scope of claims.

For example, in the first and third embodiments described above, the input image data comprises "still" images of the subject object 210 recorded by camera 230. However, the input images may comprise frames of image data from a video camera.

In the first and third embodiments described above, at step S4-4, data input by a user defining the intrinsic parameters of the camera is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the first and third embodiments described above, image data from an input image relating to the subject object 210 is segmented from the image data relating to the background as described above with reference to FIG. 5. However, other conventional segmentation methods may be used instead. For example, a segmentation method may be used in which a single RGB value representative of the colour of the photographic mat 34 and background (or just the background) is stored and each pixel in an input image is processed to determine whether the Euclidean distance in RGB space between the RGB background value and the RGB pixel value is less than a specified threshold.

In the first and third embodiments described above, camera calculator 50 calculates the relative positions and orientations of the input images by calculating the position and orientation of the camera 230 relative to the mat 34 for each input image (described above with reference to step S4-6). However, the way in which the imaging positions and orientations are calculated is not important. For example, the mat 34 may be discarded and, instead, the input images may be generated using a plurality of cameras surrounding the subject object 210, with each camera having a known, fixed position and orientation which is input to the processing apparatus 2. Alternatively, the photographic mat 34 may be discarded and the subject object 210 may be mounted on a turntable having position encoders which input the precise rotation of the turntable to processing apparatus 2. Knowing the fixed position of camera 230 and the turntable angle, processing apparatus 2 can then calculate the relative position and orientation of each image of the subject object 210.

In the first embodiment described above, a flag "eitherSubdivideOrDiscard" is set during the processing performed at step S13-8. However, it is not essential to set this flag because the processing will still work as a result of the processing to cause the "np" counter to overflow (that is, exceed three in value in the first embodiment) at steps S15-26 and S15-46.

In the first embodiment described above, at step S15-16, processing apparatus 2 generates a set of "candidate edges" which may intersect the projected volume. Subsequent tests are then restricted to edges lying in the set of candidate edges. However, step S15-16 (and also step S8-4 which is performed to facilitate the processing of step S15-16) may be omitted, and subsequent tests carried out on all edges. However, this is likely to increase significantly the amount of processing operations needed to be performed.

In the first embodiment, instead of performing the processing described above with reference to step S13-2 to define a 3D volume in which all calculated points on the object surface will lie, processing may be carried out to define the 3D volume in different ways. For example, an initial start volume may be defined to be an arbitrary, large cube. A cube is then either added to the initial volume (if all of its corners are in front of all of the cameras) or is discarded (if all of its corners are behind one of the cameras or if the cube is smaller than some predetermined size) or is subdivided (if neither of these conditions apply). Subdivided cubes are then processed in the same way. In this way, the 3D volume defined at step S13-2 will consists of the union of a set of cubes, and is guaranteed to lie entirely in front of all of the cameras and to be the largest such region up to the tolerance given by the minimum cube size.

In the first embodiment described above, the volume of 3D space is repeatedly sub-divided until a sufficiently small volume is obtained that it contains only a single vertex. However, instead, sub-division of a 3D volume may be stopped when the volume contains a predetermined number of vertices greater than or equal to two. Each of the plurality of vertices would be calculated and tested to determine whether it represents an actual vertex of the subject object in the same way that each single vertex is calculated and tested in the first embodiment.

The processing operations described for the first and third embodiments can be extended in an obvious manner to the case where a silhouette generated at step S8-2 contains polygons representing holes (and also islands within holes etc).

In the second embodiment described above, at steps S38-30 and S38-36, the state of a volume is set to "sub-divide" if the number of polygons that intersects the current volume is greater than 3. However, instead, if there are more than 3 but less than or equal to a predetermined number (for example 5) of polygons intersecting the current volume, the state of the volume may be set to "calculate multiple vertices". In subsequent processing, processing apparatus 2002 would then calculate and test each vertex defined by a subset of three of the polygons intersecting the volume. A volume would therefore only be subdivided if there were more than the predetermined maximum number of polygons intersecting the volume. In this way, a volume could add more than one vertex to the model of the compound object, thereby saving processing to further subdivide the volume (at the cost of having more candidate vertices to compute and test).

When subdividing a 3D volume popped off the stack in the first embodiment at step S13-18, and in the second embodiment at steps S34-4 and S34-20, the subdivision carried out comprises the binary subdivision of the volume to generate eight new child volumes. However, different types of subdivision are, of course, possible.

In the third embodiment described above, at step S45-8, the point of intersection of three planar faces is calculated by calculating the point at which the three respective infinite planes containing the faces intersect. Tests are then carried out at steps S45-10 and S45-14 to determine whether the calculated point is within all of the polyhedra and is within all of the three planar faces. However, instead, at step S45-8, the point of intersection of the three planar faces themselves may be calculated (instead of the planes in which they lie), in which case steps S45-10 and S45-14 may be omitted.

The third embodiment above describes a modification to the processing in the first embodiment which generates a computer model of the surface of the subject object. The processing in the second embodiment to calculate and test the intersections of the polyhedra and to connect the resulting points to generate a surface model could be modified in a corresponding way.

In the first and second embodiments described above, the initial volume defined so that it will contain all of the points to be calculated on the surface of the object (defined at step S13-2 in the first embodiment, and step S34-2 in the second embodiment) is repeatedly subdivided into smaller volumes until sufficiently small volumes are generated that each can contain only a predetermined number of 3D points on the surface of the object. When such smaller volumes are reached through the sub-division process, the 3D points are calculated and tested. However, while this is a particularly efficient way of calculating the points representing points on the surface of the object, other methods are possible. For example, the initial volume which will contain all of the calculated 3D points may be divided into a plurality of parts without reference to the positions of the planar polygons making up the polyhedra and 3D point calculation may be carried out without further subdivision of the parts. More particularly, the volume may be divided into a plurality of parts (for example of the same shape and volume) and then each part tested against the polyhedra to determine whether it is wholly outside at least one of the polyhedra. If the volume part is outside at least one polyhedron, then the volume part is discarded. On the other hand, if the volume is at least partially within all of the polyhedra, the 3D points in the volume part at which planar polygons in the polyhedra intersect are calculated. In this way, each volume part is discarded or 3D points are calculated, but no further subdivision occurs. To calculate the 3D points in a volume part, each combination of three planar polygons is considered and the intersection of these polygons is calculated and tested to determined whether it is within the volume part. This increases the number of intersections which need to be calculated and tested compared to the first and second embodiments described above, but is still an efficient way of generating the 3D computer model because volume parts can be discarded if they lie outside every polyhedra, and accordingly, not all possible intersections of the planar polygons making up the polyhedra have to be calculated and tested.

In all of the embodiments described above, processing is performed by a computer using processing routines defined by programming instructions. However, some, or all, of the processing could, of course, be performed using hardware.

What is claimed is:

1. A method of processing data defining at least three polyhedra, each respective polyhedron comprising a plurality of planar faces in a three-dimensional space defining a volume within which at least part of a subject object lies, to generate a 3D computer model of the subject object comprising points in the three-dimensional space representing points on the surface of the subject object connected to form a polygon mesh, the method comprising:

calculating points in the three-dimensional space representing points on the surface of the subject object by calculating the respective points at which a predetermined number of planar faces from the polyhedra intersect;

assigning an identification to each calculated point representing a point on the subject object in dependence upon the planar faces which meet at the point; and after calculating the points representing points on the subject object and assigning identifications thereto, connecting the points in dependence upon the assigned identifications to generate a 3D computer model comprising a polygon mesh representing the surface of the subject object.

2. A method according to claim 1, wherein, in the calculation of points representing points on the subject object, tests are carried out to identify which planar faces cannot intersect at a point on the subject object by testing volumes of the three-dimensional space to identify volumes which do not contain any part of the subject object and the planar faces intersecting the identified volumes, and wherein points of intersection are not calculated for the planar faces which cannot intersect at a point on the subject object.

3. A method according to claim 2, wherein the calculation of points in the three-dimensional space representing points on the surface of the subject object comprises:

defining a volume of the three-dimensional space in which all points on the subject object will lie;

dividing the volume into a plurality of volume parts;

testing each volume part against the polyhedra, and:
  discarding the volume part if it is wholly outside at least one of the polyhedra;
  if the volume part is at least partially within all of the polyhedra, processing the data defining the planar surfaces which intersect the volume part to calculate the 3D points in the volume part at which a predetermined number of the planar surfaces meet.

4. A method of processing data defining a plurality of polyhedra, each respective polyhedron comprising a plurality of planar surfaces in a three-dimensional space defining a volume within which at least part of a subject object lies, to generate a 3D computer model of the subject object comprising points in the three-dimensional space representing points on the surface of the subject object, the method comprising:
  defining a volume of the three-dimensional space in which all points in the 3D computer model will lie;
  dividing the volume into a plurality of volume parts;
  testing each volume part against the polyhedra, and:
    discarding the volume part if it is wholly outside at least one of the polyhedra;
    if the volume part is at least partially within all of the polyhedra, processing the data defining the planar surfaces which intersect the volume part to calculate the 3D points in the volume part at which a predetermined number of the planar surfaces meet.

5. A method according to claim 3 or claim 4, wherein the process to divide the volume into volume parts and to test the volume parts comprises testing the volume parts against the polyhedra, and:
  discarding a volume part if it is wholly outside at least one of the polyhedra;
  if a volume part is at least partially within all of the polyhedra, processing the data defining the planar surfaces which intersect the volume part and, in dependence upon the number of planar surfaces which intersect the volume part:
    subdividing the volume part into a plurality of smaller volume parts for further testing,
    calculating the 3D points in the volume part at which a predetermined number of the planar surfaces meet; or
    discarding the volume part.

6. A method according to claim 5, wherein a volume part is subdivided if the volume part is at least partially within all of the polyhedra and the number of planar surfaces which intersect the volume part is more than a predetermined number.

7. A method according to claim 5, wherein a volume part is discarded if the volume part is at least partially within all of the polyhedra and the number of planar surfaces which intersect the volume part is less than a predetermined number.

8. A method according to claim 5, wherein, when a volume part is tested, data is stored defining the planar surfaces which intersect the volume part, and when a smaller volume part is tested which was generated by subdivision of a parent volume part, only the planar surfaces which intersect the parent volume part are tested to determine whether they intersect the smaller volume part.

9. A method according to claim 5, wherein, when a volume part is tested, data is stored defining each polyhedron which the volume part is determined to lie wholly inside, and, when a smaller volume part is tested which was generated by subdivision of a parent volume part, tests are carried out to determine whether the smaller volume part lies inside each of the polyhedra not defined in the stored data, but no tests are carried out to determine whether the smaller volume part lies inside any of the polyhedra defined in the stored data.

10. A method according to claim 3 or claim 4, wherein a volume part is tested against a polyhedron to determine if it lies wholly outside the polyhedron by determining whether any of the polygon faces of the polyhedron intersect the volume part and:
  in the event that at least one polygon face intersects the volume part, determining that the volume part lies at least partially within the polyhedron;
  in the event that none of the polygon faces intersect the volume part, projecting a ray from a point within the volume part to a predetermined point in the three-dimensional space, and determining whether the volume part lies wholly inside the polyhedron or wholly outside the polyhedron in dependence upon the number of intersections of the ray with the polyhedron.

11. A method according to claim 1 or claim 4, wherein each respective polyhedron comprises a projection into the three-dimensional space of the outline of the subject object from a two-dimensional image having a known position and orientation in the three-dimensional space, each respective polyhedron thereby representing the shape of the subject object in a plane parallel to the plane of the image from which it was generated.

12. A method according to claim 11, further comprising:
  processing data defining a plurality of images of the subject object to approximate the outline of the subject object in each image with straight lines;
  projecting the straight lines into the three-dimensional space in dependence upon the positions and orientations of the images in the three-dimensional space, to define the polyhedra, each respective polyhedron representing the shape of the subject object in a plane parallel to the plane of the image from which it was generated.

13. A method according to claim 11, wherein the testing of a volume part against a polyhedron comprises projecting the volume part into the two-dimensional image corresponding to the polyhedron and testing the two-dimensional projected volume part against the outline of the subject object in the image.

14. A method according to claim 13, wherein the outline of the subject object in each two-dimensional image comprises a plurality of straight line edges, and wherein, to determine the planar surfaces which intersect the volume part, the two-dimensional projected volume part is tested to determine the outline edges that intersect the projected volume part.

15. A method according to claim 14, wherein the straight line edges of the outline in each two-dimensional image are connected end-to-end at vertices, and wherein, to determine the planar surfaces which intersect the volume part, the two-dimensional projected volume part is tested to determine the outline vertices which lie therein and the outline edges that intersect the projected volume part.

16. A method according to claim 14, wherein, to determine the outline edges which intersect a projected volume part:
  a portion of the image containing the projected volume part is identified;
  stored data defining regions of the image and the outline edges within each region is read; and the projected volume part is tested only against outline edges defined in the stored data to lie in regions which overlap the identified portion of the image containing the projected volume part.

17. A method according to claim 1 or claim 4, wherein each respective polyhedron comprises a polyhedron having a hole therein, the hole defining the outline three-dimensional shape of a part of the subject object.

18. A method of processing data defining a plurality of images of a subject object to generate data defining a 3D computer model of the subject object, comprising:
processing each image to project the outline of the subject object therein into three-dimensional space in dependence upon the position and orientation of the image in the three-dimensional space, to generate a respective polyhedron from each image comprising a plurality of planar faces defining the visual hull of the subject object; and
calculating the points in the three-dimensional space at which a predetermined number of the planar faces from at least two respective polyhedra intersect by:
defining a volume of the three-dimensional space in which all points on the surface of the subject object must lie;
subdividing the volume into a plurality of volume parts and storing data defining a list of the volume parts;
selecting a volume part from the list, testing it against the polyhedra generated from the images, and:
if the volume part it is wholly outside at least one of the polyhedra, discarding the volume part;
if the volume part is at least partially within all of the polyhedra:
subdividing the volume part into smaller volume parts and adding each smaller volume part to the list of parts to be processed if the planar faces which intersect the volume part are sufficient in number to intersect to generate more than a predetermined number of 3D points representing points on the surface of the subject object;
discarding the volume part if the planar faces which intersect the volume part are not sufficient in number to intersect to generate at least one 3D point representing a point on the surface of the subject object;
calculating 3D points in the volume part representing points on the surface of the subject object if the number of planar faces intersecting the volume part is equal to the number required to intersect to generate a predetermined number of 3D points representing points on the surface of the subject object;
repeating the process of selecting a volume part from the list and testing it until all volume parts on the list have been selected and tested, thereby to generate a 3D computer model of the subject object comprising points in the three-dimensional space defined by the intersection of planar faces from the polyhedra, each 3D point representing a point on the visual hull of the subject object.

19. A method according to claim 4 or claim 18, further comprising connecting the calculated points in the three-dimensional space representing points on the surface of the subject object to generate a 3D computer model comprising a polygon mesh representing the surface of the subject object.

20. A method according to claim 1, claim 4 or claim 18, further comprising generating a signal conveying the 3D computer model.

21. A method according to claim 20, further comprising making a recording of the signal either directly or indirectly.

22. A storage device storing instructions for causing a programmable processing apparatus to become operable to perform a method as set out in claim 1, claim 4 or claim 18.

23. A signal conveying instructions for causing a programmable processing apparatus to become operable to perform a method as set out in claim 1, claim 4 or claim 18.

24. Apparatus for processing data defining at least three polyhedra, each respective polyhedron comprising a plurality of planar faces in a three-dimensional space defining a volume within which at least part of a subject object lies, to generate a 3D computer model of the subject object comprising points in the three-dimensional space representing points on the surface of the subject object connected to form a polygon mesh, the apparatus comprising:
a 3D point calculator operable to calculate points in the three-dimensional space representing points on the surface of the subject object by calculating the respective points at which a predetermined number of planar faces from the polyhedra intersect;
a 3D point identifier operable to assign an identification to each calculated point representing a point on the subject object in dependence upon the planar faces which meet at the point; and
a 3D point connector operable to connect the points in dependence upon the assigned identifications to generate a 3D computer model comprising a polygon mesh representing the surface of the subject object, the 3D point connector being arranged to connect the points after processing by the 3D point calculator to calculate all points in the 3D computer model is complete.

25. Apparatus according to claim 24, wherein the 3D point calculator is arranged to carry out tests to identify which planar faces cannot intersect at a point on the subject object by testing volumes of the three-dimensional space to identify volumes which do not contain any part of the subject object and the planar faces intersecting the identified volumes, and wherein the 3D point calculator is arranged not to calculate points of intersection for the identified planar faces which cannot intersect at a point on the subject object.

26. Apparatus according to claim 25, wherein the 3D point calculator comprises:
a volume definer operable to define a volume of the three-dimensional space in which all points on the subject object will lie;
a volume divider operable to divide the volume into a plurality of volume parts;
a volume tester operable to test each volume part against the polyhedra, and operable to:
discard the volume part if it is wholly outside at least one of the polyhedra;
if the volume part is at least partially within all of the polyhedra, process the data defining the planar surfaces which intersect the volume part to calculate the 3D points in the volume part at which a predetermined number of the planar surfaces meet.

27. Apparatus for processing data defining a plurality of polyhedra, each respective polyhedron comprising a plurality of planar surfaces in a three-dimensional space defining a volume within which at least part of a subject object lies, to generate a 3D computer model of the subject object comprising points in the three-dimensional space representing points on the surface of the subject object, the apparatus comprising:
a volume definer operable to define a volume of the three-dimensional space in which all points in the 3D computer model will lie;

a volume divider operable to divide the volume into a plurality of volume parts;

a volume tester operable to test each volume part against the polyhedra, the volume tester being arranged to:
  discard the volume part if it is wholly outside at least one of the polyhedra;
  if the volume part is at least partially within all of the polyhedra, process the data defining the planar surfaces which intersect the volume part to calculate the 3D points in the volume part at which a predetermined number of the planar surfaces meet.

28. Apparatus according to claim 26 or claim 27, wherein the volume divider and the volume tester are arranged to perform processing to:
  discard a volume part if it is wholly outside at least one of the polyhedra;
  if a volume part is at least partially within all of the polyhedra, process the data defining the planar surfaces which intersect the volume part and, in dependence upon the number of planar surfaces which intersect the volume part:
    subdivide the volume part into a plurality of smaller volume parts for further testing,
    calculate the 3D points in the volume part at which a predetermined number of the planar surfaces meet; or
    discard the volume part.

29. Apparatus according to claim 28, wherein the volume divider and the volume tester are arranged to subdivide a volume part if the volume part is at least partially within all of the polyhedra and the number of planar surfaces which intersect the volume part is more than a predetermined number.

30. Apparatus according to claim 28, wherein the volume divider and the volume tester are arranged to discard a volume part if the volume part is at least partially within all of the polyhedra and the number of planar surfaces which intersect the volume part is less than a predetermined number.

31. Apparatus according to claim 28, wherein the volume tester is arranged to store data when a volume part is tested defining the planar surfaces which intersect the volume part, and is arranged to operate so that, when a smaller volume part is tested which was generated by subdivision of a parent volume part, only the planar surfaces which intersect the parent volume part are tested to determine whether they intersect the smaller volume part.

32. Apparatus according to claim 28, wherein the volume tester is arranged to store data when a volume part is tested defining each polyhedron which the volume part is determined to lie wholly inside, and is arranged to operate so that, when a smaller volume part is tested which was generated by subdivision of a parent volume part, tests are carried out to determine whether the smaller volume part lies inside each of the polyhedra not defined in the stored data, but no tests are carried out to determine whether the smaller volume part lies inside any of the polyhedra defined in the stored data.

33. Apparatus according to claim 26 or claim 27, wherein the volume tester is arranged to test a volume part against a polyhedron to determine if it lies wholly outside the polyhedron by determining whether any of the polygon faces of the polyhedron intersect the volume part and:
  in the event that at least one polygon face intersects the volume part, determine that the volume part lies at least partially within the polyhedron;
  in the event that none of the polygon faces intersect the volume part, project a ray from a point within the volume part to a predetermined point in the three-dimensional space, and determine whether the volume part lies wholly inside the polyhedron or wholly outside the polyhedron in dependence upon the number of intersections of the ray with the polyhedron.

34. Apparatus according to claim 24 or claim 27, wherein each respective polyhedron comprises a projection into the three-dimensional space of the outline of the subject object from a two-dimensional image having a known position and orientation in the three-dimensional space, each respective polyhedron thereby representing the shape of the subject object in a plane parallel to the plane of the image from which it was generated.

35. Apparatus according to claim 34, further comprising:
  an outline approximator operable to process data defining a plurality of images of the subject object to approximate the outline of the subject object in each image with straight lines; and
  a line projector operable to project the straight lines into the three-dimensional space in dependence upon the positions and orientations of the images in the three-dimensional space, to define the polyhedra, each respective polyhedron representing the shape of the subject object in a plane parallel to the plane of the image from which it was generated.

36. Apparatus according to claim 34, wherein the volume tester is arranged to test a volume part against a polyhedron by projecting the volume part into the two-dimensional image corresponding to the polyhedron and testing the two-dimensional projected volume part against the outline of the subject object in the image.

37. Apparatus according to claim 36, wherein the outline of the subject object in each two-dimensional image comprises a plurality of straight line edges, and wherein, to determine the planar surfaces which intersect the volume part, the volume tester is arranged to test the two-dimensional projected volume part to determine the outline edges that intersect the projected volume part.

38. Apparatus according to claim 37, wherein the straight line edges of the outline in each two-dimensional image are connected end-to-end at vertices, and wherein, to determine the planar surfaces which intersect the volume part, the volume tester is arranged to test the two-dimensional projected volume part to determine the outline vertices which lie therein and the outline edges that intersect the projected volume part.

39. Apparatus according to claim 37, wherein the volume tester is arranged to perform processing to determine the outline edges which intersect a projected volume part by:
  identifying a portion of the image containing the projected volume part;
  reading stored data defining regions of the image and the outline edges within each region; and
  testing the projected volume part only against outline edges defined in the stored data to lie in regions which overlap the identified portion of the image containing the projected volume part.

40. Apparatus according to claim 24 or claim 27, wherein each respective polyhedron comprises a polyhedron having a hole therein, the hole defining the outline three-dimensional shape of a part of the subject object.

41. Apparatus for processing data defining a plurality of images of a subject object to generate data defining a 3D computer model of the subject object, comprising:
  an outline projector operable to process each image to project the outline of the subject object therein into three-dimensional space in dependence upon the position and orientation of the image in the three-dimensional space, to generate a respective polyhedron from each image comprising a plurality of planar faces defining the visual hull of the subject object; and an intersection calculator operable to calculate the points in the three-dimensional space at which a predetermined number of the planar faces from at least two respective polyhedra intersect by:

defining a volume of the three-dimensional space in which all points on the surface of the subject object must lie;

subdividing the volume into a plurality of volume parts and storing data defining a list of the volume parts;

selecting a volume part from the list, testing it against the polyhedra generated from the images, and:
  if the volume part it is wholly outside at least one of the polyhedra, discarding the volume part;
  if the volume part is at least partially within all of the polyhedra:
    subdividing the volume part into smaller volume parts and adding each smaller volume part to the list of parts to be processed if the planar faces which intersect the volume part are sufficient in number to intersect to generate more than a predetermined number of 3D points representing points on the surface of the subject object;
    discarding the volume part if the planar faces which intersect the volume part are not sufficient in number to intersect to generate at least one 3D point representing a point on the surface of the subject object;
    calculating 3D points in the volume part representing points on the surface of the subject object if the number of planar faces intersecting the volume part is equal to the number required to intersect to generate a predetermined number of 3D points representing points on the surface of the subject object;

repeating the process of selecting a volume part from the list and testing it until all volume parts on the list have been selected and tested, thereby to generate a 3D computer model of the subject object comprising points in the three-dimensional space defined by the intersection of planar faces from the polyhedra, each 3D point representing a point on the visual hull of the subject object.

42. Apparatus according to claim 27 or claim 41, further comprising a point connector operable to connect the calculated points in the three-dimensional space representing points on the surface of the subject object to generate a 3D computer model comprising a polygon mesh representing the surface of the subject object.

43. Apparatus for processing data defining at least three polyhedra, each respective polyhedron comprising a plurality of planar faces in a three-dimensional space defining a volume within which at least part of a subject object lies, to generate a 3D computer model of the subject object comprising points in the three-dimensional space representing points on the surface of the subject object connected to form a polygon mesh, the apparatus comprising:

3D point calculating means for calculating points in the three-dimensional space representing points on the surface of the subject object by calculating the respective points at which a predetermined number of planar faces from the polyhedra intersect;

3D point identification means for assigning an identification to each calculated point representing a point on the subject object in dependence upon the planar faces which meet at the point; and 3D point connecting means for connecting the points in dependence upon the assigned identifications to generate a 3D computer model comprising a polygon mesh representing the surface of the subject object, the 3D point connecting means being arranged to connect the points after processing by the 3D point calculating means to calculate all points in the 3D computer model is complete.

44. Apparatus for processing data defining a plurality of polyhedra, each respective polyhedron comprising a plurality of planar surfaces in a three-dimensional space defining a volume within which at least part of a subject object lies, to generate a 3D computer model of the subject object comprising points in the three-dimensional space representing points on the surface of the subject object, the apparatus comprising:

volume defining means for defining a volume of the three-dimensional space in which all points in the 3D computer model will lie;

volume dividing means for dividing the volume into a plurality of volume parts;

volume testing means for testing each volume part against the polyhedra, the volume testing means being arranged to:
  discard the volume part if it is wholly outside at least one of the polyhedra;
  if the volume part is at least partially within all of the polyhedra, process the data defining the planar surfaces which intersect the volume part to calculate the 3D points in the volume part at which a predetermined number of the planar surfaces meet.

45. Apparatus for processing data defining a plurality of images of a subject object to generate data defining a 3D computer model of the subject object, comprising:

means for processing each image to project the outline of the subject object therein into three-dimensional space in dependence upon the position and orientation of the image in the three-dimensional space, to generate a respective polyhedron from each image comprising a plurality of planar faces defining the visual hull of the subject object; and means for calculating the points in the three-dimensional space at which a predetermined number of the planar faces from at least two respective polyhedra intersect by:

defining a volume of the three-dimensional space in which all points on the surface of the subject object must lie;

subdividing the volume into a plurality of volume parts and storing data defining a list of the volume parts;

selecting a volume part from the list, testing it against the polyhedra generated from the images, and:
  if the volume part it is wholly outside at least one of the polyhedra, discarding the volume part;
  if the volume part is at least partially within all of the polyhedra:
    subdividing the volume part into smaller volume parts and adding each smaller volume part to the list of parts to be processed if the planar faces which intersect the volume part are sufficient in number to intersect to generate more than a predetermined number of 3D points representing points on the surface of the subject object;

discarding the volume part if the planar faces which intersect the volume part are not sufficient in number to intersect to generate at least one 3D point representing a point on the surface of the subject object;

calculating 3D points in the volume part representing points on the surface of the subject object if the number of planar faces intersecting the volume part is equal to the number required to intersect to generate a predetermined number of 3D points representing points on the surface of the subject object;

repeating the step of selecting a volume part from the list and testing it until all volume parts on the list have been selected and tested, thereby to generate a 3D computer model of the subject object comprising points in the three-dimensional space defined by the intersection of planar faces from the polyhedra, each 3D point representing a point on the visual hull of the subject object.

* * * * *

UNITED STATES PATENT AND TRADEMARK OFFICE
CERTIFICATE OF CORRECTION

PATENT NO. : 6,867,772 B2
DATED : March 15, 2005
INVENTOR(S) : Aaron William Christopher Kotcheff et al.

It is certified that error appears in the above-identified patent and that said Letters Patent is hereby corrected as shown below:

Column 9,
Line 32, "et al" should read -- et al. --.

Column 15,
Line 31, "surf ace" should read -- surface --.

Column 41,
Line 34, "etc" should read -- etc. --.

Column 43,
Line 21, "210" should be deleted.
Line 53, "O(n3)" should read -- $O(n^3)$ --.

Column 45,
Line 2, "mat" should read -- may --.

Column 55,
Line 1, "that it" should read -- such that it --.

Column 56,
Line 21, "polyhedra," should read -- polyhedron, --.

Column 63,
Line 17, "it" should be deleted.

Column 64,
Line 60, "it" should be deleted.

Signed and Sealed this

Twenty-first Day of February, 2006

JON W. DUDAS
*Director of the United States Patent and Trademark Office*